E. H. KELLEY.
VENDING MACHINE.
APPLICATION FILED DEC. 17, 1909.

1,266,021.

Patented May 14, 1918.
20 SHEETS—SHEET 2.

WITNESSES
H. Crockeron
N. E. Hillock

INVENTOR:
Elias H. Kelley
BY Cha M C Chapman,
ATTORNEY.

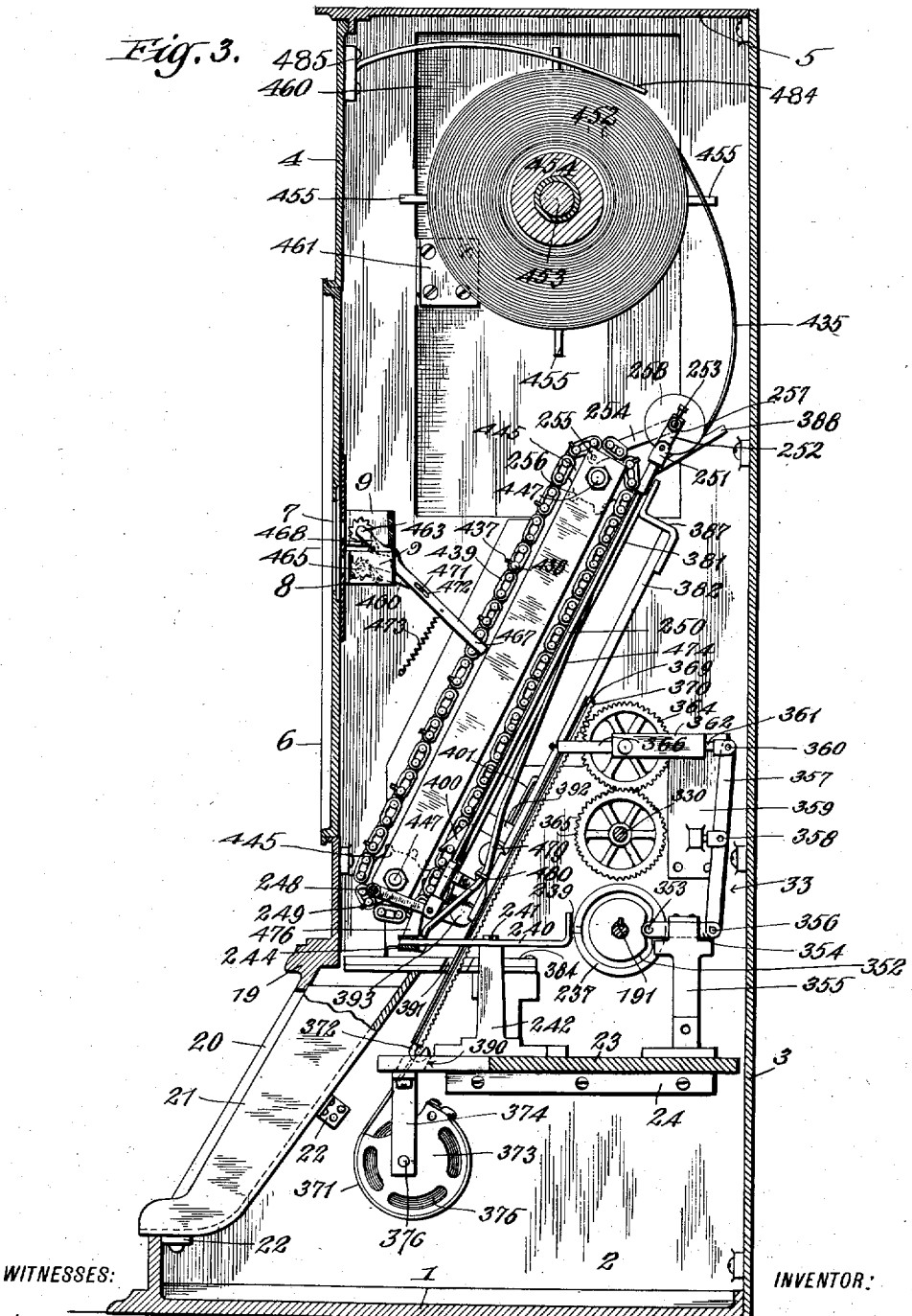

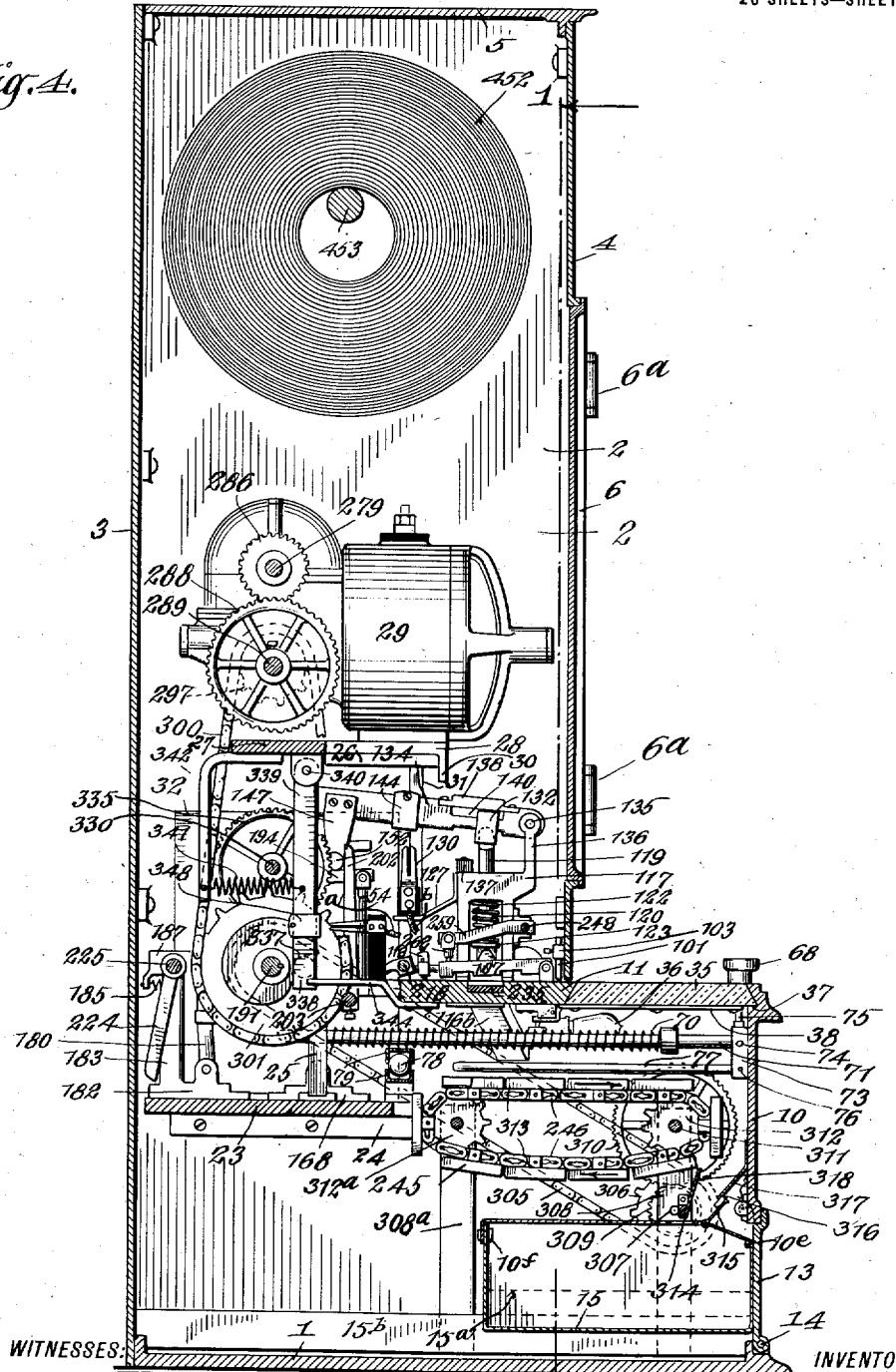

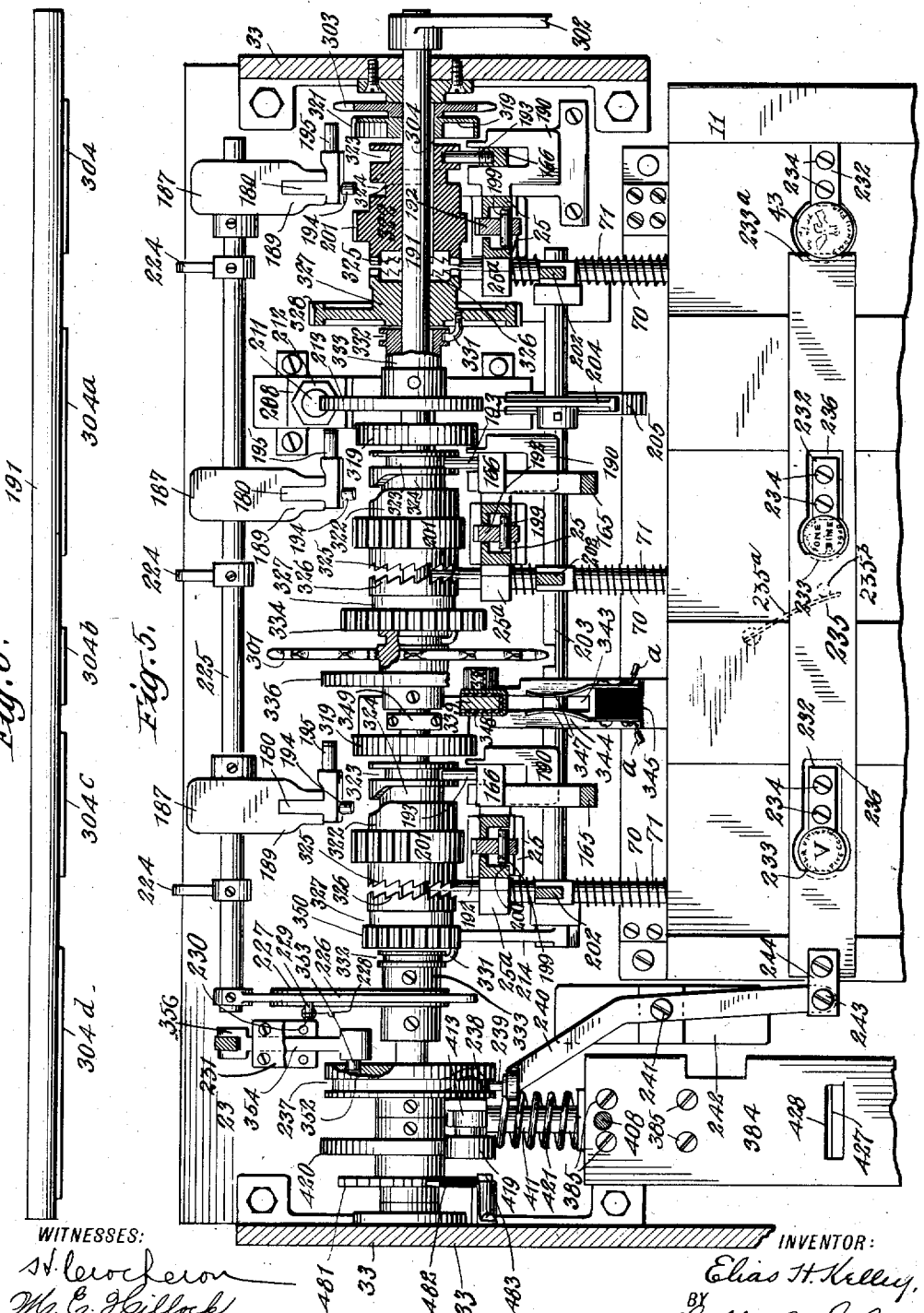

E. H. KELLEY.
VENDING MACHINE.
APPLICATION FILED DEC. 17, 1909.

1,266,021.

Patented May 14, 1918.
20 SHEETS—SHEET 6.

WITNESSES:
H. Crocheron
M. C. Hallock

INVENTOR:
Elias H. Kelley
BY Chas. M. C. Chapman,
ATTORNEY.

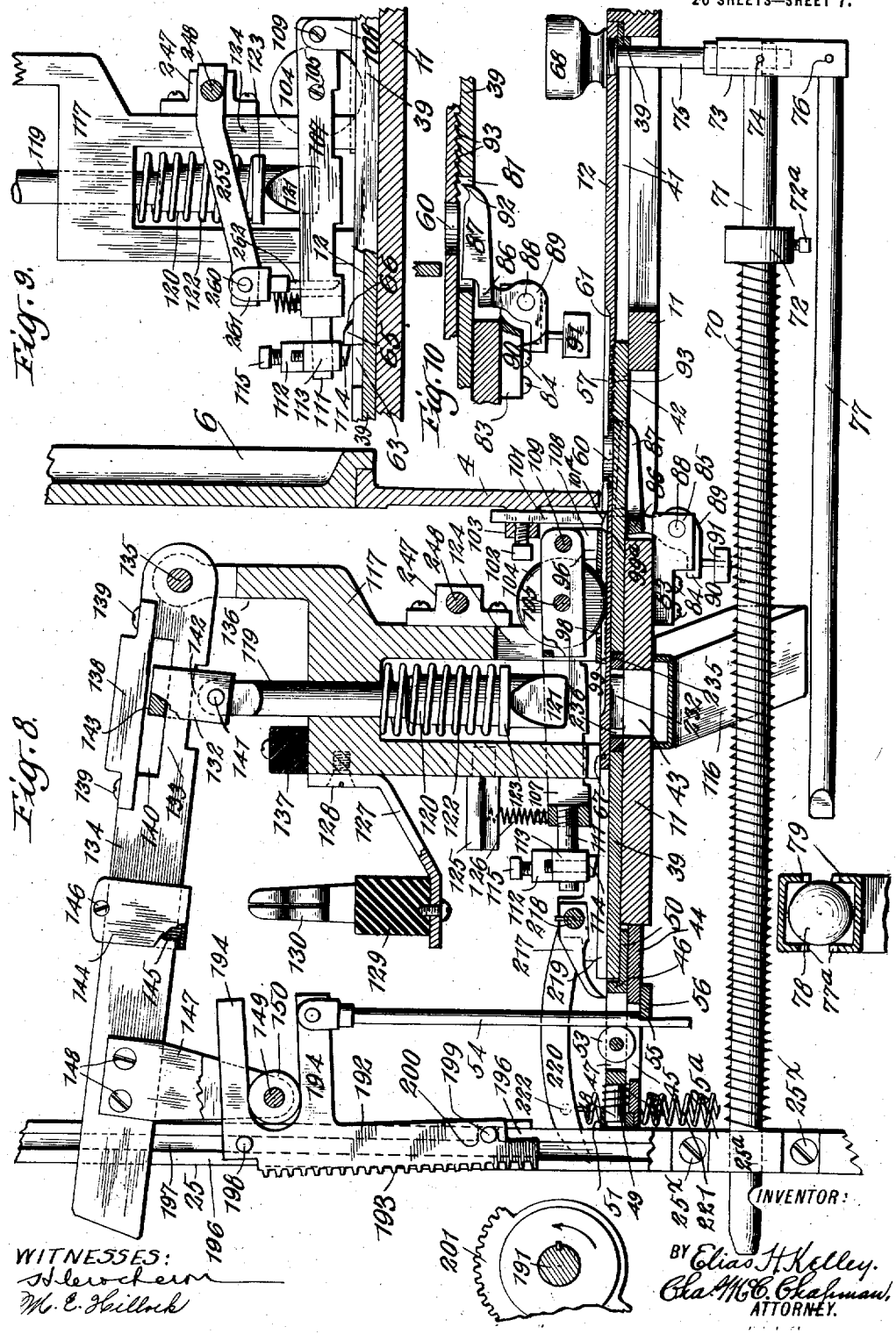

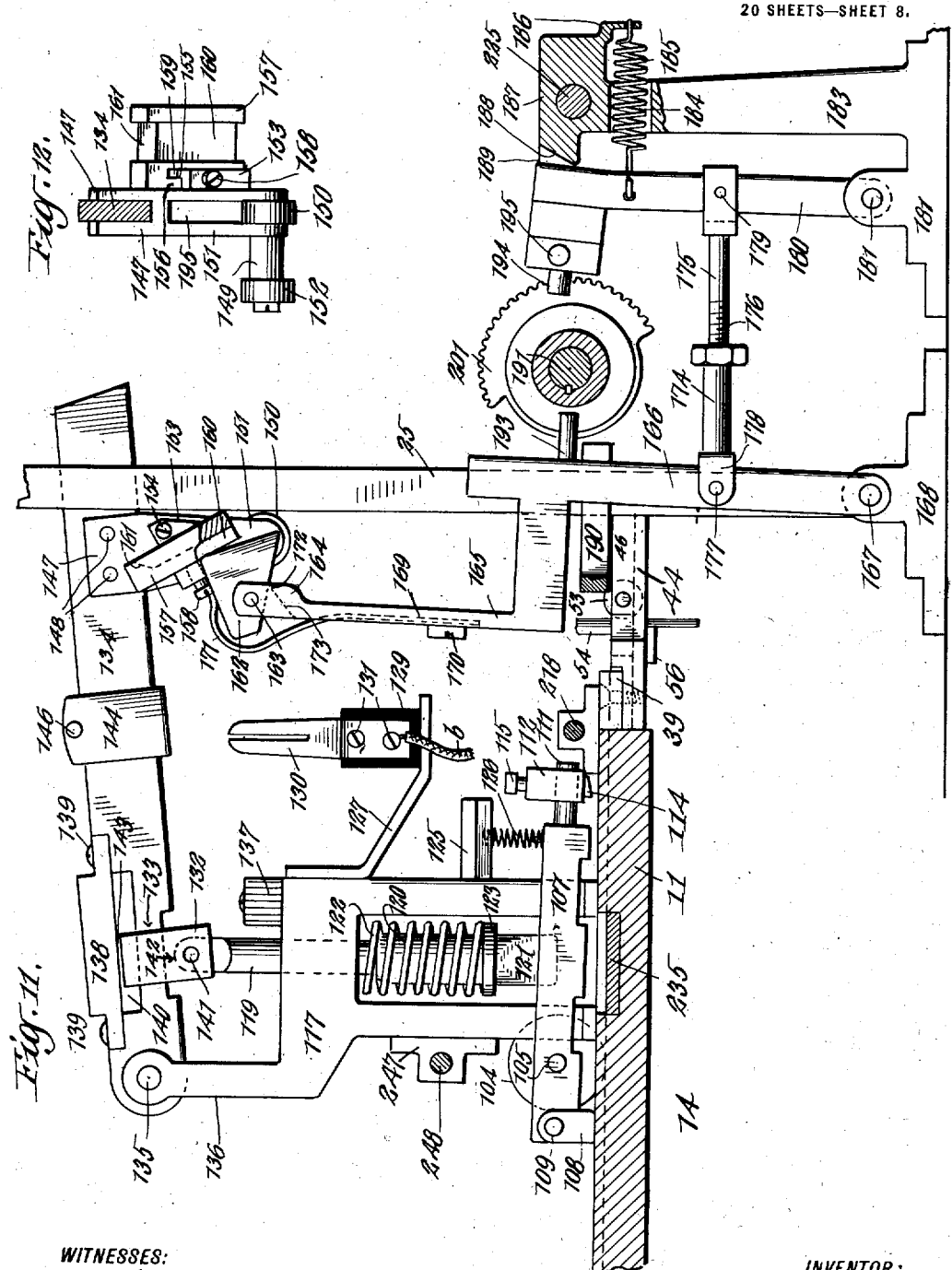

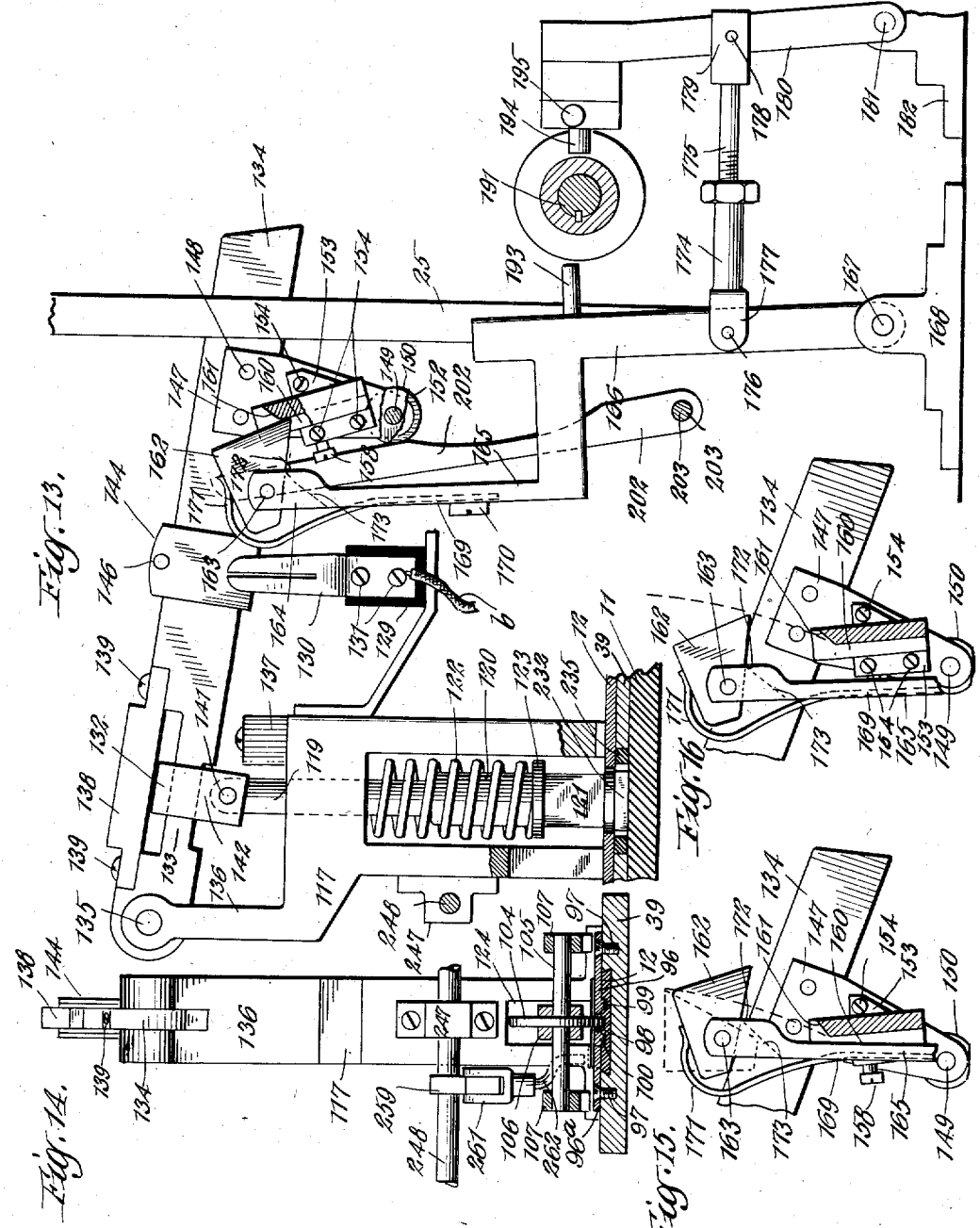

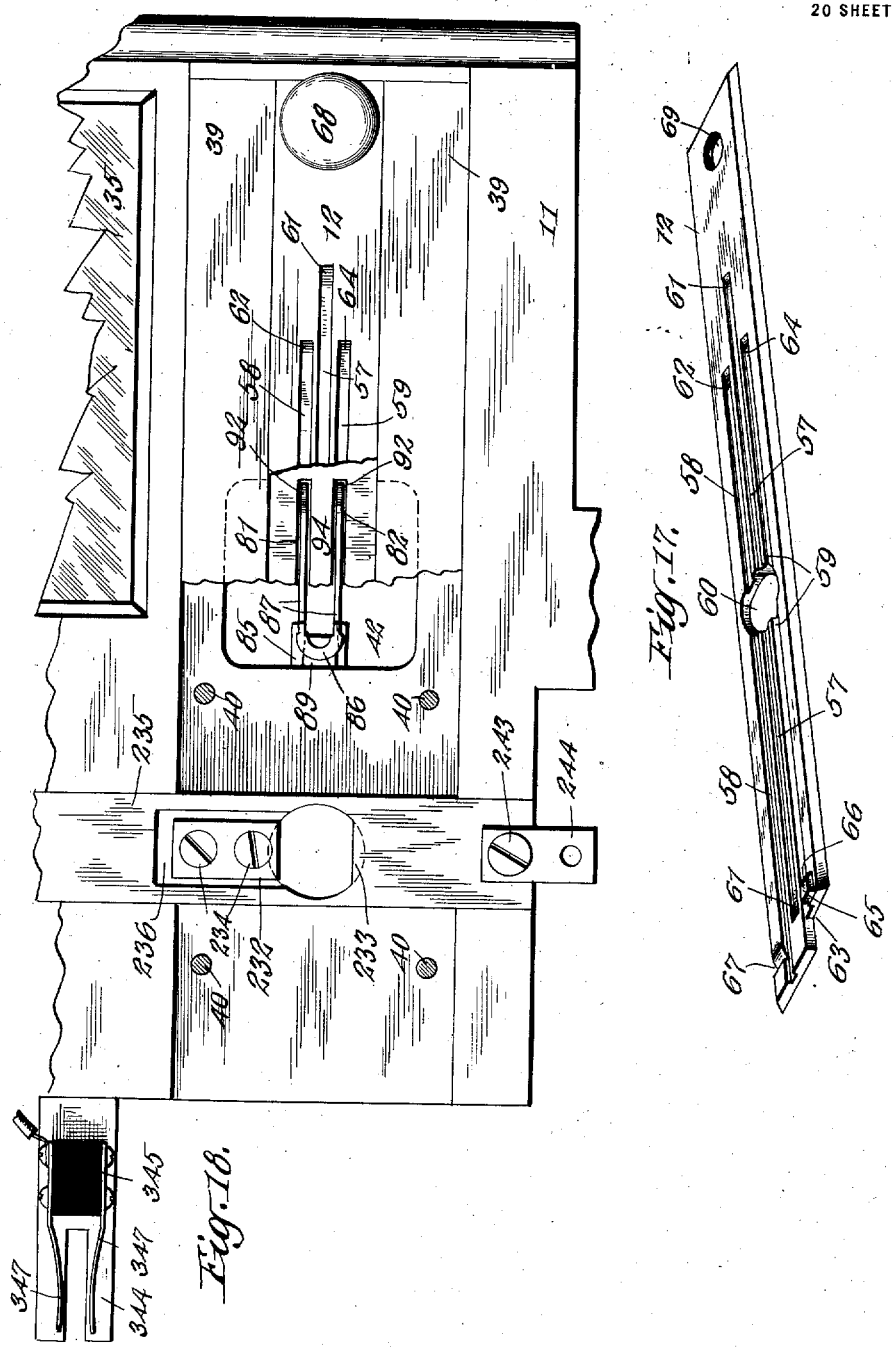

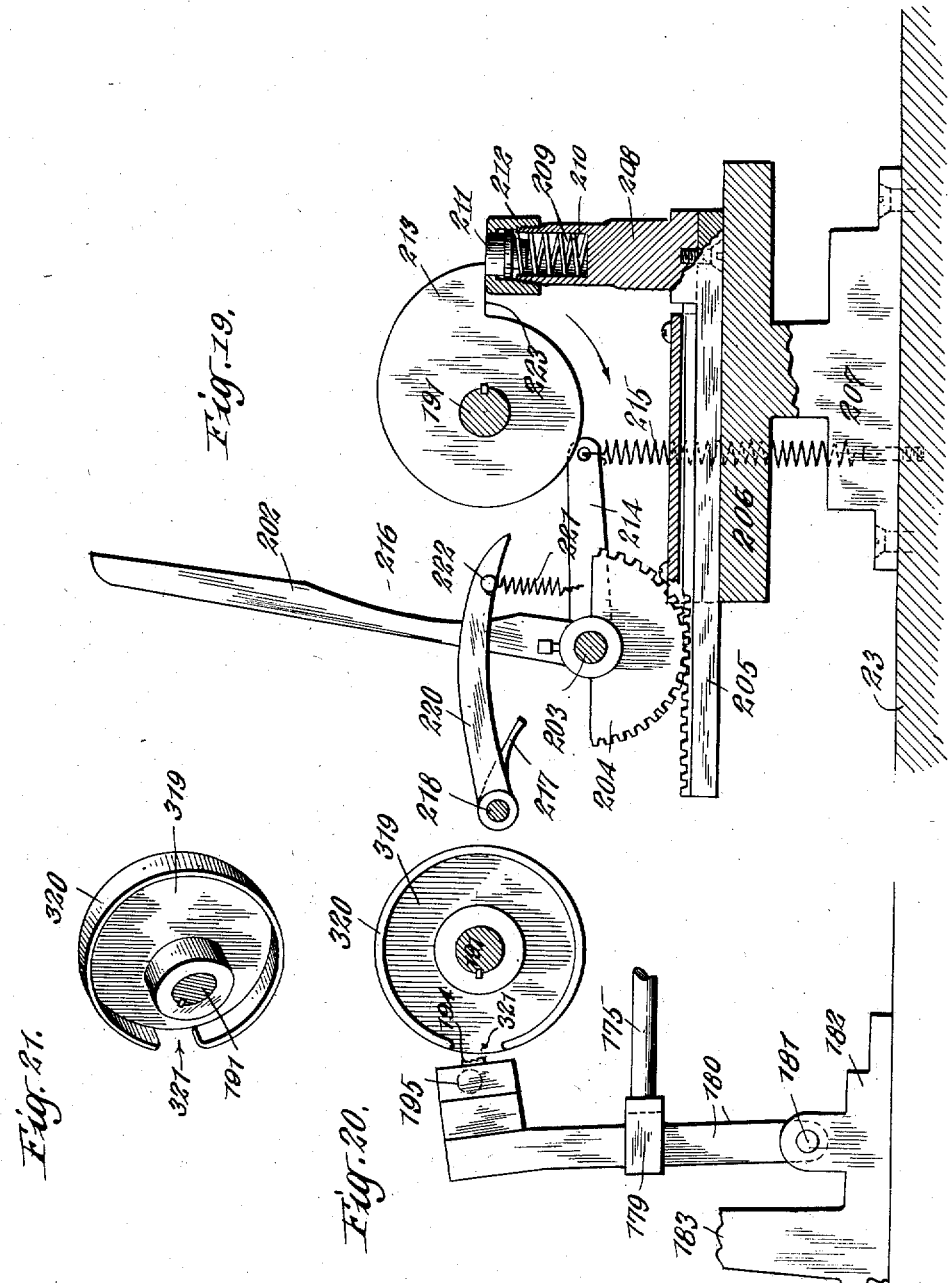

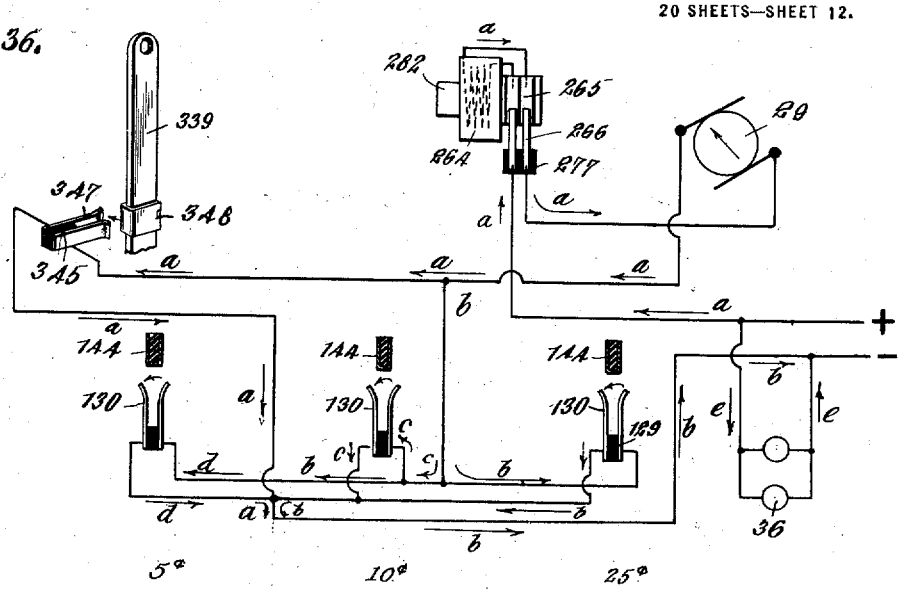
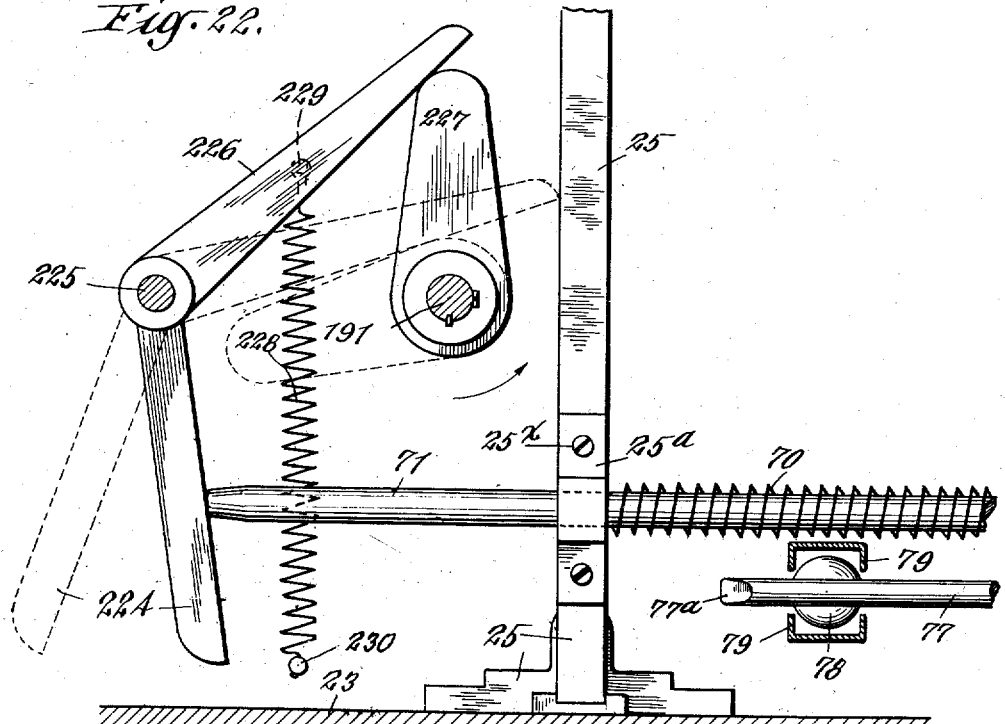

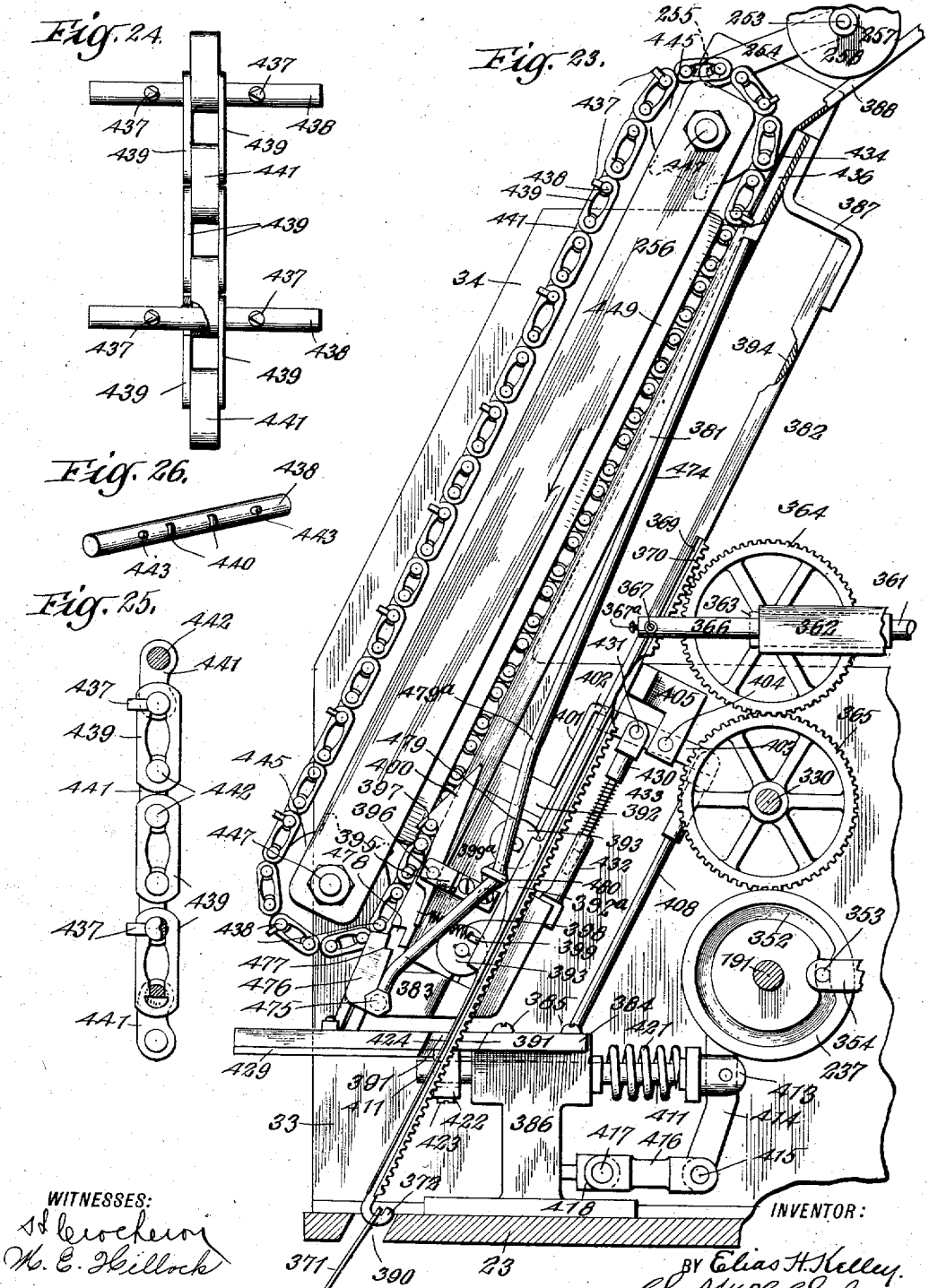

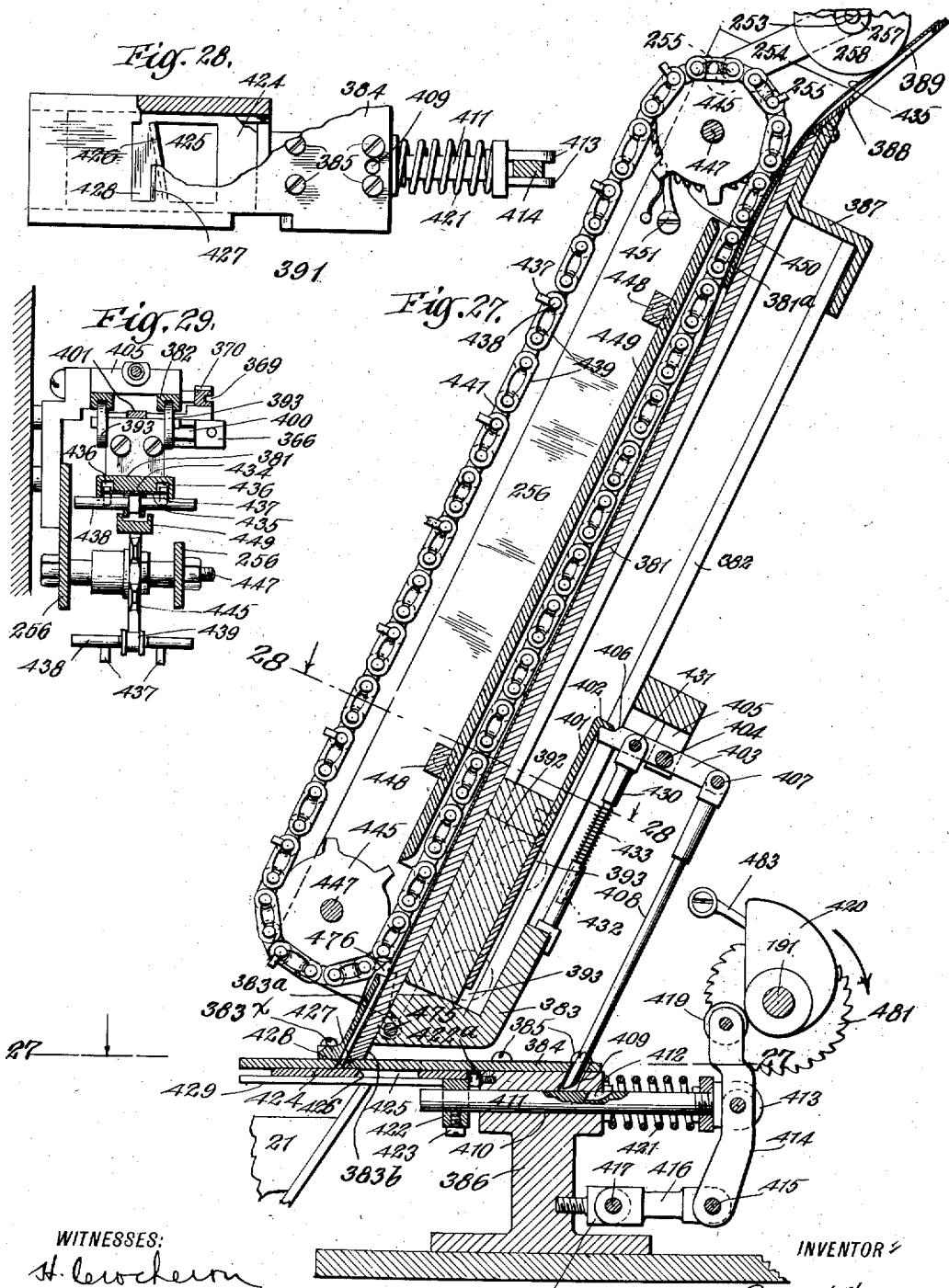

E. H. KELLEY.
VENDING MACHINE.
APPLICATION FILED DEC. 17, 1909.
1,266,021.
Patented May 14, 1918.
20 SHEETS—SHEET 15.
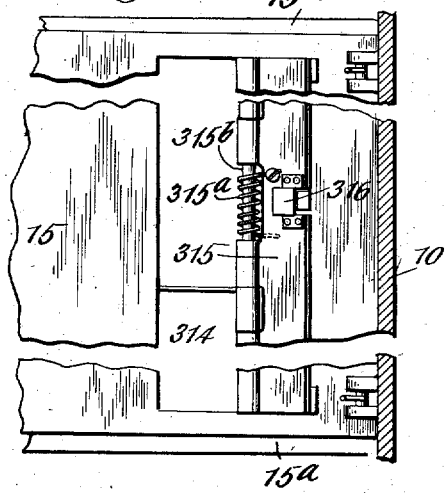
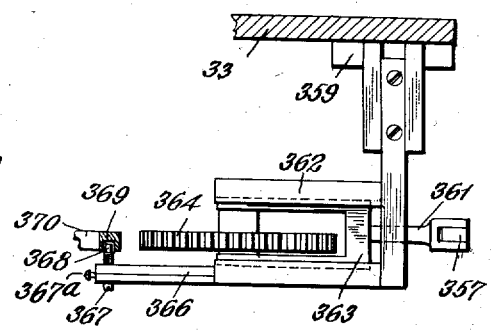
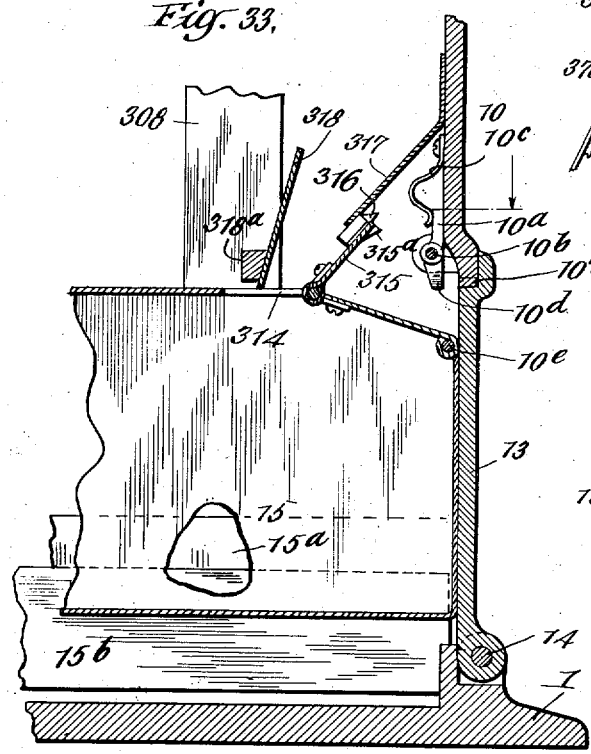
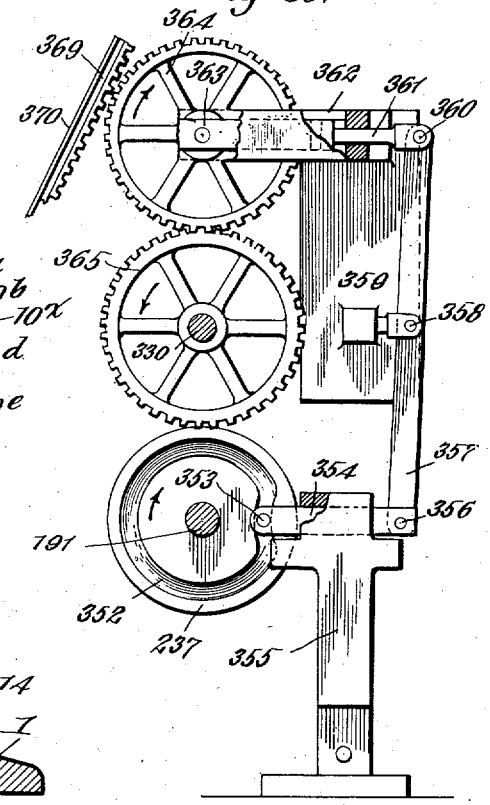
WITNESSES:
INVENTOR:
Elias H. Kelley
BY
Chas. M. C. Chapman
ATTORNEY.

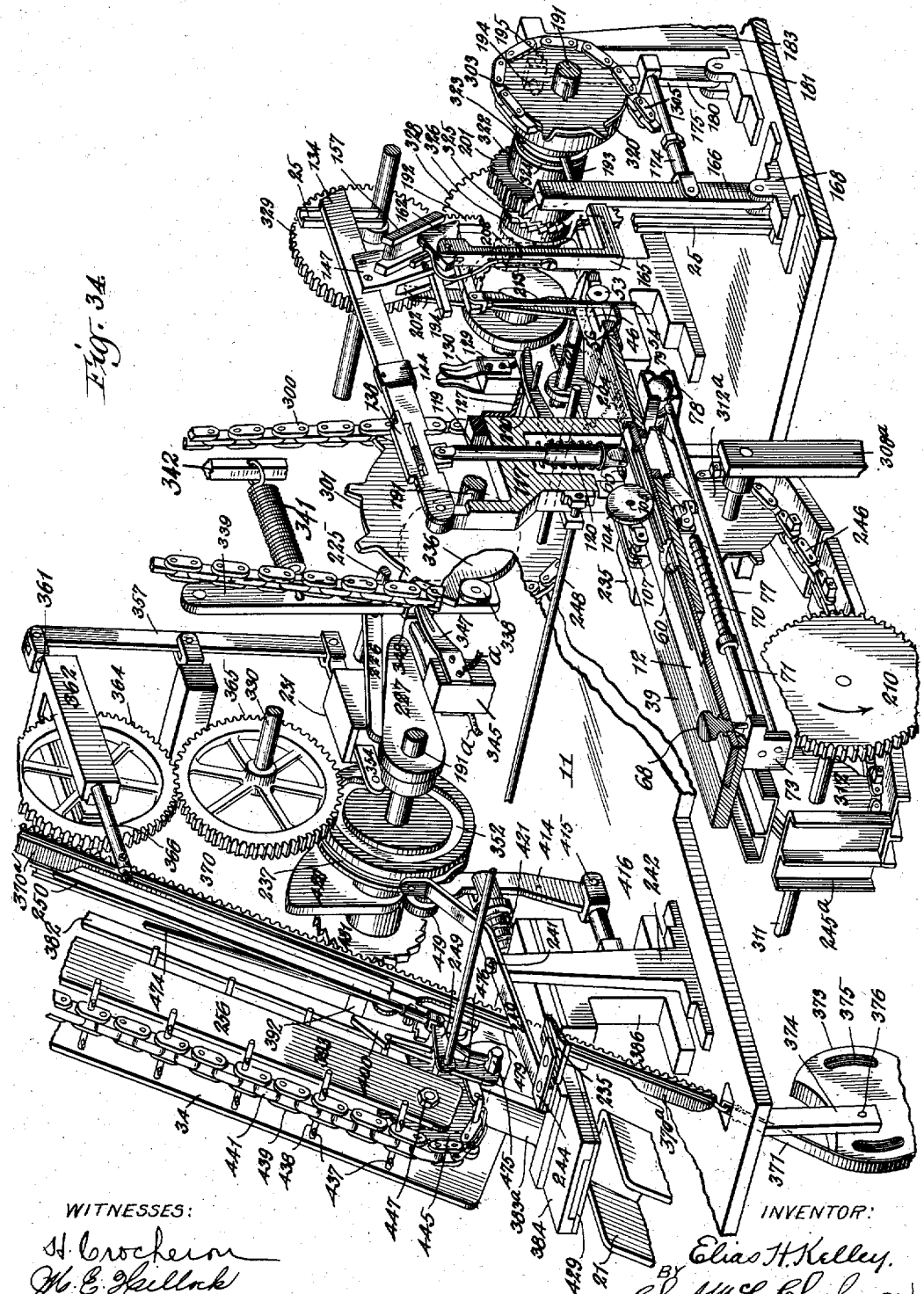

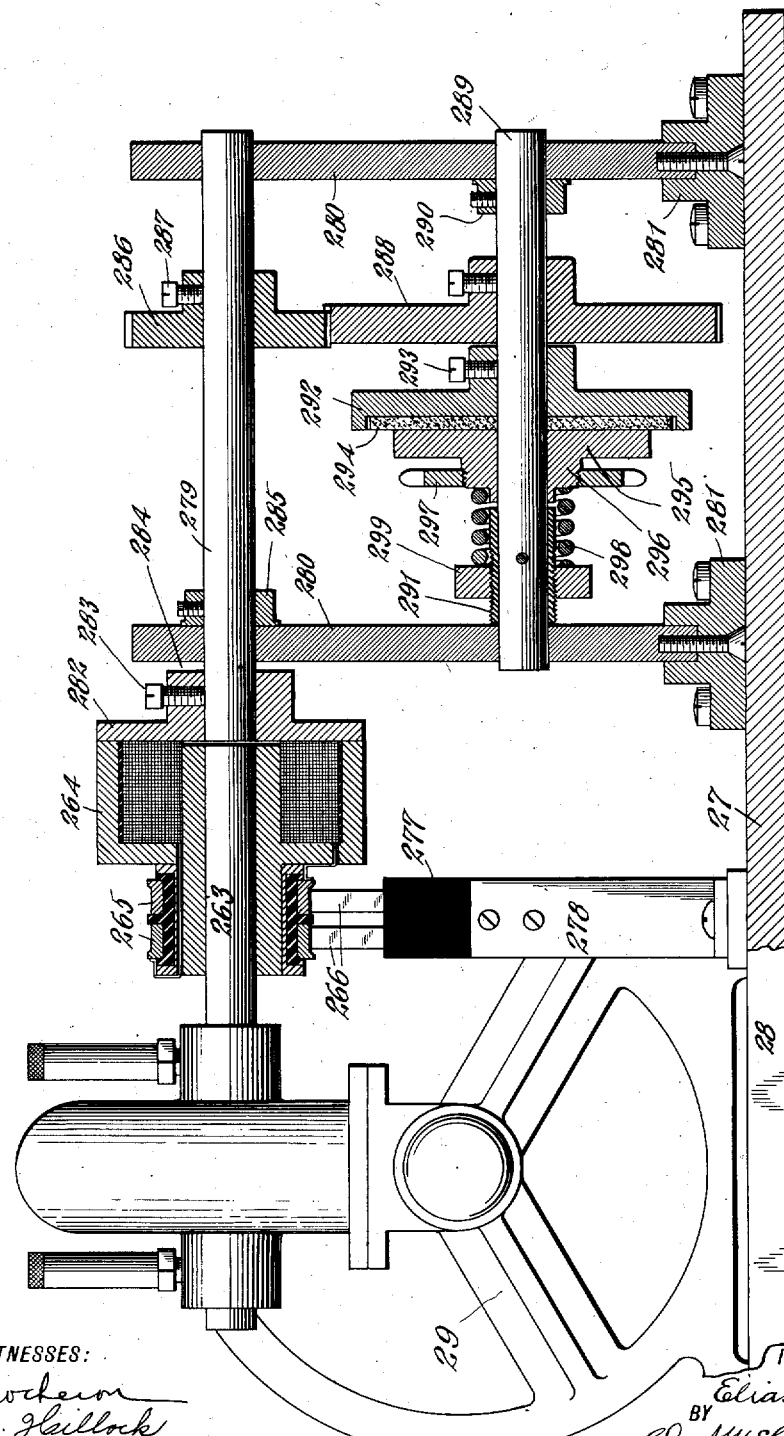

E. H. KELLEY.
VENDING MACHINE.
APPLICATION FILED DEC. 17, 1909.

1,266,021.

Patented May 14, 1918.
20 SHEETS—SHEET 18.

WITNESSES:
H. Crockeron
M. E. Hillock

INVENTOR:
Elias H. Kelley,
BY
Chas. McC. Chapman.
ATTORNEY.

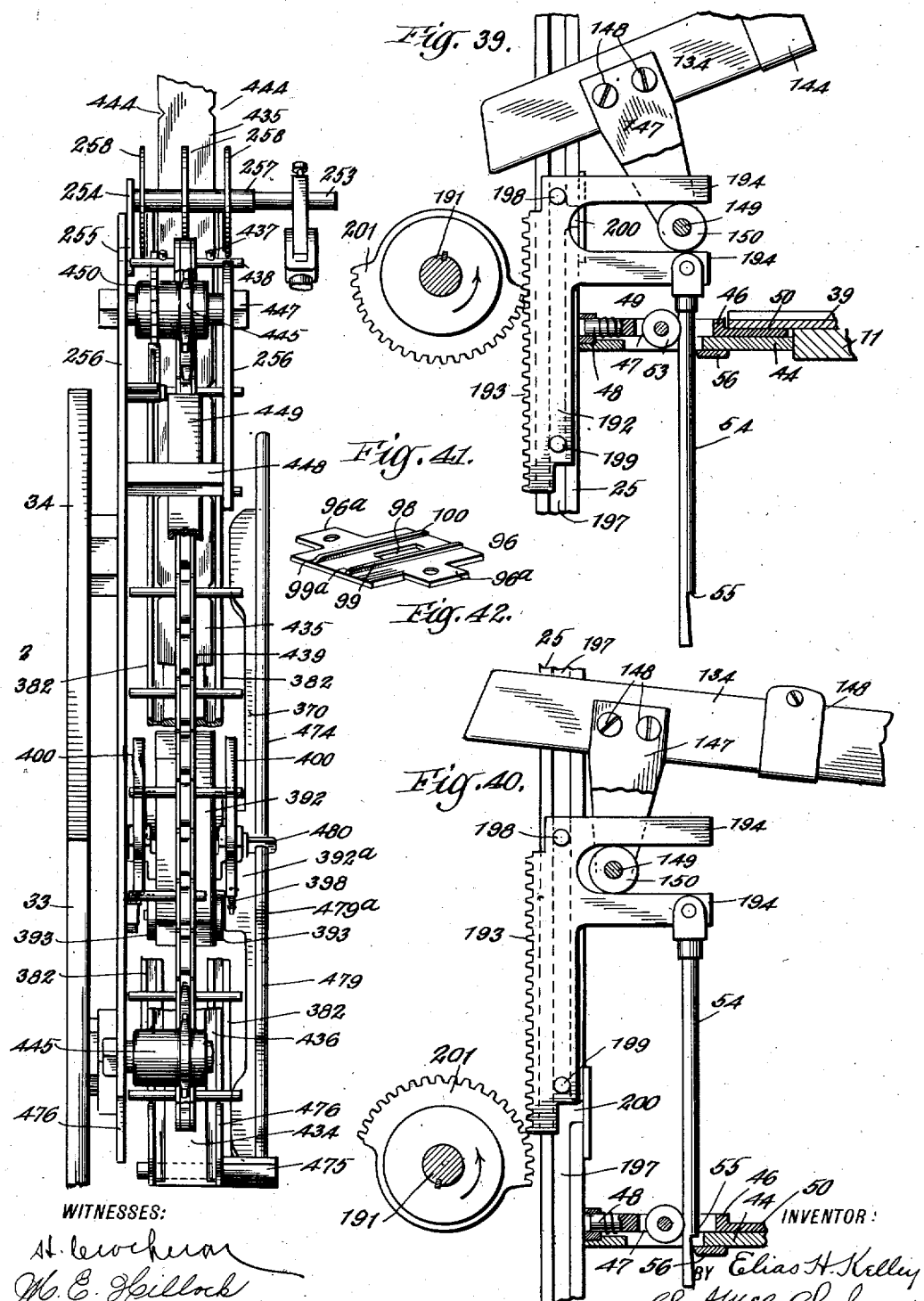

E. H. KELLEY.
VENDING MACHINE.
APPLICATION FILED DEC. 17, 1909.

1,266,021.

Patented May 14, 1918.
20 SHEETS—SHEET 20.

WITNESSES:
N. Cutcheon
M. E. Hillock

INVENTOR:
Elias H. Kelley
BY
Chas. McC. Chapman,
ATTORNEY.

UNITED STATES PATENT OFFICE.

ELIAS H. KELLEY, OF NEW YORK, N. Y.

VENDING-MACHINE.

1,266,021.     Specification of Letters Patent.     Patented May 14, 1918.

Application filed December 17, 1909. Serial No. 533,638.

*To all whom it may concern:*

Be it known that I, ELIAS H. KELLEY, a citizen of the United States, residing in the borough of Manhattan, city, county, and State of New York, have invented a new and useful Improvement in Vending-Machines, of which the following is a description.

This invention has reference to vending machines and, particularly, to machines capable of vending articles either singly or in quantities, or one, two or more successively, or in any number desired and when desired, within certain limits, according to the coin or check deposited.

Among the objects of my invention may be noted the following: to provide a vending machine capable of being operated so as to vend one or more flat articles held in webs wound in reel or cylindrical form, such as tickets, cards and envelops; to provide a coin-controlled apparatus for vending tickets or articles of a predetermined value either singly, or in quantities representing the value of a given coin; to provide a vending machine which, primarily, is check or coin controlled, but in which, after the check or coin has rendered it possible to secure deliveries from the machine, the further operations may be under control of either a motor, a manually-operated device, or a treadle; to provide a vending apparatus with means making it impossible for the machine to effect the delivery of an article with anything other than a good coin of proper thickness, or a check of predetermined character; to provide a vending machine which will prevent the delivery of a ticket or article therefrom even though the initial operation of the machine be effected through devices other than a coin or check of proper character; to provide an apparatus with means which will enable the detection of slugs, spurious coins, disks, rings and other things in form similar to a coin; to provide a vending machine with means which, though the machine may accept certain devices other than a coin, will prevent the delivery of a ticket or other article; to provide a vending apparatus with means capable of vending tickets or articles in accordance with the value of various coins, the said means being under control so that but one coin at a time can effect the delivery of a ticket or article; to provide means which will insure the deposit of a coin in the conveyer of the machine so that a coin placed in the machine and reaching a certain position cannot be recovered by the operator; to provide a check-controlled, electrically driven vending machine capable of delivering from a continuous strip as many articles as may be desired, and capable of delivering said articles either singly in succession, in any number in a continuous strip, or singly and in strips of any desired number alternatively; to provide an electrically-operated vending machine wherein the circuits are so arranged that one mechanism will start the motor to actuate the main-shaft of the machine which, in turn, will operate another mechanism to transmit the motive power as the motor-starting mechanism goes out of action; to provide an electric circuit for operating a vending machine wherein is inserted between the motor and the functional mechanism a magnetic-clutch, which absolutely prevents or absorbs shock due to excess of driving power; to provide an electrically-driven vending machine with illuminating means for exposing certain parts of the machine to public view; to provide a vending apparatus of the general character before mentioned with means for automatically registering or numbering the actual deliveries or sales; to provide a vending apparatus with means which will prevent a functional operation of the machine when it is empty, or when, for any reason, the continuity of the ticket or article to be delivered is interrupted; to provide means whereby a coin-receptacle can be placed in the machine only in open condition and which will be locked in the machine in that condition, in combination with means whereby the lid will be automatically closed and locked when the said receptacle is withdrawn from the machine; to provide means whereby a coin-box, for a vending machine, can be identified as belonging to a given machine or type of machines, thus rendering identification easy, continual defrauding impossible, and facilitating the establishment of book-keeping and checking systems; to provide a vending machine, irrespective of how driven with a "unit" mechanism capable of use for single checks or coins, and capable of multiplication to any desired extent to produce a "gang" machine operable by any number of coins or checks of any predetermined value or character; to provide a feeding mechanism for "unit" or "gang" machines capable of automatically varying its delivery operations to accord with the value of the coin or check deposited in the machine; and to provide novel elements and mechanisms and combinations of elements and mechanisms operating automatically to produce functions and groups of functions according to a given rule of action imposed thereon by the coin or check constituting the initial control.

With the above objects in view, and others which will be detailed during the course of this description, my invention consists in the elements, mechanisms, parts and features, and combinations of elements and mechanisms all as hereinafter described and claimed.

In order that my invention may be clearly understood, I have provided drawings wherein:

Fig. 3 is a vertical section taken substantially on the line 3—3 of Fig. 1;

Fig. 4 is a vertical section taken substantially on the line 4—4 of Fig. 2;

Fig. 5 is a horizontal section taken substantially on the line 5—5 of Fig. 2, the view being enlarged, the coin-slides removed, and the slide-plate being broken away;

Fig. 6 is an elevation of the driving-shaft;

Fig. 8 is an enlarged detail in longitudinal, vertical section of the coin-controlled mechanism viewing the same from the left-hand side;

Fig. 9 is a view in elevation and section of a detail of construction of the coin-controlled and slide-locking mechanism;

Fig. 10 is a partial section and elevation of a detail of the magnetic slide-controlling mechanism;

Fig. 11 is a view showing in elevation and section the coin-controlled mechanism detached and in an inoperative position;

Fig. 12 is an elevation and partial section of the clutch-controller of the coin-controlled mechanism;

Fig. 13 is a view similar to Fig. 11, but showing the mechanism in an operative position;

Fig. 14 is an end elevation and partial section looking at the left end of Fig. 13;

Figs. 15 and 16 are detail views in elevation showing the clutch-controller in different positions;

Fig. 17 is a perspective view of one of the coin-slides;

Fig. 18 is a plan view of a portion of the coin-slide and throat-plate mechanisms, parts being broken away to show details;

Fig. 19 is a sectional elevation of a detail showing the locking mechanism for the driving-shaft;

Fig. 20 is an elevation of a detail of the clutch-controlling mechanism;

Fig. 21 is a perspective view of the drum of the clutch-controlling mechanism;

Fig. 22 is an elevation of the coin-slide-retrieving mechanism;

Fig. 23 is an elevation of the main portion of the delivery mechanism;

Figs. 24, 25 and 26 are details of the feed-chain;

Fig. 27 is a view similar to Fig. 23, but showing in longitudinal section certain portions of the delivery mechanism;

Fig. 28 is a partial plan and section of a portion of the cutting mechanism on line 27—27 of Fig. 27;

Fig. 29 is a sectional view taken on the line 28—28 of Fig. 27;

Figs. 30 and 31 are details of the tripping means for the delivery mechanism;

Figs. 32 and 33 are, respectively, a plan and a sectional elevation of the coin-box mechanism;

Fig. 34 is a view showing, in perspective, a "unit" in combination with certain essentials of the machine, the view being made by breaking out duplicated "units" and disposing the essentials in close relation;

Fig. 35 is a sectional elevation of the motor and part of the transmission mechanism;

Figure 38:
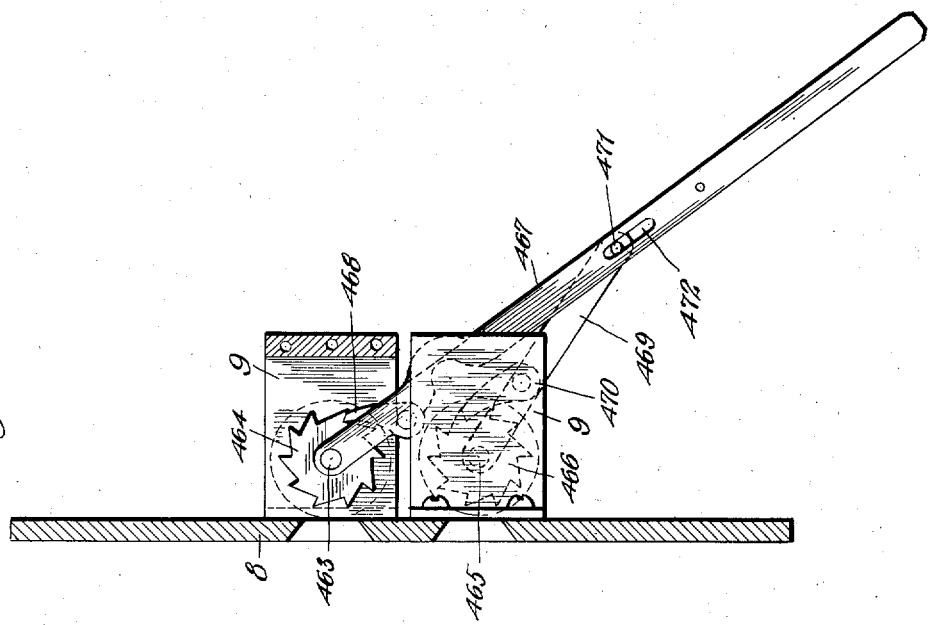
Figure 37:
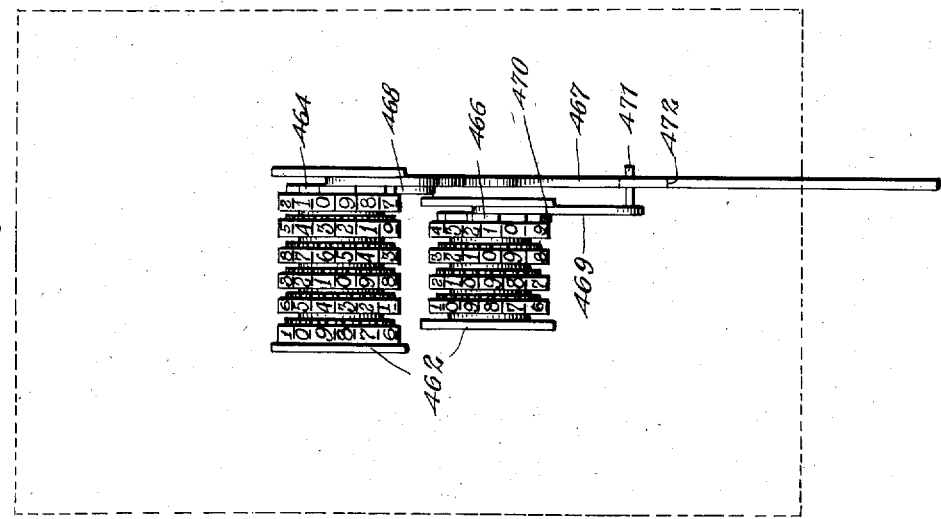
Figure 44:
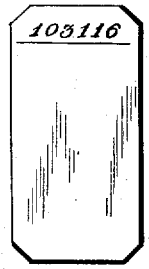
Figure 45:
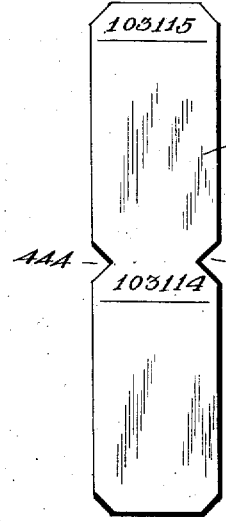
Figure 46:
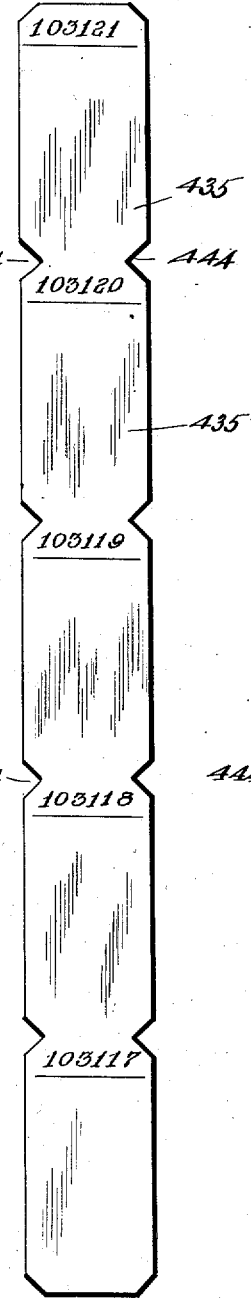
Figures 47, 48:
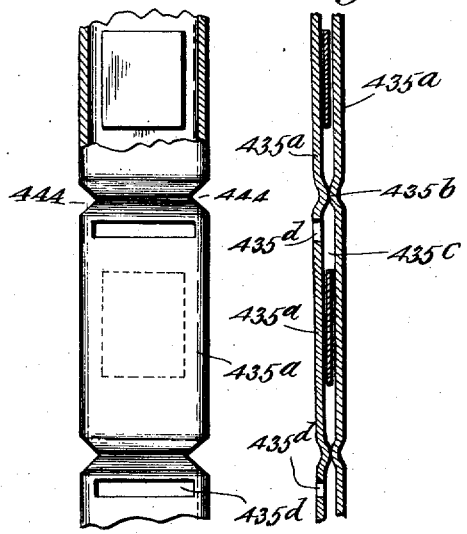

Fig. 36, Sheet 12, is a diagrammatic view of the electric circuits of the machine;

Fig. 37 is a front elevation of the counting and registering mechanism;

Fig. 38 is a side elevation and partial section of the counting and registering mechanism of Fig. 37;

Fig. 39 is an elevation and partial section of a portion of the coin-controlled mechanism, showing the tripping means in its lowermost position;

Fig. 40 is a view similar to Fig. 39 but showing the tripping means in its uppermost position;

Fig. 41 is a front elevation of a portion of the delivery mechanism;

Fig. 42 is a perspective view of the bottom of the coin-leveling plate;

Fig. 43 is a sectional elevation of the means for locking the web-cylinders on their support, Sheet 1;

Fig. 44 is a plan of a single ticket;

Fig. 45 is a plan showing two tickets as cut from a web;

Fig. 46 is a view showing five tickets as cut from a web;

Fig. 47 is a sectional plan view of a portion of an envelop-web; and

Fig. 48 is a central longitudinal section of the web shown in Fig. 47.

Primarily, it should be understood that, while I have shown herein webs of tickets such as may be used for fare on street-cars, elevated and subway trains and also webs of envelops suitable for stamps and other small, flat articles, I do not purpose confining my invention to such tickets or articles. I purpose that my invention, as herein described and claimed, shall comprehend the idea of means of vending all kinds of flat articles, packages, tubes and devices capable of being produced in flat web-form or connected to form a continuous flat strip. Furthermore, though I have shown tickets and envelops, as an example of flat articles which may be delivered from my machine, I do not purpose being limited thereto, since my invention, in its broad aspect, contemplates vending all kinds of flat articles which may be connected in series or webs. Hence, wherever I employ the term "ticket", I intend the same to be comprehensive as above stated and to include tickets, cards, packages, coupons, certificates and all articles of similar character.

Furthermore, it should be understood that, though I have shown a "gang-machine" or one made up of several sets of mechanisms and capable of vending tickets representing the coin-values of five, ten and twenty-five cents, I do not purpose being limited in any manner thereby; for, among the principal and important features of my invention is the "unit" idea of means for vending tickets. That is to say, each coin-slide mechanism constitutes a "unit" any number of which can be grouped together without duplicating the other parts essential to carrying into effect the functions of the said unit. Hence, any number of units can be grouped together in a given machine according to the desire of the user even to the extent of having a coin-slide mechanism for each and every coin in use in a given country or countries, and also to the extent of multiplying the units to accommodate all the coins of several countries. When this grouping of units is employed to make a gang-machine, it is to be understood that all the tickets delivered are fed and cut from the same strip or web in the number corresponding to the value of the coin deposited in the machine, although it is within the contemplation of my invention to operate upon, in a gang-machine such as above mentioned, a plurality of webs of tickets. In consequence, the unit idea of means is also carried into certain other of the mechanisms of my machine, such as the delivery mechanism, which is so constructed as to enable it to be duplicated to any desired extent in a gang-machine. Other mechanisms, capable of such duplication in a gang-machine and, when so duplicated, of working in common, with all others of the same structure, with the other essential mechanisms, will be referred to during the course of this description.

As will appear in the following description, certain of the mechanisms are caused to operate, or are restrained from operation, by the presence or absence of a good coin of proper thickness, and throughout this description I purpose employing the term "coin" with reference thereto; but, I desire it understood that by said term I have no intention of limiting the scope of my invention or any claim covering the same, and intend that said term shall comprehend checks, disks, or plates of any special description, except when reference is specifically made to a "good coin of proper thickness."

Referring to the drawings, Figs. 1 to 4, the numeral 1 indicates the base of the frame, 2 the opposite side-plates, 3 the back-plate, 4 the front-plate and 5 the top-plate, these parts being fitted and bolted together by coöperating ears and lugs so as to provide a rigid and strong supporting frame. The front-plate is provided with a door 6, which is hinged at 6ª, on which any desirable indicia may be placed and through which the mechanism can be reached. The door is provided with an opening 7, back of which is set a dial 8, forming part of a counting and registering device, of any approved construction modified according to my invention as will be set forth in regular order. Viewing Fig. 4, it will be seen that the lower portion of the frame extends forward of the front-plate 4 to provide a support 10 for the slide-plate 11, which may carry any number of coin-slides 12, Figs. 1 and 7, according to the use or purpose of the machine. In the front of the support 10, at its base, an opening is formed which is closed by a door 13, hinged at its bottom, as at 14, to the base of the frame, and may be provided with a spring-lock, as will be obvious. This door forms the closure for a space below the slide-plate 11, in which a coin-box 15 is supported, together with coöperating mechanism, which will be described, said box being partitioned to provide several chambers 16, 17 and 18, of varying size, for the reception of coins of different value. The details of construction of this coin-box will be further referred to. Beside the support 10, the frame is provided with a short, inclined chute-extension 19, the face of which is slotted as at 20, and behind which slot the delivery-chute 21 is supported upon the brackets 22, as shown in Fig. 3. In rear of the slide-plate 11 and below the same, a mid-plate 23 is supported upon the side-bars 24, see Figs. 3 and 4, fixed to the sides 2 of the frame, this mid-plate having the function of sustaining practically all of the driving parts of the machine, and being removable from the frame together with all the parts carried thereby. The mid-plate 23 carries several uprights 25, which sustain a plate 26, to which is secured a table 27, having a forward shelf or extension 28, on which, together with said table, an electric-motor is set provided it is desired to operate the machine by power instead of manually. The shelf 28 has a depending, strengthening rib or flange 30, and is sustained by the uprights 31, supported by the slide-plates 11. The mid-plate 23 has secured to it side journal-plates 32 and 33, the one 32 extending vertically and short of the flange 30 and the one 33 having an upwardly-inclined portion 34.

At this point it should be remembered that my machine, as now constructed and illustrated in the drawings, is a "gang-machine" and is capable of vending one, two or five articles, according to the coin deposited. In consequence, three coin-slides 12 are shown, together with all the corresponding apparatus for each slide. In other words, the coin-slide mechanism of the machine, which constitutes one of the units heretofore referred to, is arranged in triplicate and, in consequence, a description, except in certain particulars hereinafter specified, of one of the coin-slides and its complemental mechanism will provide a description for the other two coin-slides and their complemental mechanisms. Therefore, like parts of the three mechanisms will have applied thereto similar reference-characters so that the description will read alike on all of them.

Referring, particularly, to Figs. 7 to 18, the slide-plate 11, which supports all the coin-slides 12, is provided adjacent each of the latter with a transparency 35, through which, in the light of an electric bulb 36, the coin-conveyer, presently described in detail, can be seen. The transparency may consist of glass, mica, or any other suitable material and is supported in a groove 37, Fig. 4, of the portion 10 of the frame and by detachable strips or bars 38, secured to the bottom of the slide-plate 11. Said slide-plate is grooved to receive a coin-slide holder 39, which in turn is formed centrally with a dove-tailed groove providing a guide or track for the coin-slide 12 to operate in, the edges of which slide are formed correspondingly to said groove. The holder 39 may be secured to the slide-plate 11, by screws 40, or any other suitable means. The slide-plate 11 and holder 39, beneath the coin-slide 12, are each provided with a longitudinal slot 41, and in rear of said slot the slide-plate is provided with the opening 42, and, still farther in rear of said opening 42, said plate is provided with a coin-escape aperture 43.

The holder 39 at its rear end extends a distance beyond the slide-plate 11 and has secured to the bottom thereof a rearwardly-extending plate 44, in the slot 45 of which a plunger-plate 46 operates, said plate having a longitudinal slot 47 and a rearwardly-extending pin 48, surrounded by a spring 49. At its forward end, the plunger-plate is provided with a retaining-tongue 50, the shoulder between which and said plate 46 abuts against the rear end of the slide-holder 39, said tongue sliding in a groove in the top of said plate 44 and beneath said holder 39. The end of the pin 48 of the plunger-plate 46 operates in a socket-piece 51, secured by screws 52, to the end of the plate 44, said plunger-plate 46 being thus retained in the slot 45 by its pin 48 and tongue 50. Journaled in the slot 47 of the plunger-plate 46 is a grooved roller 53, which coöperates with a rod 54, the lower end of which extends through said slot 47 and is provided with a shoulder 55, Fig. 8, normally held upon the rest 56, secured to the bottom of the plate 44 and extending transversely across the slot 45 thereof, Figs. 8 and 11. The purpose of this plunger-device will be presently described. The coin-slide 12, when in normal or inoperative position, extends from the front edge of the slide-plate 11 to a point a short distance beyond the coin-escape aperture 43 of the slide-plate, as clearly shown in Fig. 8, and said coin-slide is provided with three parallel grooves 57, 58 and 59, Fig. 17, divided substantially centrally by a coin-receiving aperture 60. The central groove 57 extends from a point a short distance from the front end of said slide to near its rear end and each end of said groove is inclined, as at 61, to the surface of the slide. The groove 58 extends from the rear end of the slide to within a short distance of the front end of the groove 57, said front end of the groove being inclined to the surface of the slide, as at 62. The groove 59 extends, from the same point at the front end of the slide as the groove 58, to the rear end of the slide, which, at this side, is cut out to provide the angular recess 63. The front end of the groove 59 is also inclined to the surface of the slide, as as 64. The slide on its left side, at its rear end beside the groove 59, is provided with a lug 65, having its front face inclined, as at 66, to form a cam-surface. The rear end of the slide, on its right side beside the groove 58, is provided with a V-shaped transverse notch 67. The diameter of the coin-receiving aperture 60 will be just sufficient to admit the coin for which it is intended. The coin-slide 12 is dove-tailed into the slide-holder 39 and is moved forward in said holder manually by the knob 68, screwed into the aperture 69, at the front end of the slide. The return movement is caused by the coil-spring 70, Fig. 8, surrounding the rod 71, which may slide through the upright 25, or a guide-piece 25$^a$, secured to the side thereof by means of screws 25$^x$. The spring at the rear end bears against said upright 25 and at its front end against a collar 72, adjustable on the rod by the screw 72$^a$, for regulating the tension of the spring. The front end of the rod is secured in a block 73, by a dowel-pin 74, which block has secured in a vertical socket thereof the downwardly-extending rod 75 of the knob 68. The lower end of the block 73 has secured in it, by a dowel-pin 76, the rear end of a slide-locking rod 77, the forward free end of which is substantially wedge-shaped and adapted to slide between a series of anti-friction balls 78, carried by an angular race consisting of two, oppositely-arranged, U-shaped holders 79, separated from each other sufficiently to permit the passage of the rod 77 between them, or oppositely grooved as at 77$^a$ to permit the passage of said rod, see Fig. 1; and there being enough balls in the race to fill it from end to end, with the balls in contact, except a space which is equal to the diameter of the rod 77. The race is supported at its opposite ends upon the mid-plate 23, by means of the brackets 80, secured to the said plate and holder. This construction is specially devised to prevent, in a gang-machine, any of the other slides, than the one in which a coin has been placed, from being operated, and constitutes a positive lock against the operation of more than one slide at a time since, when one slide has been moved forward, its rod 77 inserts itself between the balls in its path of movement, pushes them aside and occupies the whole of the vacant space in the race. With this slide thus pushed in and its locking-rod 77 thus in place, no other rod can be inserted in the race between the balls, nor can two or more rods be pushed between the balls at the same time. Hence, only one coin-slide at a time can be pushed to the extreme of its rearward movement for a functional operation and all the other coin-slides will be positively locked against functional movement. The race-balls 78 have a bodily sliding movement longitudinally of and a rotary movement in said race and move with great facility in said race in the absence of a locking-rod; but, soon as a rod has become inserted in said race the balls become positively locked one against the other and against the end-walls of the race though yielding anti-frictionally to the passage, in and out of the race, of the said locking-rod. This is an important feature of my invention in gang-machines since it prevents "jamming" of the machine and also avoids all possibility of a double delivery for a coin deposited in one slide. Hence, I desire to lay stress upon this locking means both with reference to its importance in my machine, as shown in the drawings, and in its aspect of a mechanical device in the abstract capable of use in, or in connection with, apparatus in various mechanical arts.

The coin-slide holder 39, directly beneath the slots of the coin-slide, is provided with two parallel slots 81 and 82, which register, respectively, with the position of the grooves 58 and 59 in the coin-slide, said slots extending substantially the length of the opening 42 in the slide-plate. To the bottom of the slide-plate a bifurcated bracket 83 is secured by means of screws 84, said bracket having pivotally secured between its arms 85 a horse shoe magnet 86, the arms 87 of which extend into the opening 42 in the slide-plate and operate through the slots 81 and 82 in the slide-holder 39. The pivot 88 extends through the angular, depending portion 89 of the magnet and through the arms 85 of the bracket 83, and said angular portion 89 extends rearwardly below its pivot as at 90 and has a weight 91 secured to the latter portion. This construction gives the magnet a bell-crank form; and the weight 91 and magnet-arms 87 are so proportioned as to balance perfectly with said arms normally in a substantially horizontal position. The arms of the magnet are upturned and edged at their front ends so as to form pawls 92, which coöperate with the ratchet-teeth 93, formed on the bottom of the coin-slide 12, just in front of the coin-receiving aperture 60. Between the slots 81 and 82, the central bar 94 of the slide-holder lies directly beneath the center of the coin-receiving aperture 60, and on opposite sides of said bar the said aperture extends over a portion of the surface of said holder 39, as at 95. Hence, the coin, placed in the slide 12, will rest in said aperture 60 upon said side-portions 95 and central bar 94, and will be held with its top surface substantially flush with the top surface of the coin-slide and with its bottom surface exposed to the magnet. As shown in Figs. 8 and 9, the upturned ends 92 extend beyond said coin-aperture and upwardly in readiness to engage the ratchet-teeth in the bottom of the coin-slide should the coin placed in the said slide be composed of a metal capable of attracting said magnet. By reference to Fig. 8, it will be seen that the coin-aperture 60 is disposed but a short distance in front of the face-plate 4 of the frame and this distance is gaged with reference to the convenience of the operator in placing a coin in the aperture. Also, it will be seen that the ratchet-teeth 93 are comparatively fine and numerous and extend a distance forward from the front of aperture 60 considerably greater than the distance from the front of said aperture to said face-plate 4. Hence, should attempt be made to push in the slide and place a magnetic coin in the aperture just before the latter reaches a position where a coin could not be so placed, the ends 92 of the magnet-arms would nevertheless engage the ratchet-teeth. Therefore, one having knowledge of the presence of the magnet cannot defraud the machine because the ratchet-teeth will always be in position to coöperate with the magnet as long as the coin-aperture is in position to receive a coin. Should the magnet be attracted as just suggested, its forward ends would lock the coin-slide against inward or rearward movement, thus completely blocking such an attempt to defraud the machine. This structure is also important since, if a magnetic coin be used, of a form and size capable of operating the machine and of a tensile strength capable of withstanding other tests of the machine, its very character would operate to lock the slide and machine against operation. The fineness of the teeth also prevent joggling the slide so as to gradually force the same inwardly with the coin therein. Hence, the magnet is a positive slide-lock.

A device for preventing the coin from tilting in the coin-slide is carried by the coin-slide holder 39 and operates in conjunction with the coin-slide just described. It consists of a plate 96, Figs. 7, 8, 14 and 42, having opposite lateral extensions 96ª, at rest on opposite sides of and secured to the coin-slide holder 39, by means of screws 97, passing through said plate into the said holder, said plate being provided centrally with a longitudinal slot 98 and, on opposite sides of said slot, with longitudinal depending-ribs 99 and 100, which enter, respectively, the groves 58 and 59 of the coin-slide and have their forward ends upwardly curved at 99ª, so as to freely admit the edge of the coin thereunder. The slot 98 registers with the central groove 57 of the coin-slide. The location of this plate 96 is in rear of the coin-receiving aperture 60 and a short distance in rear of the face-plate 4 of the frame. It extends rearwardly substantially to the coin-escape aperture 43 of the slide-plate 11, Fig. 8, and the ribs 99 and 100 extend to substantially the bottom of the grooves 58 and 59, which latter are in depth sufficient to have their bottom surface substantially flush with the surface of a coin inserted in the coin-aperture 60, the thickness of said slides below the bottom of said grooves being substantially that of the coin. Thus, with the coin in place in the coin-slide, it will be prevented from being tilted relatively to the slide, as the latter is moved forward, since the edge of the coin will slide freely under the ribs of the plate and will be properly presented to a coin-gage and detector which will be presently described. This anti-coin-tilting plate is an important feature of my invention since, by preventing the coin from tilting in the coin-aperture 60, said coin will be properly passed forward to undergo certain tests presently described, and said plate 96 acts positively to depress, if necessary, the coin in its slide and hold it therein.

As a preliminary detector, I have provided a thick-coin detector, or means for preventing a coin, having a greater thickness than the proper thickness of a good coin, from being pushed into the machine by the slide. This means consists of a depending-finger 101, fixed by means of the screw 102, in the lug 103, projecting rearwardly from the inside of the face-plate 4 of the frame, the said finger extending into the central groove 57 of the coin-slide the proper distance and operating to hinder the passage of a coin which is too thick. The holding-screw 102 also permits vertical adjustment of said finger to a nicety so as to enable its lower end to be set just right for the accurate performance of its function as described. The proper and accurate adjustment of the finger 101 is aided by beveling the functional end thereof as indicated at 101ª, viz., rearwardly and upwardly; that is to say, with a front edge only in coöperative relation to the groove 57 of the coin-slide the position of the finger can be set without fear of any portion in rear of said edge interfering with the coin.

Should the thickness of the coin inserted in the coin-aperture 60 be less than that of a good coin, thus enabling the coin to pass the finger 101, I have provided gaging-means controlled by the coin and operating directly upon the slide to prevent the latter from being pushed in to operate the machine. This thin coin-detector consists, see Figs. 7, 8 and 14, of the anti-friction roll 104, having its journal 105, extending through its carrier 106, and into the side-bars 107 of a truck, the front ends of which side-bars extend between lugs 108, fixed to the opposite sides of the coin-slide holder 39, and journaled in said lugs by means of the pin 109, on which is also journaled the rear end of the carrier 106. The rear or cross-bar 110 of the truck has extending from it a pin 111, which is screwed thereinto and which pin carries a stop-device 112, having a laterally-extending portion 113, through which extends vertically a stop-pin 114, the lower end of which is beveled rearwardly and upwardly and which pin may be adjusted vertically by threading the same into the portion 113, as clearly indicated in Fig. 8. The stop-device 112 is adjustable on the pin 111, both circumferentially and longitudinally, by means of the screw 115, passing through said device and engaging said pin. The laterally-extending portion 113 disposes its pin 114, with its lower beveled end, directly in line with the lug 65, on the rear end of the coin-slide 12, so that, if a coin disposed in the coin-slide be thinner than a good coin, and should pass the thick-coin finger 101, and thus pass under the roll 104, the latter will not be lifted, or not sufficiently lifted, and, consequently, the truck will not be lifted, thus leaving the pin 114, with its beveled end, directly in the path of the lug 65, which will completely stop the progress of the coin-slide rearwardly. If, however, the coin disposed in the coin-slide be of the same thickness as a good coin, it will pass the finger 101, the plate 96, and the roll 104, and lift the latter together with its truck and thus lift the stop-device 112, which will carry its stop-pin 114 out of the path of the cam-lug 65, on the coin-slide, and thus allow the coin to reach a position above the coin-escape aperture 43, preparatory to being passed therethrough into the chute 116, lying directly beneath the same. By beveling the pin 114, as shown, the return of the slide to normal position is permitted without hindrance from said pin, since the cam-face 66, of the lug 65, and the beveled end of the pin 114, will coöperate to lift the truck and stop-device.

Figure 7:
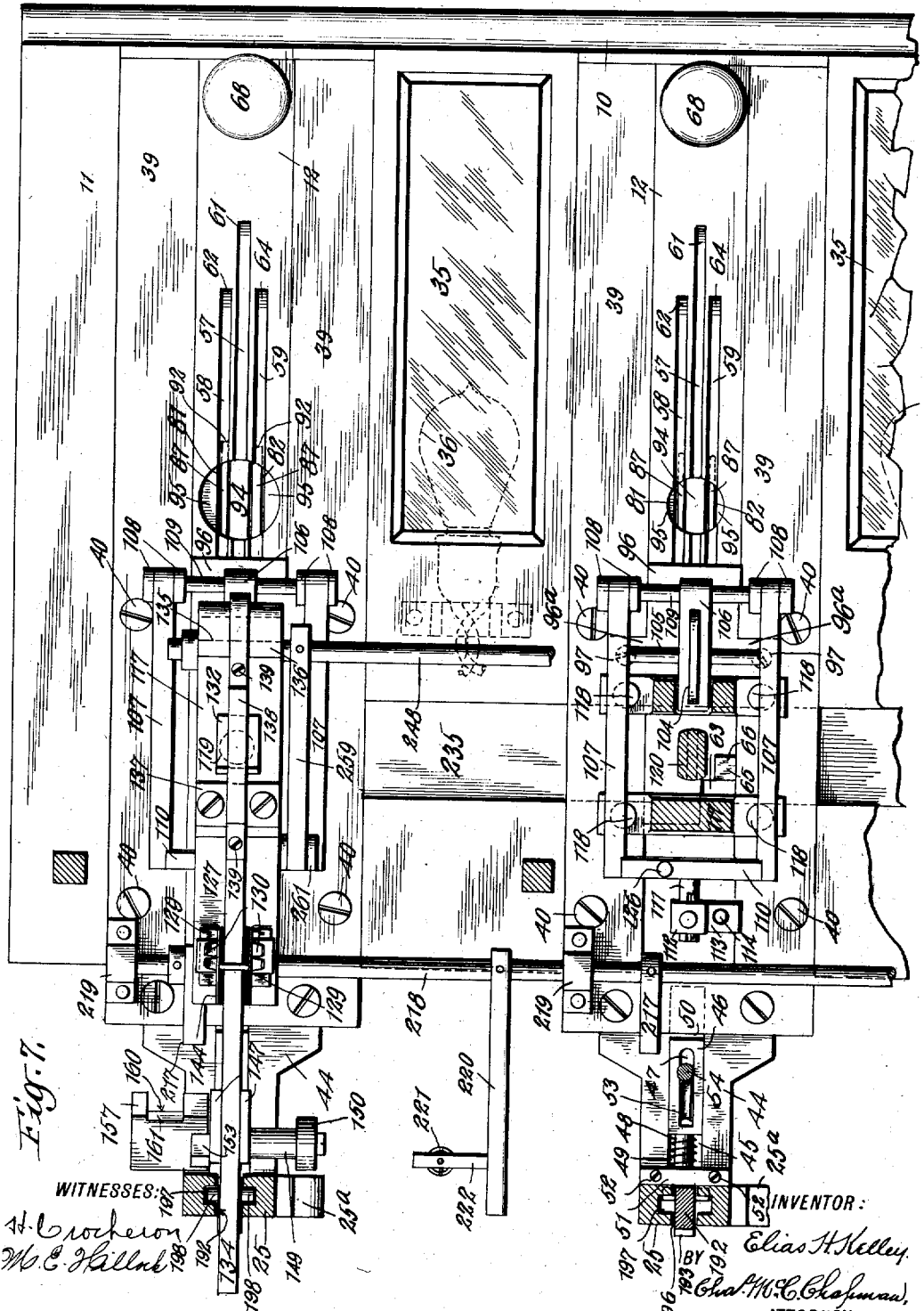
Fig. 7 is a plan view of two of the slide mechanisms showing certain features of the coin-detecting mechanism, parts being in section and a portion being broken away.

The standard 117 is secured to the coin-slide holder by means of screws, rivets, or other suitable means indicated by 118, Fig. 7, and is bored, see Fig. 8, to receive a ram consisting of the spindle 119, having its lower end enlarged, as at 120, and the lower end of the enlargement shaped to provide an edge 121, for engaging the coin in the coin-slide. The ram is normally depressed by means of a very strong expansion-spring 122, coiled about the spindle 119, and having one end engaging the standard 117 and the other end engaging an enlargement 123 on the spindle. The standard 117 is recessed at 124, to receive, and permit movement of, the rear end of the carrier 106. The standard 117 also carries a rearwardly extending lug 125, recessed to receive the upper end of a coiled-spring 126, the lower end of which engages the rear bar 110 of the truck 107, and encircles a pin thereon and thus normally keeps the truck depressed with its stop-device in position such that the pin 114 of the latter will either stop or permit the passage of the coin-slide, as previously indicated. The spring 126 is light and aids gravity in one direction, but does not materially impede the raising of the truck. The periphery of the roller 104 is rounded or U-shaped, as shown in Fig. 8, or may be flat, as shown in Fig. 14, these shapes given to the periphery of the roller being in contradistinction to a V-shaped edge or periphery, since the function of the roller is to feel and sensitively gage a coin as it passes thereunder and not to mark, score or impede the progress of the coin. For the same reason the spring 126 is made very light so as not to impose upon the coin, through the roller, an excessive pressure. This is an important point, since the more sensitive the gage is the less impediment it will interpose to the passage of the coin-slide, which, for this gaging operation, should be permitted to move freely.

If the forward end of the coin-slide reaches the tripping-rod 54, the coin will have passed the magnet, thick-coin detector 101, anti-coin-tilting plate 96, and thin-coin detector 104, and will have reached the position of the coin-escape opening 43. In this position, the coin undergoes a test for tensile strength imposed upon it by the ram-head 121, working in the standard 117, which also carries the bracket 127, the free end of which has fixed to it an insulating-block 129, to which electrical spring-contacts 130 are secured by means of screws 131, Fig. 13. The upper end of the spindle 119 is pivotally connected to a V-shaped sliding-shoe 132, which embraces the bar 133, of a tripping-lever 134, fulcrumed at 135 to a forked extension 136, of the standard 117. A fiber buffer 137 is secured to the top of the standard to cushion the fall of the lever 134, when it is tripped into action to permit the ram 119 to descend and impart a powerful blow to the coin. At this point it is important to note that there is a clearance between the top of the ram 119 and the bottom of the lever 134 sufficient to prevent said ram and lever having engagement at any time, while a clearance between the sliding-shoe 132 and the cap-plate 138, of said lever, is provided for the purpose of permitting the proper relative movement between the two without binding and to hold the said lever in a fixed position when the ram has been stopped in its movement by the coin, as shown in Fig. 13. This fixed position is important in the operation of the machine since upon it a number of other important operations depend, resulting from structure to be presently described. For purposes of assembling, the cap-plate 138 is made detachable and secured to the lever 134, by means of screws 139, leaving between them a slot 140, for the reception of the slide 132. The spindle 119 is pivoted at 141, between the arms of said slide, there being between the upper end of said spindle and the lower edge of the lever 134 a substantial clearance indicated by 142, and between the upper surface of the slide 132 and the bottom surface of the cap-plate 138, the clearance 143, Figs. 8 and 11, as before mentioned. It will be noted, viewing Figs. 8, 11 and 13, that the slide 132 pivots on the spindle 119, and slides on and relatively to the lever, the sliding motion being a reciprocation along the bar 133, this relative movement of the lever and slide compensating for the difference in position of the several parts at different times during the operation of the machine. The lever 134, midway between its ends, is provided with an electrical contact-device 144, insulated from the lever as at 145, Fig. 8, by any suitable means, the said contact-device being clamped upon the lever by means of the screw 146. This device forms the electrical connection between the two spring-contacts 130, when the lever is in the position shown in Fig. 13. The outer end of said lever 134 is provided with the forked bearing 147, fixed thereto by means of screws 148, and carrying at its lower end the journal 149, carrying the anti-friction roll 150, between the arms 151 of the bearing, and the anti-friction roll 152, at one side of said arm, the said journal being extended laterally from the latter for the purpose. The bearing 147 is provided on its right side with an adjustable cam-device comprising the supporting-plate 153, secured to said bearing by means of screws 154, said plate having a groove 155, extending longitudinally thereof for the reception of one leg 156 of the cam-block 157, said block being adjustable relatively to said plate by means of the screw 158, passing through said plate and engaging the leg 156 of said block, the groove 159, formed between said leg and the body of the block, permitting such adjustment. The block is provided with a longitudinal groove 160, extending its entire length, but the material of the bottom of the groove at its top is beveled as at 161 toward the rear of said block. This structure provides an adjustable cam, but the arrangement of the device on and relatively to the bearing 147 is the most important factor in causing the same to perform its functions in coöperation with the spring-controlled cap-piece 162, pivoted at 163 in the forked upper end 164 of the angular-arm 165 of the lever 166, fulcrumed at 167 to the bracket 168, secured to the mid-plate 23. The arm 165 is grooved in its face for the reception of the end of a spring 169, clamped thereto by the screw 170, the upper end of the spring being curved rearwardly as at 171, and having its free end bearing upon the top of the cap-piece 162, thus maintaining control of the latter. The movement of the cap-piece is limited in one direction by the crotch 172 of the forked upper end 164 of the arm 165, and in the opposite direction by the inclined surface 173 of the said crotch. The coöperation of the cap-piece 162 and cam-block 157 is such that the cap-piece will travel in the groove 160 of said block and, according to the relation of such parts, the machine will either stop or continue to perform its functions; that is to say, if the conditions are right in the machine, viz., a good coin of proper thickness being in the coin-slide, the cam-block will stop before reaching its lower limit, see Fig. 13, and have a certain coöperative and functional relation to the cap-piece and hold the lever and connected parts in a certain operative position, then said coin-block will descend to its lower limit and lose its coöperative relation with the cap-piece, whereupon the arm carrying the cap-piece will assume a predetermined position out of the path of movement of said cam-block, and the latter will then rise to its normal inoperative position. The functions of these movements will be presently described, but it should be noted that the cap-piece has a yielding action in both directions of movement within certain limits.

The lever 166 has a connecting-rod pivotally secured to it, said rod being composed of two parts 174 and 175, adjustable one within the other by a screw-threaded connection, the pivotal connection being by a pin 176, passing through the bifurcated end 177 of the rod and through said lever. A jam-nut holds any adjustment made. The other end of the rod is pivotally connected by pin 178, passing through the bifurcated end 179, and the lever 180, pivoted at its lower end at 181 to the bracket 182, secured to the mid-plate 23. The bracket 182 has the upright 183, in rear of the lever 180, the upper end of said upright being bored transversely at 184, for the reception of the coiled-spring 185, one end of which is connected to the lever 180, and the other end to an extension 186 of the head 187 of the upright 183. The normal tendency of the spring 185 is to hold the lever 180 in its rear or retracted position, shown in Fig. 11, with its upper end normally in engagement with the crotch 188 of the bifurcated portion 189 of the head 187. Thus, the lever 180 is restrained from lateral movement and is guided in said portion 189. The lever 166 is guided in and restricted from lateral movement by the bifurcated arm 190, extending from the upright 25, the crotch of said arm limiting the rearward movement of said lever 166. Thus, the levers are joined together for movements in unison toward and from the driving-shaft 191, the functions of which movements will be presently described. The lever 180 has a pin 194 extending forwardly therefrom and another pin 195 extending laterally therefrom parallel with the driving-shaft 191 and toward the right-hand end thereof. The adjustable connection 174—175, between the levers 166 and 180, has several important functions, since it joins said two levers for synchronous operation toward and from the driving-shaft 191, to bring about or prevent certain operations presently described, see Figs. 11 and 13; enables an adjustment to be made to hold the connected levers in proper coöperative relation; and enables the lever 166 to be so adjusted, relatively to the lever 134, as to bring about the proper coöperative action of the cam-block 157 and the cap-piece 162, viz., to cause said cam-block to strike the cap-piece on the downward movement of the former, Fig. 13, and enable the cap-piece to avoid the cam-block on the upward movement of the latter for a functional operation, Fig. 16, dotted line, and be tilted back on the upward movement of the cam-block for a non-functional operation, dotted lines, Fig. 15. This will be fully explained presently. The levers 166 and 180 are actuated by the cam-block 157, carried by the lever 134, which lever is tripped into action by the coin-slide when the latter is pushed to its extreme rearward position so as to push the tripping-rod 54 from its ledge or rest 56, thus allowing the expansive power of the spring 122 to force the said lever 134 downwardly through its connection with the ram. The tripping of the rod 54, by the coin-slide, results in forcing rearwardly an angular lever 192, having along its rear a rack 193, and at its top a bifurcated portion the arms 194 of which embrace the anti-friction roll 150, carried by the bearing 147 of lever 134, and the upper one of the two arms 194 passing through the slot 195 of said bearing and the other passing below the same. The angular lever operates within the longitudinal slot 196, extending from back to front of the upright 25, which latter is provided internally with the opposite grooves 197, in which travel oppositely-extending pins 198, projecting from the upper end of said angular lever. Near its lower end the said angular lever is provided with oppositely-extending pins 199, which normally rest in opposite notches 200, in the sides of the front of the upright 25, as clearly shown in Figs. 8, 39 and 40. When the end of the coin-slide 12 engages the tripping-rod 54, and pushes the same from the ledge 56, the spring 122 will force the lever 134 downwardly and it in turn, through the medium of the roll 150, carried by the bearing 147, will force down the angular lever 192; that is to say, in the position of Fig. 8, the tripping-rod 54, through its pivotal connection 54ª, holds the angular lever 192 with its pins 199 in the notches 200 of the upright 25, the pins 198, at the top of said lever 192, acting as a fulcrum by bearing against the walls of the opposite slots 197, and the power of the spring 122, transmitted through the lever 134 and bearing 147, helps to maintain said pins 199 in the notches 200, the plane of pressure of the roller 150 being substantially vertical and parallel with the upright 25. On the other hand, the arms 194 of the angular lever, in this position of parts, sustain the lever 134, which, in turn, hold the ram elevated and the spring under compression, or with power stored ready for action. When the rod 54 is tripped by the coin-slide, the stored power of the spring acts instantly and powerfully to swing the lever 134 on its fulcrum 135, causing the bearing 147 to operate in the arc of a circle described about said fulcrum 135, thus causing the lower end of the angular lever to swing rearwardly on the pins 198 as a fulcrum and then descend in the upright 25, being guided in its movement by both pairs of pins 198 and 199 in the slots 197 of said upright. This places the rack 193 in coöperative relation with the mutilated-gear 201, carried by driving-shaft 191, Fig. 39, which, in turning in the direction of the arrow, will lift said angular lever 192, the lever 134, the trip-rod 54, and the ram 119, and since the roll 150 is riding toward the pins 198, the tendency of the lower end of the angular lever 192 is toward the front of the machine, thus pressing its pins 199 against the front walls of the slots 197. The mutilated-gear 201 continues its lifting action on the rack 193, until the position of Fig. 40 is reached, at which time the pins 199 have risen slightly above the notches 200 and the shoulder 55 of the trip-rod 54 is above the rest 56. When this condition of parts occurs, the plunger 47 pushes the trip-rod 54 forward so that its shoulder 55 will descend upon the rest 56, the mutilated-gear imparts its lifting action upon the last tooth of the rack 193, which momentarily releases the angular lever 192 and subjects it to the action of the ram-spring 122, through the lever 134 and bearing 147. The downward pressure of this spring being powerful, the angular-lever is instantly and with considerable force driven downwardly thus bringing the shoulder 55 of the tripping-rod 54 forcibly upon rest 56 and causing said rod to become a fulcrum for angular-lever 192, the lower end of which instantly swings toward the front of the machine and drives its pins 199 with a snap into the notches 200, of the upright 25. This action carries the rack 193 away from mutilated-gear 201, and their coöperative relation is lost. It will thus be seen that the angular-lever 192 is similar, as to certain of its operations, to a bell-crank lever, but that its fulcrum shifts and it has a bodily reciprocation. The functional purpose of this operation will be presently described; but, it should be noted, at this point, that when the rack 193 and gear 201 go into driving action, there are several of the teeth of the rack above said gear, this being for the purpose of insuring the action of the gear upon the rack the instant the teeth of the former reach a possible operative position. This prevents any lost motion between the parts. For the same reason, the teeth of the gear are more than numerous enough to insure the lifting of the angular-lever 192 to a position that will place its pins 199 slightly above the notches 200 before the tendency of the rack 193 to leave the gear occurs. The additional teeth of the gear, see Fig. 40, also have the function of insuring the seating of the tripping-rod 54 and the engagement of the pins 199, in the notches 200; for, should the parts, for any reason, fail to go to rest as described, the rack, in falling back, would be instantly caught by the gear and again lifted to the position of Fig. 40. The gear is made sufficiently extensive to enable this operation to occur several times, if necessary. Hence, the seating of the tripping-rod 54 and lever 192 is insured. The descent of the bearing 147 also causes the descent of the anti-friction roll 152, which engages the back of the lever 202, fixed upon the rock-shaft 203, having between its ends a segmental-gear 204, Fig. 19, which meshes with a rack-bar 205, sliding in ways of the support 206, carried by the bracket 207, fixed to the mid-plate 23, directly under the driving-shaft 191. The rack-bar carries at its rear end a buffer-post 208, in the socket 209 of which a coiled-spring 210 is set, said spring supporting the buffer-pin 211, which extends through an aperture in the cap 212, screwed upon the upper end of the buffer-post 208. This buffer stands in rear of the driving-shaft 191 and normally directly in the path of a buffer or stop-cam 213, fixed to said shaft so that, when said cam and buffer are in coöperative relation, the latter will prevent the driving-shaft from being turned in the direction of the arrow, shown in Fig. 19, thus holding the driving-shaft from operation. The buffer will be moved rearwardly by the rack-bar and gear 205—204, operated by the lever 202, when the anti-friction roll 152 descends. The return movement of the lever, rack-bar and buffer is caused by the arm 214, fixed to the end of the rock-shaft 203, see Figs. 5 and 19, which is acted upon by the coiled-spring 215, connected thereto at one end and at its other to the mid-plate 23, this action bringing the buffer directly under the cam 213, so that, after the driving-shaft has made one complete revolution, it will be brought to a stop and the blow of said cam cushioned against the buffer-pin 211. The lever 202, in its back, is provided with a depression 216, in which the roll 152 will remain at rest at the lower extreme of its downward movement and no additional movement will be imparted to said lever.

If the machine is operated by the rearward movement of the coin-slide, the latter is prevented from returning through a certain period of rotation of the driving-shaft by means of the pawl 217, carried by the rock-shaft 218, journaled in the brackets 219, secured to the coin-slide holders 39, the said rock-shaft also having secured to it the rearwardly-extending arm 220, normally depressed so as to hold the pawl normally depressed, as shown in Fig. 8, by the spring 221, connected to the pin 222, on said arm 220, and having its other end suitably connected to any convenient part of the mid-plate 23. The pawl 217, if the coin-slide 12 is forced rearwardly so as to trip the rod 54, will immediately drop into the V-shaped notch 67, in the rear end of the coin-slide, the passage of said rear end causing the pawl to be lifted against its spring control so as to be in proper position to coöperate with the slide, just as described. After the driving-shaft has been started in its rotation, which will occur after the buffer has been moved from under the cam 213, the arm 220 of the rock-shaft 218 will be acted upon by said buffer-cam 213, the radial portion 223 of which will exercise a lifting action upon the bottom of said arm, thus lifting the pawl 217 from the notch 67 in the coin-slide and permitting the spring 70, surrounding the bar 71 of said slide, to immediately force the latter toward the front of the machine to its normal inoperative position. Also by the movement of the coin-slide rearwardly, to set the machine in operation, its rod 71 is forced through the bearing 25ª into engagement with the depending-arm 224, carried by the rock-shaft 225, extending across the machine in rear of the driving-shaft and journaled in the heads 187 of the several standards 183. The said rock-shaft at its extreme left end is provided with an arm 226, extending toward the front of the machine and over the driving-shaft 191, into coöperation with a radial cam 227, fixed upon said driving-shaft, see Fig. 22, the rock-shaft and its two arms thus being under control of said cam and a coiled-spring 228, connected to the pin 229, at its upper end, and at its lower end connected to the pin 230, projecting from the standard 231, extending from the mid-plate 23, at the rear of the machine. The normal inoperative position of the arms 224 and 226 and the cam 227 is shown by dotted lines in Fig. 22, this position of the parts permitting the rod 71 to be moved clear to the rear so as to operate the machine. As the driving-shaft rotates the cam 227 lifts the arm 226 and forces the arm 224 into engagement with the rod 71, thus preventing it from being moved to the rear any farther and positively forcing it to return to its normal position. The important function of this slide-retrieving means is to prevent tampering with the machine by the operator after a functional operation of the driving-shaft. Since the trip-rod 54 is under control of the plunger 46, and pressed thereby against its rest 56, it will be seen that, if the operator were allowed to hold the coin-slide against trip-rod 54, he could easily destroy the function of the cocking mechanism and thus cause the cocking-lever 134 to fall, close the electric circuit and start the driving shaft 191 into operation. This operation, however, though possible, cannot effect a delivery of tickets; for, it will be remembered that the operator has not deposited a second coin in the coin-slide. In consequence, the ram 120 will fall through the coin-aperture 60, thus causing a functionless operation. Hence, in this connection, it is important to note that this slide-retrieving device 224 forces the coin-slide back (or forward) under the holding-pawl 217; that is to say, should the operator attempt to hold said slide he could not do so since he cannot, by hand, overcome the power of the motor put upon the rod 71, by arm 224, through cam 227; and this power is continued until cam-lug 65 of the coin-slide passes the operative position of the stop-finger 114. When the coin-slide is forced back to this point, any further tampering with the machine is useless for another coin must now be inserted in the aperture 60 of the coin-slide in order to set the driving-shaft in motion again for a functional operation. An incidental, but also important, function of this slide-returning means is to prevent said slide from remaining in a rearward position, after being released by the pawl 217, long enough to be again caught and retained by said pawl. This might occur should the yielding retrieving means, or spring 70, fail to operate with sufficient force and speed to properly retrieve the coin-slide. The positive retrieving device 224 operates upon the rod 71, at the proper time, and long enough to push the slide forward to a point such that the pawl 217 cannot again engage in the notch 67 of said slide. The slide is then free to return or be returned to normal or inoperative position. At the same time the rod 71 is forced rearwardly with the coin-slide, the rod 77 is also forced rearwardly its beveled end 77ᵃ entering between the balls 78, in the casing 79, and thus separating them to an extent equal to the diameter of said rod 77. This causes the balls to spread in opposite directions and the extreme end balls to engage the ends of the casing, thus rendering it impossible for the balls to have any further movement. The function of this condition of parts will be described in connection with the gang-machine.

When the coin-slide has been moved clear to the rear so as to perform the tripping operation described, its coin-aperture 60 and the coin contained therein will be centered over the coin-escape aperture 43, in the slide-plate 11, and said coin comes to rest at one side upon a stationary jaw 232, and at the other side upon a movable jaw 233. The jaw 232 is secured by screws 234 to the slide-plate 11, said jaw having its inner end projecting over the aperture 43, which latter is larger than the coin carried by the coin-slide. The jaw 233 is formed on a throat-plate or slide 235, extending transversely across the surface of the slide-plate 11 and directly over the aperture 43 in the latter, see Figs. 5 and 8, said jaw being at one end of a slot 236, extending longitudinally of said throat-plate. The form of the slot 236 is shown to be rectangular at one end so as to correspond with the form of the jaw 232 and is larger than said jaw so as to enable the throat-plate 235 to have the necessary movement relatively thereto. The slot 236, at its other end, beyond the free end of the jaw 232, is circular in form and of greater diameter transversely of said throat-plate 235 than the coin, but of lesser diameter than the coin lengthwise of the throat-plate, the said jaw 233 being formed on or integral with said plate directly opposite the end of the jaw 232, and as the chord of the arc of the circle at that side. While the coin is at rest upon these two jaws, it is tested for tensile strength by the ram, the head 121 of which strikes the coin fairly across its center. If the coin withstands this test and is not rammed through the throat-plate and coin-escape aperture 43, the cam 157, on the bearing 147, of the cocking-lever 134, will assume the proper operative position relatively to the spring-controlled cap-piece 162, carried by the arm 165, of lever 166, as shown in Fig. 13, which will enable the driving-shaft 191 to be rotated, since the buffer 208 is pushed back by segment 204, actuated by lever 202, operated upon by roll 152, and thus brings into action the disk having peripheral cam 237 (see Fig. 5, left side), jog 238 in which will operate the pin 239, carried by the lever 240, fulcrumed at 241 to the upright 242, attached to the mid-plate 23, the forward end of which lever is pivoted at 243, to the lug 244, connected to the throat-plate 235. The throat-plate is thus positively operated to allow the ram to push the coin through the circular portion of the slot 236, through the aperture 43 in the slide-plate 11, and into the chute 116, after it has imposed its testing blow thereon, the coin passing from the chute 116 into a carrier 245, a number of which are connected together by a flexible endless chain 246, see Fig. 4, forming a coin-conveyer. It will be noted that the grooved cam 237 is positive in its action and imparts positive motion to the lever and throat-plate, the latter, consequently, moving each time the exact distance required to allow the coin to drop into the chute and returning each time to the proper position for receiving, in combination with the plate 232, another coin. However, in order to compensate for any wear, which may occur in the operation of the machine, between the cam-groove and the pin 239, I have provided a spring 235ª, secured at one end to the bottom of the slide-plate 11, and at its other end engaging a pin 235ᵇ, secured in the bottom of the throat-plate 235, as shown by dotted lines in Fig. 5. By this means the throat-plate is infallibly returned to its normal position ready for the reception of a coin and all wear between the parts, as just described, is compensated for. In a gang-machine, since the throat-plate 235 extends clear across the slide-plate 11 and contains apertures corresponding with the coin-aperture for each coin-slide, it has been found convenient and effective, as well as a simple construction, to provide at the extreme end of the throat-plate 235 a ledge or rest 233ª, for the reception of the coin placed in the coin-aperture of the slide operating at the far or right side of the machine, as shown in Fig. 5, the rest being provided by simply squaring the end of the throatplate 235 and extending the latter sufficiently to overhang the aperture 43, in the slide-plate. Thus is eliminated one of the angular slots 236, with its curved end, and the plate 232 is simply set in place on the slide-plate 11 in the proper position for receiving the other side of the coin.

Figure 1:
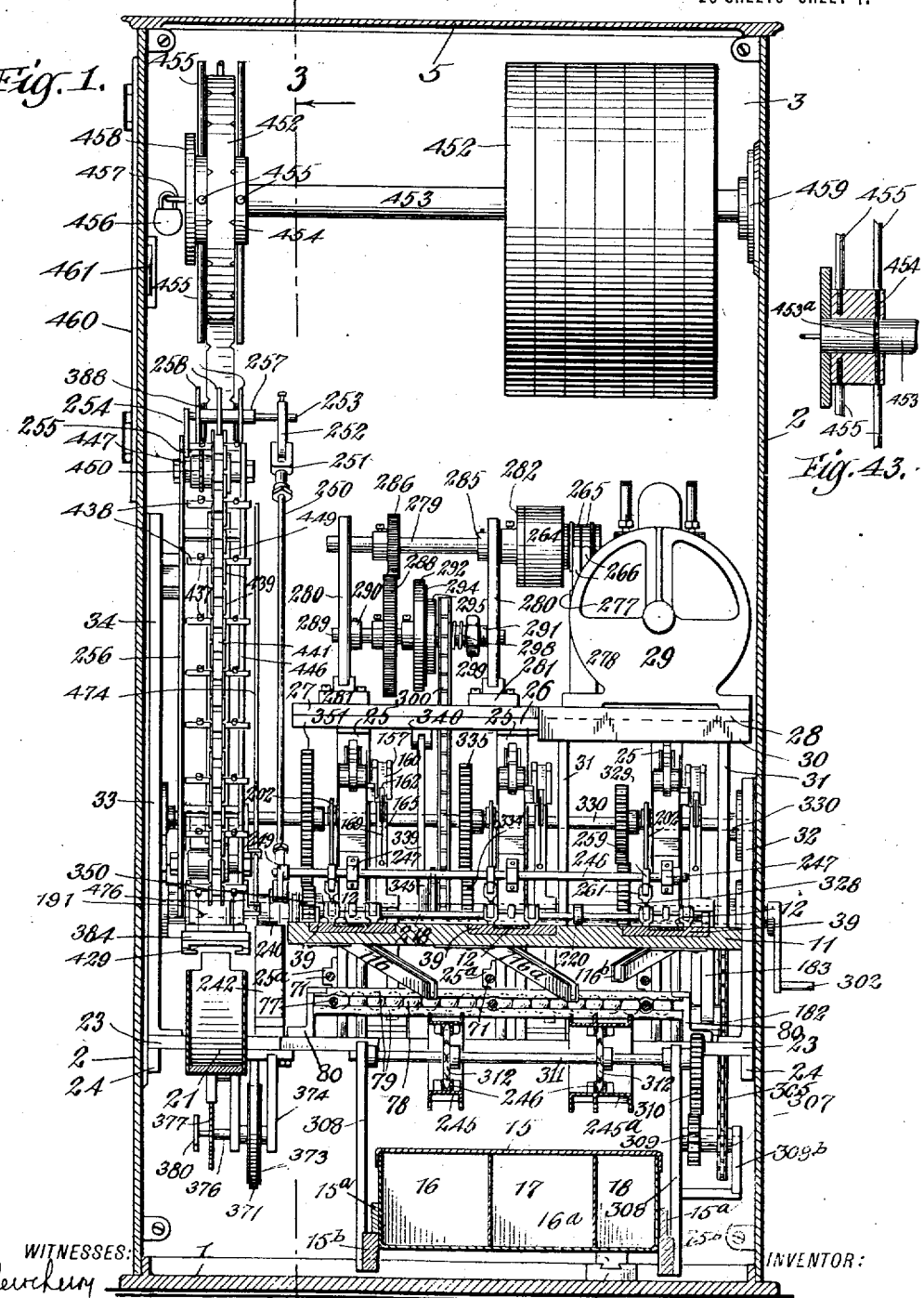
Figure 1 is a sectional elevation showing the machine from the front thereof, the section being taken through the frame transversely substantially on the line 1—1 of Fig. 4.

The upright 25 has secured to its face a bearing 247, in which is journaled a rock-shaft 248, extending transversely of the machine and at the left end thereof extending beyond the slide-plate 11, as shown in Fig. 1. This end of the rock-shaft 248 has connected to it a crank-arm 249, the rear end of which is pivotally connected to the lower end of a rod 250, extending obliquely toward the back of the machine and its top, said rod being provided at its upper end with a bifurcated head 251, in which is pivoted the lower end of a crank-arm 252, fixed to a short rock-shaft 253, extending toward the left-hand side of the machine and at its outer end carrying an arm 254, journaled at 255 in the upper end of the feed-frame 256. The rock-shaft 253 has journaled upon it a sleeve 257, carrying a series of disks 258, which constitute a feeler to detect the presence or absence of the tickets to be vended and coöperating with said tickets in such manner as to permit the machine to operate or stop its operation for a functional purpose accordingly as tickets are or are not traveling properly through the feed-frame. This will be described in detail presently. The rock-shaft 248 is provided with a rearwardly-extending arm 259, see Fig. 9, fixed thereto, said arm having pivotally connected to it at 260 the upper forked end 261 of a depending stop-finger 262, which normally stands in the path of movement of the cam-lug 65, on the left-hand side of the extreme rear end of the coin-slide 12, providing there be no tickets in the machine. Thus, if tickets are not in position to be advanced by the feeding mechanism, the coin-slide cannot be pushed rearwardly, since this finger will be depressed and will restrain the said slide from rearward movement by coöperating with its lug 65, as stated. Normally, however, when tickets are in the machine and properly placed for feeding, the feelers 258 will rest upon said tickets and, through the crank-arm 249 and rock-shaft 248, hold the crank-arm 259 with its depending-finger 262, up out of the path of movement of the cam-projection 65 on the coin-slide. In this position, the coin-slide can pass the depending-finger 262, though it may engage the gage-finger 114, which may be in position to prevent the movement of the coin-slide for other reasons previously stated. If, however, the finger 262 should be in position to prevent the movement of the slide, an attempt to push the coin-slide rearwardly would swing the finger 262 on its pivot 260, and force the same against the rear bar 110 of the gage-truck, within which said finger operates. By pivoting the finger, as described, and allowing it to swing, it will readily yield for free movement toward the front of the machine when the coin-slide is retracted by its spring 70, or retrieving-arm 224, should, for any reason, the said finger be in its lower position, said finger readily riding up or sliding over the cam surface 66 on the lug 65 of said coin-slide. This condition would occur in the event the tickets became exhausted at the feeler during a feeding movement, since, initially, the coin-slide would operate properly, but as the feed takes place the deficiency in the web would be detected by the feeler and the finger 262 would drop upon the slide. This combined ticket-feeling mechanism and coin-slide stop is actuated entirely by gravity.

The motor 29, as before stated, see Fig. 35, is supported on the table-extension 28 and its driving-shaft 263 extends transversely of the machine and has fixed to it the drum and windings 264, of a magnetic clutch. Slip-rings 265, insulated from the shaft 263, and, respectively, connected with the terminals of the clutch-windings are mounted in any usual way to rotate with the motor-shaft 263, and each slip-ring has coöperating with it a brush 266, supported by the insulating material 277, secured to the upright 278, fixed to the table 27, in any suitable manner. A shaft 279, journaled in bearings 280, secured by means of the brackets 281, to the table 27, is in alinement with the motor-shaft 263, and has its end adjacent said shaft in close relation thereto. This end of the shaft 279 carries the complemental clutch-member 282, fixed thereto by a screw 283, passing therethrough and spotted upon the shaft 279. When the parts are in the position shown in Fig. 35, a clearance indicated by 284 is provided between the hub of the clutch-member 282 and the adjacent upright 280, so as to allow of adequate separation of the two clutch-members. For this purpose, the shaft 279 is movable in its bearings, and a collar 285 is fixed to the shaft on the side of the standard 280, opposite to that of the clutch-member 282. The shaft 279 carries a pinion 286, fixed thereto by means of the screw 287, said pinion meshing with the gear 288, fixed to a countershaft 289, also journaled in the uprights 280, below and in parallelism with the shaft 279. The shaft 289 is held in position by means of the collar 290, fixed to said shaft at one end and the externally screw-threaded sleeve 291, fixed to said shaft at the other end. Between the right-hand upright 280 and the gear 288, a friction-clutch is mounted, the same consisting of the flanged disk 292, fixed to the shaft 289, by the screw 293, in the recessed face of which suitable frictional material 294 is set. Coöperating with this clutch-member 292 is the movable clutch-member 295, mounted to slide freely upon the shaft 289, and provided with the screw-threaded hub 296, upon which is screwed the sprocket-wheel 297. Bearing against the hub 296, of the clutch-member 295, is a coiled-spring 298, which, at its other end, bears against a collar 299, internally screw-threaded and adjustable upon the sleeve 291, so as to regulate the tension of the spring 298, and the pressure of the clutch-member 295, against the clutch-member 292. This clutch-device is thus interposed between the motor-shaft 263 and the driving-shaft 191, for the purpose of preventing excess of power in, or overrunning of, the motor from jamming the machine or ripping gears or cams, all danger of overdrag upon the main-shaft 191, by the motor, being thus completely eliminated. Coöperating with the sprocket-wheel 297 is the sprocket-chain 300, which coöperates also with a sprocket-wheel 301, mounted upon the driving-shaft 191, substantially midway the length of the latter, see Fig. 4. The ratio of the pinion and gear 286 and 288 is as 1 to 2 and the same ratio exists between the sprocket-wheels 297 and 301. From the mechanism just described, it will be seen that the motor, when set in action, will transmit motion to the main-driving-shaft 191, which may also be provided with a hand-crank 302, see Fig. 5, in the event an electric or other motor is not employed or it is not desired, for any reason, to use the said motor. The current to drive the motor is taken from any main, battery, or generator, as desired, and the connections for the purpose will be presently described. Rotation of the driving-shaft 191 will cause all the elements splined thereto to have a rotary motion, and all other elements loose thereon will likewise receive rotary motion when shifted or driven by the proper devices.

It should be here noted that every cycle of movement or functional operation of the machine involves but a single complete rotation of the driving-shaft for each coin deposited and that said shaft carries, in this particular gang-machine, mechanism in triplicate, complemental to the three coin-slide mechanisms. Therefore, to avoid confusion and misunderstanding, I will start from the crank-end of the driving-shaft 191, and describe in detail the construction and functions of the several devices carried by said shaft. The driving-shaft is shown in detail in Fig. 6, in order to portray its several feathers or splines, and this figure shows said shaft in substantially the position it would occupy in the machine in Fig. 5, so that the position of said splines can be readily understood.

Figure 2:
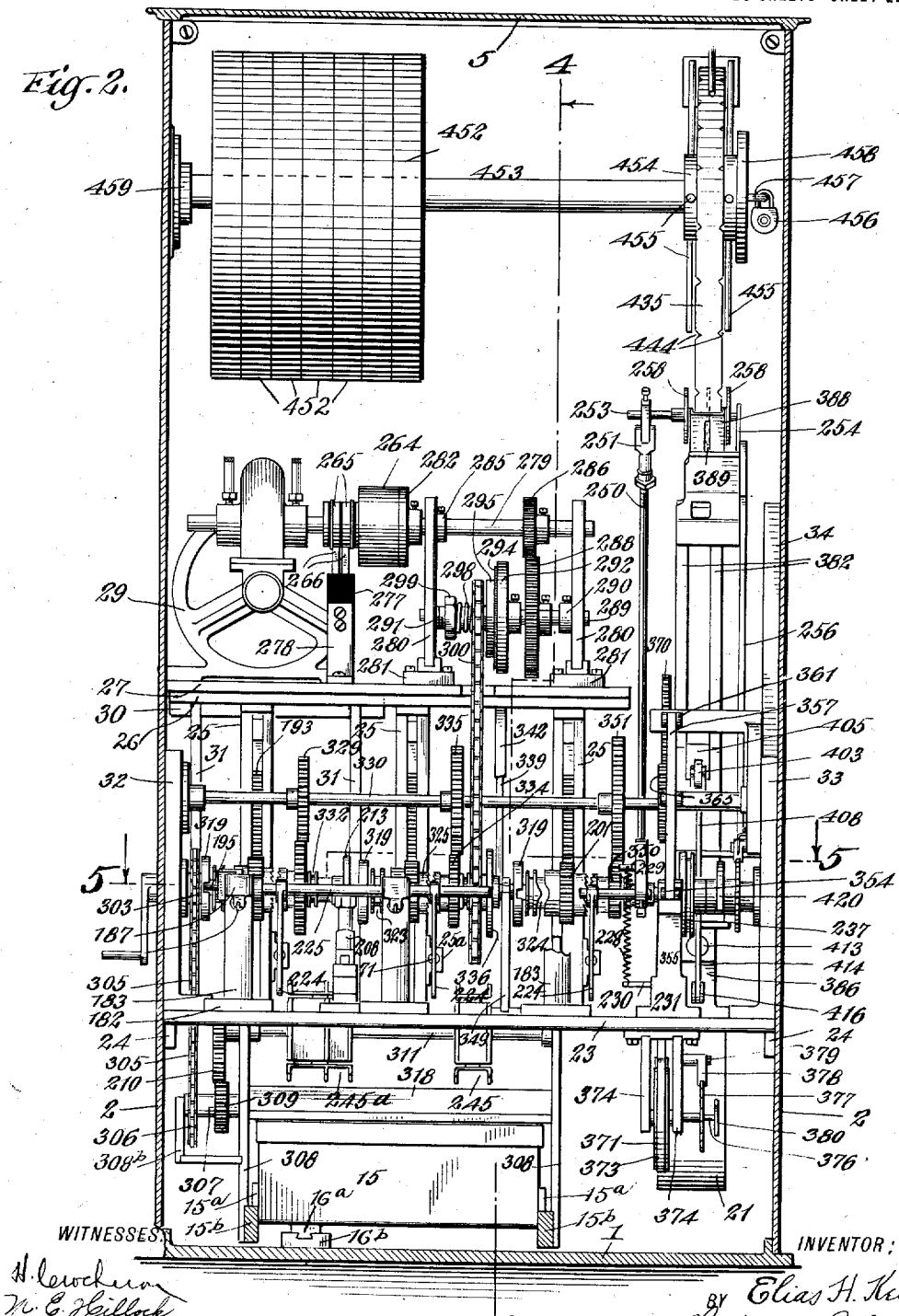
Fig. 2 is a rear elevation of the machine, the frame thereof being shown in vertical transverse section.

Viewing Figs. 1, 2, 4, 5, and 34, for example, when the main shaft is started by either motor or crank, the sprocket-wheel 303 will be rotated since it is connected to the shaft by spline 304, see Fig. 6, such rotation driving the sprocket-chain 305, which rotates the sprocket-wheel 306, carried by the short shaft 307, journaled in the bearing 308 and a bracket 308$^b$, in the extension 10 of the frame of the machine adjacent the top of the coin-receptacle 15. Shaft 307 carries a pinion 309, meshing with a gear 310, carried by a shaft 311, journaled above the shaft 307, in the bearings 308. Shaft 311 carries a pair of sprocket-wheels 312, each of which drives a chain 246, to which the coin-cups are connected. In rear of the bearings 308 is another pair of bearings 308$^a$, which support a pair of sprocket-wheels 312$^a$, similar to those in the front bearings around which the respective cup-chains also run, the said chains being thus compelled to take a course in the direction of the arrow, Fig. 4, which will maintain the said cups in a horizontal position with several of them in horizontal alinement so as to catch the coins which pass from the chutes. Bearings 308$^a$ are in rear of the coin-box 15 and so disposed as to not interfere with said coin-box. Viewing Fig. 4, every other link 313 of the chain 246 has a cup 245 fixed thereto so as to travel with the chain in a fixed position relatively to said link, the links extending between each pair of cups spacing the latter so that a uniform distance will always be maintained between said cups and the latter can travel the circuit prescribed by the two sets of sprocket-wheels without interference. As shown in Fig. 1, the chute 116 extends toward the right-hand side of the machine and empties into the coin-cups 245, which are arranged in single form and are in position to receive the five-cent nickel piece from the nickel-slide, which is on the left-side of the machine. The chute 116$^a$ is under the dime slide and is directed toward the right-hand end of the machine and deposits its coin in the left or small side of the double cups 245$^a$, while the chute 116$^b$ is under the quarter slide, is directed toward the chute 116$^a$ and deposits its coin in the right-hand side of the double cups 245$^a$, the latter being made double and arranged as shown to economize space, cheapen, and simplify the machine. The cups, as the chains 246 move along in the direction of the arrow in Figs. 4 and 34, are given a complete turn so as to dump the coins into the box 15, through the opening 314 in the top thereof, which extends across the same from side to side. The opening has a closure or door 315, under control of a spring 315$^a$, coiled about its hinge-pin 315$^b$, so as to cause said door to normally tend to close the opening. The lid or door is also provided with a spring-latch or lock 316, said door being normally held open, when the box is in place in the machine, by means of a combined guard and retainer 317, fixed to the front portion 10 of the frame. Opposite the guard 317, a back-plate 318 is fixed to the beam 318$^a$, said plate and guard 317 having the function of accurately directing the coins into the box 15, through the openings 314, and preventing said coins from being dumped in or deflected to any other portion of the machine. The guard 317 also has the function of retaining the door 315 open while the box is in the machine. The coin-box 15 is provided on its opposite sides with runners 15$^a$, which travel upon the guide-rails 15$^b$, extending across the base of the frame of the machine, the said coin-box being thus capable of being easily slid into the machine and maintained in proper position between the two said rails. The frame-portion 10 of the machine, at its lower edge adjacent the top of the door 13, and at opposite ends of the coin-box, is provided with dogs 10$^a$, pivoted at 10$^b$, each of said dogs being under control of a spring 10$^c$, fixed to the said frame and engaging the portion 10$^a$ of said dog, the latter having its depending portion 10$^d$ in position such as to coöperate with the complemental inclined lugs 315$^a$, secured to the opposite ends of the lid 315 of the coin-box adjacent its free or upper edge. The dogs and lugs coöperate with a tendency to close the lid 315 of the coin-box, since the lower portion 10$^d$ of said dogs is directly in the path of said lugs when the coin-box is being removed; that is to say, as the box is withdrawn from the machine, the spring 315$^a$ will exercise its normal tendency to close said lid, thus presenting the lugs 315$^a$ in the path of said dog-portion 10$^d$. Since, however, said dog, in this direction of movement of the box, will yield against the pressure of the spring 10$^c$, said dog will only have a tendency to press closed the lid 315 and snap the lock thereof; but, to insure that the lid be tightly closed as the box is withdrawn from the machine, said lugs 315$^a$ will engage the lower edge 10$^x$ of said frame which, being rigid, will snap the spring-lock and lock the lid, thus enabling the free withdrawal of the box from the machine. The lugs 315$^a$ also prevent the placing of the coin-box in the machine with the lid closed, since the lower ends of the depending portions 10$^d$ are slightly below the said lower edge 10$^x$ of the frame and the dogs will engage the said lugs when the lid is closed and cannot yield, owing to the portion 10$^a$ being in contact with the frame-portion 10. Therefore, it becomes necessary to first open the lid and lay it back against its spring pressure upon the top of the box, thus allowing said box to be placed in the machine without interference with the dog. Soon as the box is well in the machine, the lid will be released and its spring will force it into engagement with the guard 317, which latter will hold said lid wide open so that the coins can freely pass through the opening 314 in the box, and into its proper compartment 16, 17, or 18. The top of the coin-box is hinged to the front wall thereof along the upper edge of the latter, as indicated at 10$^e$, and at its opposite side said top is provided with a spring-lock, see Fig. 4, indicated by 10$^f$, this construction enabling the entire top of the box to be thrown wide open for the removal of the contents thereof. The chains, sprockets and cups constitute a coin-conveyer and the amount of travel imparted thereto, by the sprocket 303 and chain 305, is approximately the distance of one coin-cup for every rotation of the driving-shaft. Hence, for every operation of the machine, functional or otherwise, the conveyer will carry the contents of a given cup under and into the light of the lamp 36, so that it may be inspected through the transparency 35, and a person tampering with the machine or trying to defraud the same by slugs or checks, etc., can be instantly detected. Referring to Figs. 1 and 2, means are provided for identifying a machine or the location thereof, and for preventing a box, intended for a given machine, from being used with any other machine. This means, in the instance shown, consists of a dove-tailed lug 16$^a$, fixed to the bottom of the box 15, and coöperating with a guide 16ᵇ, having a groove complemental in form to said lug. Obviously, the position, size and shape of this "key" to a given machine and its coin-box can be varied indefinitely. Thus, an infallible means for the purposes stated is and can be provided.

Next to the sprocket-wheel 303, on the driving-shaft 191, is fixed, by spline 304, the disk 319, enlarged views of which are shown in Figs. 20 and 21. This disk has a flange 320, provided with a slot 321. This structure forms a drum which is located so that its slot 321 will coöperate with the pin 195 on the head of the lever 180. This coöperation between the drum and pin 195, whereby, at one time, the pin enters the drum and is held in coöperation with the same for a complete rotation of the driving-shaft and at another time said pin is prevented from entering said drum by the flange 320, to prevent a functional operation of the machine, will be presently more fully set forth.

Next to the drum on the driving-shaft 191 is a sliding-cylinder 322, held for rotation on said shaft by the spline 304, this cylinder having a circumferential groove 323, in position to coöperate with the pin 193, Figs. 5, 11 and 34, carried by the lever 166, this coöperation taking place when the cam-block 157 passes, in its upward movement, the spring-controlled cap-piece 162 and assumes the position shown in Fig. 11, so as to hold the cylinder 322 from longitudinal movement on the shaft 191. Next to groove 323 in the cylinder is another circumferential groove having a cam-jog 324, this groove being in position to coöperate with the pin 194, on the head of the lever 180. When the pin 194 is operating in the cam-groove 324, the pin 193 of the lever 166 has withdrawn from groove 323, since the two levers 166 and 180 are connected together, as previously explained. The coöperation of pin 194 and groove 324 will cause the cylinder 322 to move laterally toward the left, this operation being rendered possible because the pin 195 has passed into the drum through the slot 321, thus holding the pin 194 and groove 324 in coöperative relation for a complete rotation of shaft 191. Next to the cam-groove 324 in the cylinder is the mutilated-gear 201, which coöperates with the rack 193, of the angular tripping-lever 192, operating in the slot 196, of the upright 25, as previously explained, see Figs. 7, 8, 39 and 40. Next to the mutilated-gear 201, and on the end of the cylinder, is a circle of clutch-teeth 325, which coöperate with a circle of clutch-teeth 326, on the end of the hub 327, of a gear 328, free to rotate on the shaft 191, between the splines 304 and 304ª, and meshing with the gear 329, fixed to feed-shaft 330, journaled in bearings in the supports 32 and 33, above the driving-shaft 191, see Figs. 2 and 4, these two gears 328 and 329 having a ratio of 1 to 8 for the delivery of five tickets as presently explained. The gear 328 has a laterally-extending pin 331, running in grooves 332, of hub-extension 333, fixed to the shaft 191, and also secured by said spline 304ª. This construction prevents the gear 328 and the clutch-member 326 from moving laterally on the shaft while running freely thereon. Next to the hub-extension 333, and formed thereon, is the stop or buffer-cam 213, which coöperates with the buffer-pin 211, as previously explained. These elements just described coöperate with the right-hand coin-slide, see Figs. 5 and 34, and said elements, except the sprocket-wheel 303 and the buffer-cam 213, and the ratio of the gears 328 and 329, are duplicated in the order named for the middle or ten-cent slide and form part of the coin-slide "unit" referred to and shown in Fig. 34; that is to say, another drum 319 is arranged next to the buffer-cam 213, another cylinder 322 with grooves 323 and 324, mutilated-gear 201 and clutch-teeth 325 next, and another hub 327, having clutch-teeth 326, next. The gear 334 and clutch-member 326 are located on shaft 191, between splines 304ª and 304ᵇ. The gear 334, of said clutch-member 326, however, is smaller than gear 328 and meshes with a gear 335, on the shaft 330, which is larger than the gear 329. The ratio between gears 334 and 335 is as 1 to 1.57. Next to the gear 334 is the sprocket-wheel 301, driven by the sprocket-chain 300, from sprocket 297, on countershaft 289, as previously described. The gear 334 and connected clutch-member are held from longitudinal movement by the same kind of connection 331—332, permitting said parts to rotate between the splines 304ª and 304ᵇ, while the sprocket-wheel is keyed to the shaft by the spline 304ᵇ. Then comes a disk 336, having the peripheral cam 337, coöperating with an anti-friction roll 338, carried by a releasing-lever 339, fulcrumed at its upper end at 340, to the bottom of the table 27, this lever being normally held in coöperation with the cam 337, by a spring 341, connected at one end to said lever and at its other end to an angular fixture 342, depending from table 27. The lower end of said lever 339 is guided in the slot 343, of a guide-bar 344, fixed to the under side of the slide-plate 11, said guide-bar supporting an insulating-post 345, having at its upper end a pair of spring-fingers 347, forming electrical contacts for coöperation with the contact-plate 348, carried by said releasing-lever, said plate being insulated from said lever in any suitable manner. Next to the disk 336 is a standard 349, in which the shaft 191 is journaled. Then come the elements of similar character in similar order complemental to the coin-slide mechanism for the nickel or five-cent piece; that is to say, next to the standard or bearing 349 is the drum 319, with the slot through which operates the pin 195, and adjacent to said disk is the cylinder 322, having the grooves 323 and 324, and also the mutilated-gear 201, and the circle of clutch-teeth 325. Next to this, on the shaft, is the hub 327, having the circle of clutch-teeth 326, coöperating with the clutch-teeth 325, and also having a gear 350 corresponding to the gears 334 and 328, but being smaller than either of the latter. This gear coöperates with the gear 351, fixed to the shaft 330, said gear 351 being larger than either of the gears 335 and 329 on the same shaft. The gears 350 and 351 have a ratio of 1 to 3. The cylinder 322 is driven by spline 304$^c$ and gear 350, and an attached clutch-member rotates on the shaft between the splines 304$^c$ and 304$^d$. The gear 350, as well as the gear 334, is held from longitudinal movement on the shaft by means of the laterally-extending pin 331, operating in the groove 332, of the elongated hub 333, which, in this instance, carries the radial cam 227, coöperating with the arm 226, carried by the rock-shaft 225, forming part of the coin-slide retrieving device. Next in order upon the driving-shaft 191 is the disk having the groove 237 with the cam-jog 238 coöperating with the pin 239, to actuate the throat-plate 235. This cam-disk is also provided in its right face with a cam-groove 352, see Figs. 5, 23 and 30, in which runs a pin 353, carried at one end of a slide-bar 354, guided in the top of the standard 231, and confined to longitudinal reciprocations therein, and pivotally connected at its rear end at 356, to the lower end of the lever 357, fulcrumed midway between its ends at 358, to a suitable supporting-plate 359, said lever, at its upper end, being pivotally connected at 360, to the rear end of a slide-bar 361, guided in the head 362, of the supporting-plate 359, in which said bar 361 is confined to longitudinal reciprocations. The bar 361, at its forward end, is forked as shown at 363, Fig. 31, and in the forward ends of the prongs of said fork has a gear-wheel 364 journaled. This gear-wheel 364, meshes with the gear-wheel 365, carried by the shaft 330, the two said gear-wheels 364 and 365 having a ratio of 1 to 1.

The head 362, of the supporting-plate 359, has an extension 366, projecting toward the front of the machine and provided at its forward end with an adjustable pin or screw 367, held in fixed position by a screw 367$^a$, and the forward end of which is provided with an anti-friction roll or pin 368, operating in a longitudinal groove 369, in a reciprocating rack-bar 370, the teeth of which coöperate with the gear-wheel 364, when the latter has moved forward to produce such coöperation by means of the lever 357, actuated by the cam-groove 352. The rack-bar 370 is inclined from front to rear of the machine and is of a length to extend from the mid-plate 1 of the frame to substantially the top of the gear 364, and is normally held in its lowermost position, shown in Fig. 23, by means of a strap 371, the free end of which is looped over a hook 372, on the lower end of said rack-bar. The other end of the strap is connected to the drum 373, journaled in the hanger 374, secured to the mid-plate 23, said drum being under control of the spring 375, the form of which is substantially the same as the main-spring of a clock. The journal 376 of the drum, see Figs. 1 and 2, is extended laterally toward the left side of the machine and on said extended portion carries a ratchet-wheel 377, with which coöperates a pawl 378, hanging upon a pin 379, extending from the adjacent hanger 374, and by gravity coöperating with said ratchet-wheel to prevent the spring from unwinding. A crank 380, on the journal 376, enables the tension of the spring to be adjusted.

At their top the tracks 382 are connected by means of the angle-plate 387, secured at its top to the top-plate 381, and at its bottom to the two said tracks 382. The top-plate 381 forms the bottom of the ticket-feed chute, which, at its top, is extended vertically at an angle to said top-plate, as at 388, and which extended portion coöperates with the disks 258 of the ticket-feelers. The central disk of the feeler is arranged midway of the chute-extension 388, directly over a longitudinal slot 389 in the latter, while the other two disks of the feeler are arranged at opposite sides of said chute-extension. The central disk of the feeler, in the absence of tickets, will drop into the longitudinal slot 389, thus permitting the rod 250 to drop, which will turn the rock-shaft 248, resulting in depressing the stop-finger 262 into position such that the coin-slide will be prevented from moving forward by coöperation of its lug 65 with said finger, as previously stated. The rack-bar 370 operates in a slot 391, in the cutter-frame 384, and is rigidly held in its operative path by the pin 367, and by the feed-car 392, to which it is rigidly connected by web 392$^a$, see Figs. 23 and 41. The rack-bar is also steadied and guided in its movements by the lugs 370$^a$, at top and bottom thereof, which run in contact with the adjacent track-bar 382. The feed-car is composed of a solid and very heavy piece of metal and has journaled to it at opposite ends a pair of anti-friction rollers 393, running in the groove 394 of the bars 382, see Figs. 23 and 41. The car has secured to each of its sides a bracket-piece 395, on which a catch is pivoted at 396, said catch having near its upper end a hook 397. At its lower end or tail-piece said catch has a coiled-spring 398, connected to it, the other end of which is connected to a fixed part of said car, as at 399. The catch being under spring-control, normally stands in the operative position shown in Fig. 23. The upper end of said catch is given a wedge or triangular form as at 400, the hook 397 being formed at the base of the triangle. A stop-screw 399ᵃ is set in the bracket-piece 395, so as to have its forward end project into engagement with the tail-piece of said catch to limit its movement in that direction, thus preventing its upper end 400 from being thrown too far forward, the object being to cause the hook of the catch to always ride in contact with but under or in rear of the pins 438. Otherwise, the hooks 397 might run between the pins and interfere with the feed of the chain. The upper end of the car 392 has extending from it a rigid arm 401, the upper end of which is formed into a hook 402, this hooked arm traveling between the track-bars 382 and having its hook traversing a path slightly below the upper surface of said bars, as shown in Fig. 27. In its position of rest upon the bottom 383 of the track, the car 392 has its arm 401, in coöperation with a lever 403, pivoted at 404 to a bracket 405, fixed to the bars 382, the coöperating end of said lever being formed into a catch-depression 406 to receive the hook 402 of said arm 401. The rear end of lever 403 has pivoted to it at 407, the upper end of a rod 408, the lower end of which plays in the inclined aperture 409, in the cutter-frame 384 and standard 386, said aperture being intersected by a transverse bore 410 in the upper end of the standard 386. A rod 411 slides in the bore 410, said rod having a depression or opening 412 between its ends for the reception of the lower end of the rod 408. The lower end of rod 408 is beveled from one side to the other and the depression 412, in the rod 411, is correspondingly formed, viz., with its rear wall inclined upwardly; and said depression is made larger than the end of the rod 408, so as to insure the entrance thereof into said depression. The rear end of the rod 411 has a forked collar 413 secured thereto, to which is pivoted the lever 414, the lower end of which is fulcrumed at 415 to the rear end of a link 416, the front end of which is pivoted at 417, to a lug 418, secured to the standard 386. The upper end of lever 414 carries an anti-friction roll 419, which coöperates with a cam 420, on the driving-shaft 191, this cam being set on said shaft next to the cam-disk 237. A coiled-spring 421 surrounds the rod 411 and has one end in engagement with a nut, which can be adjusted to regulate the strength of the spring, and the other in engagement with the standard 386, see Fig. 27. The normal tendency of the spring 421 is to force the roller on the end of lever 414 into engagement with the cam 420 and tend to withdraw the depression 412, in rod 411, from the path of movement of the vertical-rod 408. The forward end of rod 411 has secured to it a knife-holder 422, by means of a screw 423, said holder being adjustable on said rod. The knife-blade 424 is secured in any suitable way to the holder 422 and extends forward to the front of the machine, said blade having a transverse slot 425 therein for the passage of the tickets to be cut off the web and delivered to the operator. The cutting-edge of the blade 424 is formed at 426, by beveling the front wall of the slot 425, said cutting-edge coöperating with the beveled edge 427, of the rear wall of a transverse slot 428, in the cutter-frame 384, directly under the lower or delivery end of the chute formed by the top-plate 381. The cutting-blade 424 is normally held out of operation and under spring tension, but ready for work, by the coöperation of the lower end of rod 408, with the depression 412, in the rod 411, the release of the latter rod by lifting the rod 408 enabling the spring to move the cutting-blade 424, across the ledger-blade 427, and sever one or more tickets from the web. The cutting-blade is supported also by the plate 429, forming the bottom of the cutter-frame, within which it is guided and steadied in its action. The rearward or cutting movement of the cutter is limited by a stop-screw 422ᵃ, set in the standard 386, just in rear of the holder 422. The rod 408 is limited in its action by a buffer consisting of a rod 430, pivoted at 431, to the lever 403, said rod sliding in a tube or socket 432, fixed at its lower end to the base 383. A spring 433 surrounds said rod 430 and bears at one end against said tube 432, and at its other end on an enlargement of the rod 430. Hence, the normal tendency is to hold the rod 408 in position to enter the opening 412, in rod 411, and this buffer takes the shock of the blow delivered by the hook 402 in the descent of the car 392. This buffer-device also operates to prevent the rod 408 from being thrown from the aperture 409, thus keeping said rod in coöperative relation with said cutter-rod 411. The device also quiets the blow of the car upon the base 383, at the end of a feed-movement.

The trough 21 is situated directly beneath the delivery slot 428, in the cutter-frame 384, so as to receive the article severed by the cutter. The top-plate 381, forming part of the ticket-chute, has its upper surface formed into a central ledge 434, see Fig. 29, along which the ticket-web is fed.

The surface of said plate 381 is also provided, along opposite sides of the ledge 434, with grooves 436, for the reception of the pins 437, carried by the laterally-extending pivot-pins 438, which hold together the several link-plates 439, of the feed-chain; that is to say, the feed-chain shown in Figs. 23 to 29 is composed of the link-plates 439, arranged in pairs, one end of which is provided with an aperture through which the pivot-pin 438 extends. The edges of the link-plates 439, coöperate with the angular notches 440, of the pivot-pin 438, the link-plates and pins being thus prevented from having relative lateral movement. A link-bar 441 connects, at adjacent ends, two pairs of link-plates 439, the connection being made by pins 442. According to my invention, every other pair of link-plates 439 is connected to a link-bar 441, by means of said extended pivot-pin 438. Each pivot-pin is also provided with apertures 443, in which are set the feed-pins 437, which in cross-section are made substantially triangular, as shown in Fig. 23, with the vertices toward each other. These feed-pins 437, coöperate with notches 444, in the web 435, see Fig. 39, said notches being formed to correspond substantially to the shape of said pins, and said pins being spaced part on the pivot-pin 438, the exact distance necessary to fit snugly into said notches 444. The pins 437 are made just long enough to extend below the surface of the web 435, and travel within the grooves 436, of the top-plate 381, so as to obtain a substantial hold upon the web for feeding the same along the ledge 434. In consequence, as the feed-chain travels along the ledge, in contact with the web 435, the latter is fed positively and uniformly in the direction of the arrow, Fig. 23, and, when the pins reach the lower one of the sprocket-wheels 445, said pins will be lifted away from the web and lose their feeding engagement therewith. The sprocket-wheels are journaled at opposite ends of the frame 256, upon the pins 447, as clearly shown in Figs. 23 and 27, the said frame being composed of two like plates 256. Secured to the top-plate 381, by means of bars or brackets 448, is a chain-guard 449, see Figs. 27 and 29, which extends between the two sprocket-wheels 445, said chain-guard lying close to the upper surface of that portion of the chain which is feeding the web 435, between said sprocket-wheels. The shaft or journal of the upper sprocket-wheel 445, carries between the latter and the adjacent side-bar 256, a ratchet-wheel 450, under control of a spring-pawl 451, secured to said side-bar 256, said pawl preventing reverse movement of the feed-chain and sprocket-wheels and any back-lash which might otherwise occur in the operation of the machine. The teeth of the ratchet-wheel 450 are very fine or close together. In order to make the engagement of the feed-pins 437, with the notches 444 of the web, absolutely certain, I have provided at the top of the feed-chute and directly under the feed-chain adjacent the upper sprocket 445, a bowed or convexed plate 381$^a$, the same extending approximately from the extension-plate 388, to a position below the upper end of the chain-guard 449. The length of this convexed plate 381$^a$, which may be accurately set and made of rigid material, or may be made of resilient material, is caused to accord substantially with the distance the feed-pins 437 might travel without engaging the notches 444 in the web, if said plate were not interposed at this point. The provision of the plate, however, causes the web to rise into contact with the chain and thus bring the two into such intimate relation that the feed-pins are compelled to enter accurately into the notches of the web and practically up to their connection with the pivot-pin 438. This prevents any possibility of the feed-pins from only partially engaging the web and slipping therefrom or missing the same entirely as the said pins leave the sprocket-wheel at the upper end of the feed-chute. I consider this an important feature of my invention and lay stress upon it because by its use the accurate and positive feeding of the web is insured. At the lower end of the feed-chute, below the lower sprocket-wheel, I have provided a plate 383$^a$, connected by means of its flange and screw 383$^x$, to the cutter-frame 384, adjacent the ticket-slot 428, the object of this plate being to properly direct the lower end of the web, from which one or more tickets are to be cut, into the said slot 428, and also to prevent said end of the web from springing out of place. This plate continues the feed-chute at this point and operates as a cover for the latter to guard against displacement of the severed end of the web. For the same purpose and reasons, the bottom 383 of the feed-chute is either extended or provided with a lug or projection 383$^b$, located opposite the plate 383$^a$, and extending into the slot of the cutter-frame 384, so as to form the back of and complete the passage for the web 235, into the slot 428. The provision of these two parts 383$^a$ and 383$^b$ makes certain the direction of the web into the slot 428 and to the cutter and prevents any possibility of the end of said web springing or curling out of place or taking a wrong direction.

The web 435 is wound in cylindrical form, as shown in Figs. 1, 2, 3 and 4, and any number of these web-cylinders 452 can be held in reserve upon the supporting-bar 453, near the top of the machine frame. When one of these web-cylinders is required for use, it is slid laterally upon the bar and centered upon the spool 454, journaled upon said bar 453, see Fig. 3, and when in this position the flanges of the spool will hold the said web-cylinder from lateral movement. The spool 454 may be provided with a series of radial pins 455, screwed into the periphery of the spool and removable for the purpose of allowing the web-cylinders to be set upon the spool without removing the latter from the machine. To restrain the spool 454 from lateral movement longitudinally of the supporting-bar 453, I have provided the latter near its free end with a circumferential groove 453ª, see Fig. 43, into which certain of the pins 455 may be extended, by screwing the same sufficiently far down to provide the connection. The pins thus coöperating with the said groove 453ª, are the ones extending through the inner edge of the spool 454. By removing the pins 455, at this side of the spool, the latter can be slid along the supporting-bar 453, to remove the same, for any purpose desired, after the lock 456 has been removed from the holding-loop 457, to release the holding-plate 458; and when said pins 455 are in place, as shown in Fig. 43, the spool is set in the proper position without possibility of longitudinal movement on supporting-bar 453, which is fixed in the bearing 459, at one side of the frame, and extends to near the other side, at which point the said frame is provided with a door 460, hinged thereto, and which may be held locked by a spring-catch 461, see Figs. 1 and 3. As shown in Figs. 3, 37 and 38, a counter is supported on the door or face-plate of the machine, the dial-plate of which is indicated at 8, and is of the type known as odometers and is only conventionally shown. The barrels of the counter are indicated at 462, and the supporting-brackets therefor at 9. The device consists of two counting-cylinders of usual construction both of which register or count each and every article delivered from the machine. The lower cylinder is provided with a trip mechanism which enables it to be returned to zero after it has counted the deliveries from a complete web-cylinder. I have provided the shaft 463 of the upper counting-member with a ratchet-wheel 464, having ten teeth corresponding to the number of figures in each circle of numbers of the said member, and the shaft 465 of the lower counter-member is provided with a like ratchet-wheel 466. The shaft 463 has a lever 467 journaled thereon, carrying a pawl 468, and connected by a link 469, the upper end of which is journaled upon the shaft 465. The link 469 carries the pawl 470, the two pawls 468 and 470 coöperating, respectively, with the ratchet-wheels 464 and 466. A pin 471, carried by the lower end of the link 469, rides in a slot 472, in the lever 467. The lever 467 projects into the path of movement of the extended pivots 438 of the feed-chain, said lever being held in a normal operative position by means of the spring 473, connected at one end to the frame of the machine and at the other end to said lever, the latter being thus held so as to be tripped into action by each and every pivot-pin 438 which passes. Every complete reciprocation of the lever registers a number on the counter and each number thus registered indicates a ticket delivered from the machine, since the distance between such extended pivot-pins 438 of the feed-chain is the exact length of a ticket between the notches 444 of said web. No claim is made herein to the structure or form of counter or odometer; but, my invention resides in the means whereby said odometer is adapted to perform the several important functions in my machine. The mechanism combined with the odometer and the relation of said mechanism to the feed-chain of the delivery mechanism is the important feature of this part of my invention and upon it I desire to lay stress, it being understood that the upper member of the counter is caused to register the total number of articles delivered from the machine irrespective of the number of webs which may be exhausted in the machine, while the lower member of the counter is for the purpose of registering the total number of articles delivered from the particular web in operative position in the machine. The arrangement of the two counters is such that the upper member cannot be reached or tampered with and the numbers thereon are made to correspond with the numbers on successive articles in the webs which are numbered consecutively. The lower member of the counter, however, can be manipulated so as to reset the same, as before suggested, at zero after the numerals have been exhausted, or the articles in a given roll have become exhausted.

Extending alongside of the feed-frame is a rod 474, see Figs. 23, 34 and 41, the lower end of which is connected to the journal-pin 475, working in the bottom-plate 383, said pin having connected to it a duplex-catch composed of similar arms 476, carried by and extending vertically therefrom, said pin being operated by the rod 474. The upper end of each of the arms 476 is provided with a notch 477, coöperating with a like notch 478, in the lower end of the top-plate 381. The arms 476 form a duplex catch. The rod 474, near its lower end, is provided with the spread V-shaped portion 479, the upper leg of which forms an angle 479ᵇ with its upper end, which is free. The car 392 is provided with the slide 480, running upon said rod 474, for the purpose of actuating the same according to the position said car may be in; that is to say, in the position shown in Fig. 23, the slide 480 coöperates with the vertex of the V-shaped portion 479 of said rod and has, in this position, rocked the same upon its journal 475, so as to throw the duplex-catch outwardly. The upward travel of the slide of the car on the rod 474 causes the latter to rock in the opposite direction, which will throw the duplex-catch 476 inwardly into coöperation with the notched lower end of the top-plate 381, thus bringing the two notched portions 477 and 478 into coöperation. In the above position, shown in Fig. 23, a laterally-extending pivot-pin 438 is in engagement with the top of the duplex-catch 476 on both sides of the feed-chute. But, when the car 392 is in an upper position, ready for feeding the web, said duplex-catch will have been moved inwardly out of the path of travel of said chain-pins, hence, as the car descends, the chain can feed along normally until the angle 479$^a$ is reached; that is to say, the operation of the duplex-catch takes place according to the position of the slide 480, on the rod, from the angle 479$^a$ to the vertex of the V-shaped portion 479. In other words, in the upward travel of the car, the slide 480, combined with the angle of the upper leg of the V-shaped member 479, will cause the duplex-catch to be moved to the closed position with its notch 477 in coöperation with the notch 478, of the top-plate 381, and this closed position will be maintained from the time the said slide 480 passes the angle 479$^a$, from which point or time the duplex-catch is held in an inoperative position permitting the pivot-pins of the feed-chain to freely pass. This action is true, likewise, on the downward movement of the car and until the slide 480 reaches the said angle 479$^a$, from which moment the duplex-catch will be moved outwardly toward the position shown in Fig. 23, which position it assumes and maintains simultaneously with the stopping of the car at the lower extreme of its movement. At this moment the pivot-pins of the feed-chain will engage the upper ends of the duplex-catch and the feed movement of the chain will be instantly stopped and no further feed movement will be possible until the duplex-catch is again moved rearwardly, as before described.

The web 435, Figs. 45 and 46, may be a single strip of material and each section between the pairs of notches 444 may be consecutively numbered and be printed for tickets suitable for subways, street-cars, or other purpose. Or said web may be composed of strips of material 435$^a$, Figs. 47 and 48, secured together at predetermined points 435$^b$, leaving open spaces or pockets 435$^c$ between the securing points in which stamps or other flat articles may be inserted. In fact, my machine is capable of feeding flat articles in web form and wound upon a reel of any character, kind or description either in single, double or other strips, as may be desired. When formed double or made into pockets, each pocket may have an opening or mouth 435$^d$, through which to fill the same.

The driving-shaft 191, at its extreme left end, see Figs. 2 and 5, is provided with a ratchet-wheel 481, fixed thereto in any suitable way so as to rotate with it, and coöperating with said ratchet-wheel is a pawl 482, journaled upon a pin or stud 483, extending from the side-support 33. The pawl engages the ratchet-wheel by gravity though, obviously, it may be depressed by a spring, and operates always in engagement with said ratchet-wheel to prevent any back movement being imparted to the driving-shaft 191. This is an important element in my machine, since it prevents the operator, if using the hand-crank, from reversing the machine and thereby possibly putting certain of the mechanisms out of condition or "jamming" the machine in some other way. This device insures the proper forward rotation of the driving-shaft under any condition.

As previously stated, I may drive my machine by the hand-crank 302, by an ordinary treadle, or by a motor, and by the latter term I purpose including within the scope of my invention any mechanical motor whether driven by spring, compressed air, steam or otherwise, and also an electric motor. I have found it, however, in practice satisfactory to employ an electric motor and in producing my machine have applied the same, as shown in Figs. 1, 2, 3, 4 and 35; that is to say, I have supported the same upon the table 27 and provided a magnetic-clutch between it and the counter-shaft drive and have also placed a friction-clutch between the countershaft drive and the main driving-shaft 191, for purposes already stated. In wiring my machine for the purpose of connecting the same with any line or main or generator, or other source of electric power, I have so arranged the contacts and mechanisms that, upon the tripping of the coin-detecting mechanism into action, a current will be set up thereby through the motor, thus causing the shaft 279 to be driven and, through the intermediate mechanism, the main-shaft to be operated thereby starting a functional operation of the machine, provided all conditions in the latter are favorable, whereupon the circuit first closed will be broken and another circuit completed automatically by the switch-bar 339, actuated by the cam 336, on the main driving-shaft. The leads and contacts for the foregoing purposes are clearly shown in diagram in Fig. 36 and will now be explained in connection with Figs. 4, 5, 11 and 13.

Assuming a source of power, the current will traverse the lead $a$ to that one of the brushes 266, which coöperates with the slip-rings 265, near the magnetic clutch-member 264, and passing through the latter will, by the proper lead, go to the slip-ring 265, and its coöperating brush 266 nearer to the motor 29, through which it passes, and still following the lead $a$ will run to the first one of the contact-members 347, with which the switch-bar 339 coöperates, this contact-member being insulated from and supported by the bracket piece or guide 344, secured to the slide-plate 11 of the machine. At this point, the current cannot pass in the normal condition of the machine and can only pass when the contact-member 348 is in coöperative relation to the spring-contacts 347 to close the circuit. Hence, the current will pass by way of the lead $b$ to, for example, the twenty-five cent slide on the extreme right of the machine, and will run to the outer one of the contact-members 130, which, if the contact-device 144 of the lever 134 be in coöperative relation, as shown in Fig. 13, with said spring-contacts 130, will pass the current by way of the lead $b$ through to the source of power, as indicated by the negative sign. This completes a circuit including the magnetic clutch, the motor and the twenty-five cent slide, and thereby drives the shaft 279, alined with the motor-shaft 263, which transmits its motion to the clutch 292—295, and thence through the sprocket-chain 300, to the driving-shaft 191, and, with the parts in the position shown in Fig. 13, the clutch-member 325 will be shifted into driving connection with the clutch-member 326, thus imparting rotary movement to the driving-shaft 191, resulting in a functional operation such as the delivery in this instance of five tickets from the web 435. During the rotation of the driving-shaft, the cam 336 will coöperate with the antifriction roll 338, carried by the switch-bar 339, thus forcing the contact-member 348 between the two contacts 347, and substantially at the same time the mutilated-gear 201 will coöperate with the rack 193, of the angular tripping-lever 192, thus lifting the same together with the cocking-lever 134, and thus breaking the circuit through the contact-members 130 and 144. This breaking of the circuit in the lead $b$ taking place just after the circuit $a$ is closed is between the contact-members 347 and 348, results in shunting the current along circuit $a$, the current being thus continued along the latter to the return-lead $b$ and to the negative side of the main or generator. By causing the opening of the circuit at 130 to take place just after the closing of the circuit at 347, sparking is eliminated and the operation of the machine is rendered continuous. The passing of the cam 336, from the roller 338, permits the spring 341 to take control of the switch-bar 339, and thus withdrawing its contact 348 from the contacts 347, thus breaking circuit $a$, the torque of the clutch 282—264, the motor-circuit, and stopping the machine, this action taking place at the end of a complete rotation of the driving-shaft. Since the current in the motor or the inertia of the shaft 279 may tend to continue the drive of the main-shaft 191, and since the latter, after its complete functional rotation, is locked from further movement by the buffer-cam 213, coöperating with the buffer-pin 211, the clutch 292—295 is interposed in the drive between said two shafts for the purpose of preventing any torque being imposed upon said driving-shaft, this being accomplished, obviously, by the slipping of the two clutch-members 292 and 295 relatively. It will be presently pointed out, in the description of the mode of operation of my machine, how each of the several devices and mechanisms carried by the main-shaft, together with their complemental or coöperating devices and mechanisms, perform their functions in a single cycle or rotation of said driving-shaft 191.

Assuming that the ten-cent slide is to be operated, when said slide is forced in and all the conditions are right, the lever 134 will be tripped into action, as previously explained, whereupon the contact-member 144 of said ten-cent slide mechanism will drop into coöperative relation with the spring-contact 130, thus completing the circuit through the lead $a$ to the clutch 264, and thence, as before described, through the motor 29 and the lead $a$ to one of the spring-contacts 347, and through the lead $b$, to the lead $c$, to the said spring-contacts 130 of the ten-cent slide mechanism. The circuit being completed by the contact-member 144, the current will continue through the lead $c$, to the lead $b$, and thence through to the negative side of the main or generator in the same manner as before described with reference to the twenty-five cent slide. The main-shaft will be actuated, as before described, and at the proper time during its operation the switch-bar 339 will be actuated to drive its contact-member 348 into coöperation with the spring-contact 347, and thus complete the circuit through the lead $a$ and thence through the lead $b$, to the negative side of the main or generator, as previously described, the circuit $c$ being opened as described with reference to circuit $a$.

Assuming that the nickel-slide is to be operated, the same action will take place with regard to forcing in said slide and tripping the lever 134 into action, thus completing the circuit through the lead $a$, the magnetic clutch 264, the motor 29, the lead $a$, the lead $b$, the lead $c$, and thence to lead $d$, since the circuit is open in the lead $c$, also in the lead $b$, and thence through the spring-contacts 130, the contact-member 144 being in coöperation with the latter, and thence continuing through the lead $d$ to the lead $b$, and to the negative side of the generator or main, as previously described, the operation of the driving-shaft bringing about coöperation of the contact-members 347 and 348, and the breaking of the circuit at 130—144, in lead $d$, as previously described with reference to the ten and twenty-five cent slides.

As has been previously suggested, the electric lights 36 are operated to illuminate the coin-cups of the conveyer coöperating with the chutes of the several coin-slide mechanisms for the purpose of enabling inspection of the coins deposited in said cups. This is accomplished by tapping the lead $a$ between the source of current and the magnetic clutch and carrying the current through lead $e$, and through the several lamps 36, arranged in parallel, to the negative lead $b$. Hence, it will be seen that the lamps 36 are in an independent circuit and will be constantly lighted to illuminate the conveyer and the coin-cups.

It has been found that, in the rapid operation of the feed-chain, as in feeding five tickets at a time, and owing to the inertia of the web, when first used, the latter is caused to spin and loosen quite a stretch of the web on the cylinder. While this has never occurred to an objectionable degree, I consider it important to provide means for preventing the occurrence. Hence, a brake 484 is fastened to the front-plate 4, or any other suitable portion of the machine frame, see Fig. 3, by a bracket or base 485, said brake consisting of a spring-blade flexed to impose pressure upon the periphery of the web and exert enough tension thereon to prevent the same from delivery except under the pull of the feed-chain or equal stress.

Throughout the description, I have referred to "pins" which run in cam-grooves or coöperate with cams or other parts for the various purposes of my machine, but I wish it distinctly understood that in practically every instance I have employed anti-friction rolls carried by said pins because, in some instances, I found that without them the parts would bind and drag and frequently result in breaking or injuring the parts.

The foregoing description has been given in connection with a single coin-slide mechanism in conjunction with all the other essentials of my vending machine of "unit" type; that is to say, though it has been assumed throughout the description that the machine is to vend or deliver one, two or five articles, for convenience the coin-slide mechanism, located and adapted for delivering five articles, or articles representing in value twenty-five cents, viz., the coin-slide shown in Figs. 5, 7 and 34, located at the extreme right of the machine has been described. And it is to be borne in mind that this coin-slide mechanism or unit can be duplicated indefinitely in a gang-machine without duplicating any of the other elements and mechanisms described for continuing and completing the functions of said units. With these facts in mind and with the foregoing detailed description, the following mode of operation will be readily understood with reference to Figs. 3, 4, 5 and 34.

Assuming a source of electric current, the machine at rest and in readiness for the delivery of one or more articles, as the case may be, and assuming a good coin of the proper denomination, viz., a twenty-five cent piece, inserted in the coin-aperture 60 of the coin-slide 12, the operator will push said slide inwardly or toward the rear of the machine by means of the handle or knob 68, whereupon the coin will pass the thick-coin stop 101, and run under the depressing-plate 96 and gage-roller 104. Engagement of the coin and roller causes the stop-pin 114 to be lifted by the frame 107—110, thus permitting the cam-lug 65, on the end of the coin-slide, to pass. Likewise, since the tickets are under the feeler 258, the stop-finger 262 is held up from interference with the cam-lug 65. No obstruction being presented to the coin-slide and the operator having forced said slide to its rearward extreme limit of movement, the rear end thereof will engage the trip-rod 54, and drive it from its seat 56 against the pressure of its spring-controlled plunger 46, thus enabling the expansive power of the coiled-spring 122 to drive the ram 120 into engagement with the coin, which has been properly centered under said ram by the rearward movement of said slide. The tripping of the rod 54 brings the parts into the position shown in Fig. 13, with the cam-block 157, of the cocking-lever 134, in engagement with the cap-piece 162, and the two holding the pin 194 of the lever 180 in the cam-groove 324 of cylinder 322, the pin 195 within the drum 319, said pin having entered the slot 321 in the flange 320, and the pin 193 out of peripheral groove 323. The same movement of lever 134 brings the roller 152, of bearing 147, into engagement with the arm 202, which is caused to rock the segment 204 and shift the buffer-post 208, thus enabling the shaft 191 to be turned. This is a functional position of all the parts just described and is preliminary to a functional operation of the machine. The movement of the coin-slide just described also brings the coin into position on the throat-plate 235 directly over the coin-escape opening 43 in the slide-plate 11, and this movement of the coin-slide also compresses the spring 70, surrounding the guiderod 71, and thus stores up in said spring ample power to compel the return of the coin-slide to its normal inoperative position when the conditions are right for the purpose. Simultaneously with the centering of the coin, as above stated, the pawl 217, carried by the rock-shaft 218, drops into the V-shaped notch 67, at the right edge of the extreme rear end of said coin-slide, thus holding the latter against the power of the spring 70 to force it back to its normal position. The expansion of the spring 122, which drove the ram 119 into engagement with the coin, likewise operates upon the lever 134, through the slide 132, to turn said lever upon its fulcrum 135, and thus drive the same downwardly and force the angular trip-lever 192 downwardly causing, at the same time, its pins 199 to slide from their bearings 200, in the upright 25, the trip-rod 54 shifted, as before suggested, permitting this operation. The downward movement of the lever 134 also brings the contact-device 144 into engagement with the spring-contact arms 130, thus closing the circuit b, Fig. 36. The downward movement of the angle-lever 192, guided by its pins 198 and 199, in the grooves 197, of the upright 25, places its rack 193 in position such that the mutilated-gear 201, on the main-shaft 191, may coöperate with it at the proper time during the rotation of said shaft in the direction indicated by the arrow, Fig. 8. The forward movement of the coin-slide 12 is accompanied also by the forward movement of the rod 77, the forward beveled end 77ª of which will be forced between two of the balls 78, contained in the carrier 79, thus driving said balls apart and filling all the vacant space within said carrier and preventing the entrance of anything else between said balls. This is a "gang" feature; that is to say, a feature used in connection with gang-machines, as will be presently described, and has no function in a machine composed of a single unit. This feature will be fully described in connection with the gang mechanism. The circuit a having been closed across the contacts 130—144, through the medium of the leads b, the member 282 of the magnetic clutch will be drawn into engagement with the member 264 and the motor 29 will operate to drive the alined shaft 279, the gear 286 on which will drive the gear 288, the countershaft 289 and friction-clutch carried thereby being thus driven and the sprocket 297, through the medium of the chain 300 and sprocket 301, on the driving-shaft 191, will cause the rotation of the latter. Said shaft being thus rotated, the various elements and devices carried thereby are arranged in such coöperative relation and are so timed relatively and arranged in such coöperative relation to the other mechanisms of the machine as to produce, in one cycle of movement of said shaft 191, the following results: The jog in the cam-groove 352, in the side of the disk 237, will immediately operate upon the pin 353, and move the bar 354 longitudinally, said bar in turn vibrating the lever 357, which will move the slide 363 forward, thus moving forward the gear 364, which is always in mesh with gear 365 and also rides over the top of the latter. Engagement of gear 364, with the upper end of the rack-bar 370 is thus brought about, said rack-bar being connected to the feed-car 392, thus bringing about an operative relation between these and coöperating elements of the feeding mechanism. Shortly after this operation, the continued rotation of the driving-shaft 191 will bring the jog 238 of the cam-groove in the periphery of the disk 237 into coöperation with the pin 239, carried by the lever 240, connected at its forward end to the throat-plate 235, resulting in shifting the throat-plate to the left sufficiently to permit the coin to be forced by the ram, still in engagement with it, through the aperture 43 in the slide-plate 11, said coin thus being caused to traverse the chute 116ᵇ, and drop into one of the coin-cups 245ª, of the coin-cup conveyer, which, in the meantime, has been started into operation through the medium of the sprocket-wheel 303, located at the extreme right end of the driving-shaft 191, motion being transmitted through the sprocket-chain 305, sprocket-wheel 306, pinion 309, gear 310, and the sprocket-wheels 312 and 312ª driving the chain 246 of said conveyer. The position at this time of the pin 193, carried by the lever 166, the pin 194, of the lever 180, and the pin 195, of the latter lever, has been stated. The rotation of the driving-shaft causes the flange of drum 319 to hold pin 195 of the lever 180 under control, thus also holding the pin 194 of said lever in the cam groove 324 of cylinder 322, so that said cam-groove will cause the shifting of said cylinder, and the coöperation of the circle of clutch-teeth 325 and 326 of said cylinder and hub 327, respectively, resulting in driving the gear 328, which meshes with gear 329 on shaft 330, rotation of which latter will rotate gear 365, which will rotate gear 364 now in mesh with rack-bar 370, connected to the feed-car 392. Said car is, consequently, at this point, caused to run up the track-bars 382 and assume a position suitable for the engagement of its catches 397 with the opposite ends of a pin 438 of the feed-chain and sufficiently high to enable the proper length of movement to be given to said chain to deliver five tickets from the web 435. The shifting of the throat-plate 235, as stated, to drop the coin into the chute, marks the point at which the ramming function, or downward movement of the ram, is completed, the ram, its connected cocking-lever 134, the tripping angle-lever 192, and trip-rod 54 being, in consequence, in readiness to be elevated and reset in their normal inoperative positions. These functions are accomplished subsequently to the shifting of the throat-plate 235 and by the continued rotation of the driving-shaft, which brings the mutilated-gear 201 into mesh with the rack 193 of the tripping-lever 192, see Figs. 39 and 40, the plain portion of said gear having theretofore been presented toward said rack. The mutilated-gear and rack now being in mesh, continued rotation of the driving-shaft causes the tripping-lever 192 to be lifted, the fork of the latter operating to lift the lever 134, through the medium of the bearing 147 and its connections, and thus also lifting the ram 120, through the medium of the sliding-shoe 132, thus compressing the spring 122 and storing up power therein preparatory to its next operation to test the next coin placed in the coin-slide. The trip-rod 54 is also lifted and reset upon rest 56 and pins 199 of tripping-lever 192 are reset in notches 200, as previously described in detail. This operation results in recocking the ram 120 and returning the cocking-lever 134, with cam-block 157, to normal position. Simultaneously with the lifting of the lever 134, the circuit completed by the contacts 144 and 130 is broken; but, just prior to the breaking of this circuit, the circuit $a$ is completed by the shifting of the contact-bar 339, so as to enter the contact 348, between the contacts 347, this being accomplished by the cam 336, carried by the driving-shaft adjacent the driving-sprocket 301, said cam operating upon the roll 338, carried by said bar 339. The bar 339 is directed in its operation by the guiding-arms 344, carried by the slide-plate 11, and the shifting of said bar being against the pull of its spring 341, which, during said movement, is extended and thus has power stored therein for the purpose of, at the proper time, returning said bar 339 to its normal inoperative position to break the circuit $a$. At this point, it should be borne in mind that the breaking of the circuit $a$, $b$, at the contacts 144—130, and the closing of the circuit $a$, across the contacts 347—348, in the manner stated, prevent sparking and cause the current to be shunted around for the functional purposes of the machine, viz., a complete rotation of the driving-shaft, which brings about a cycle of movements in the mechanisms of the machine. At the same time the feed-car 392 was elevated, the lever 403 was released by the catch 402, thus permitting the spring 433 to swing said lever on its fulcrum through the medium of the rod 430, this swinging of the lever driving the locking-rod 408 downwardly so as to enter the aperture 412 in the cutter-bar rod 411, which, at the same time, was being operated upon by the lever 414, the anti-friction roller 419 of which coöperates with the cam 420, on the driving-shaft 191, the operation of said cam, upon said lever, forcing the said rod 411 forward, thus moving the cutter-blade 424 to its extreme of forward movement, in which position it is set by the coöperation of the said rod 408, with the aperture 412, in the rod 411. This movement of the cutting-blade causes the compression of the spring 421, resulting in storing power therein preparatory to a cutting operation presently to take place. At this time the driving-shaft has made about a half rotation and the coin-slide has been held from returning to normal inoperative position by engagement of pawl 217 in notch 67 of said slide. The buffer-cam now comes into coöperation with the arm 220 on the rock-shaft 218, resulting in lifting said pawl 217 and freeing said coin-slide. The spring 70, or yielding, retrieving device, immediately takes control and returns the coin-slide to its normal inoperative position. Should attempt be made to hold the slide in, as heretofore explained, the radial-cam 227, or positive retrieving device, now coming into action, will force the slide forward beyond the stop-pin 114, thus preventing defrauding the machine. The recocking of the ram, as before described, is completed substantially at this time which is about three-quarters of a rotation of the driving-shaft. The pressure of the spring 122, coupled with the seating of the rod 54 upon the rest 56, holds all the connected parts in an inoperative position with the rack 193 of the angle-lever out of the path of rotation of the mutilated-gear 201, and in such position that said gear cannot engage the rack, or the lever, should a successive rotation of the driving-shaft 191 take place. At this point, note should be taken of the fact that the ram-spring 122 is the holding factor, since its downward pressure upon the ram transmits its power through the latter to the bearing 147, through the latter to the angle-lever 192, and through the latter to the trip-rod 54, which is firmly held at rest at 56, said rod becoming, in point of fact, the fulcrum, or one of the fulcra, for said angle-lever 192, resulting, in combination with the pins 198, in holding the lower end of the lever 192 in the position shown in Fig. 8, with its oppositely-extending pins 199 firmly set in the notches 200 of the upright 25. As the ram is reset by the cocking of lever 134, the arm 202 is allowed to return to normal position, resulting in drawing the buffer-post 208 into the path of the cam 213, so as to stop the main-shaft at the completion of a single rotation. During the last one-tenth, substantially, of the rotation of the driving-shaft four important operations take place, viz.: The pin 194 of the lever 180 reaches the jog in the cam-groove 324, and disengages the teeth 325—326 of the clutch, and the cylinder 322 is quickly thrown back to its inoperative normal position and, since the teeth of the clutch-members are disengaged, no further movement of the feed-car upward is possible; at the same instant the clutch is thrown, the side roller 195 of lever 180 reaches the slot 321, in the drum 319, and the lever is drawn back by its springs 184 to its normal position; the electric circuit is broken by the separation of contact-device 348—347, the cam 336 passing and spring 341 taking control of bar 339; the torque in the magnetic-clutch 264—282 ceases; and the main shaft becomes locked by buffer-cam 213. Also, during the latter portion of the rotation of the driving-shaft, the cam-disk 237 has been rotated to a position such that the jog in the cam-groove 352 will ride into coöperation with the pin 353, resulting in reversing the movement of the lever 357, and withdrawing the gear 364 from the rack-bar 370. The moment this action takes place, which is coincident with the locking of the driving-shaft, the feed-car descends, thus causing the pivoted hooks 397 to engage the extended pivot-pins of the feed-chain, which are immediately thereunder. The weight of the car, coupled with the impulse given the same by the tension-spring 375, connected to the rack-bar 370, causes said car to rapidly descend, thus imparting a rapid feed movement to the feed-chain, the feeding-pins 437, in the grooves 436, being in coöperation with the notches 444 of the web, resulting in the delivery of articles corresponding to the amount of feed movement given, which is dependent upon the coin-slide mechanism, which may be in operation. As the feed-car descends, or substantially at the time it reaches its lower limit of movement, the hook 402, carried by bar 401, coöperates with the lever 403, thus lifting the locking-rod 408, and permitting the power of the spring 421 to drive the cutting-blade 424 into coöperation with the ledger-blade 427, thus severing the web at this point for the delivery of the article therefrom, said article dropping by gravity, after being thus severed from the web, into the chute 21, where the operator can obtain the same. Also, during the descent of the feed-car, the rod 474 is actuated by the slide 480, in coöperation therewith, acting upon the V-shaped portion 479, the beginning of such action being at or about the angle 479$^a$, and the action of said slide upon the rod being to press the same forward and thus rock the duplex-stop 476 upon its journal 475, so as to present the upper ends of said duplex-stop in position to be engaged by the extended pivot-pins of the chain, which are next directly above said ends, thus preventing said feed-chain from being given any further feed movement. Back-lash or reverse movement of the feed-chain is prevented by the pawl and ratchet device 450—451. Thus, after a delivery is made by the feeding mechanism just described, a further feeding movement of any degree is absolutely prevented and the feed-chain, which has entire control of the web of articles, is maintained at rest until the feed-car is again elevated preparatory for another feeding movement; and the duplex-stop is not moved out of coöperative relation with the feed-chain, as just described, until the slide of the feed-car passes the angle 479$^a$ of the rod 474. During the feeding movement of the feed-chain, the pins on the stretch thereof, opposite that portion which is feeding the web, engage the extended lever 467 of the counting mechanism; that is to say, just to the extent that the feed-chain is driven by the feed-car and just to the number of pins that indicate the number of deliveries by said feed-chain, so, on the opposite stretch of the latter, a corresponding number of pins will pass the lever 467 and successively operate the same, which, through link 469 and pawls 468 and 470, will drive the ratchets 464 and 466 a corresponding number of teeth, the spring 473, coöperating with the lever to impart the requisite number of reciprocations for registering the number of deliveries from the web. Hence, it will be understood that, for every article delivered, one pair of feed-pins passes a given point, for example, that indicated by the arrow X, Fig. 27, and for every pair of pins that passes such point a pin of one of the pairs will engage and operate the counter-lever 467, the spring 473 instantly returning said lever to position to be engaged by the next pin passing in the same direction; also, that for every movement of the lever 467, both ratchet-wheels 464 and 466 are moved to the extent of one tooth, thus turning the shafts of the two counting members one degree or number of their counting wheels.

At the time the gear 364 is moved from engagement with the rack 370, as just described, the driving-shaft 191 has completed its cycle of movement, or single rotation, it being understood that the shaft 279 also comes instantly to a stop, while the impetus given to the motor-shaft 263 may allow the rotation of the latter to continue for a short period. At this point, it should be noted that, even though the attraction between the magnetic clutch-members 264—282 should not be instantly eliminated, as just suggested, and, in consequence, the parts cling for a period after the circuit has been opened, which would result in continuing the drive of the main-shaft 191, no damage would be done to the machine, owing to the intervention of the friction-clutch 292—295, the members of which may slip relatively and thus, as the driving-shaft is brought to a stop, the alined shaft 279 and countershaft 289 could be continued in motion indefinitely without jamming the machine. From the foregoing, it will be understood that the machine is at rest with power stored in the ram and all the operative parts of the machine in position ready for the repetition of a functional operation; and it should be understood, at this point, that the foregoing description is that of any one of the coin-slide mechanisms or "units" heretofore referred to, in combination with the other essentials going to make up my vending machine, and that the operation of my machine, as just given, is wholly with reference to a good coin of the proper denomination inserted in the slide, constructed and gaged, as to its coin-receiving aperture, for the reception of such coin. It has been suggested, however, during the course of this description, that certain mechanisms have functions which have not been described in the foregoing, these functions having reference to the operation of the machine upon spurious coins and checks of various kinds, irrespective of the material of which they may be made. Some of these mechanisms also have functions with reference to preventing injury to the machine by malicious tampering with the same and also with reference to rendering the machine, as near as humanly possible, "foolproof." These operations and functions will now be described.

If attempt is made to operate the machine without depositing a coin in the coin-aperture 60, and the coin-slide is pushed rearwardly, the thin-coin detector or stop mechanism, including the gage-roller 104, will immediately manifest itself, since said roller, running in the central groove 57 of the coin-slide, will, when the coin-aperture reaches the same, drop thereinto, thus causing the stop-pin 114 to drop into the path of travel of the end of the coin-slide carrying the cam-lug 65, resulting in said lug, or the end of the slide adjacent thereto, striking said stop-pin and holding the coin-slide from further inward movement. This function and operation will also be performed in the event a coin of any character thinner than a good coin of proper thickness be placed in said coin-aperture and also in the event a check or ring, provided with a hole or depression, be placed in said coin-aperture 60. From this it will be understood that the differences in operation of the coin-gage and detector result from the fact that the parts are so constructed and so arranged and set relatively that, with a good coin of the proper thickness, the roll 104 will ride up and across the periphery or edge of said coin and onto its surface, thus lifting the stop-finger 114 to permit the passage of the coin-slide; but, if the coin be not of sufficient thickness, or if provided with a depression or an opening, the vertical movement of the stop-pin 114, as gaged by the roll 104, will not be sufficient to permit the passage of the end of the coin-slide, it being understood that the bottom of the groove 57 is normally slightly below the surface of a good coin of the proper thickness when inserted in the coin-aperture 60. From this it will be seen that this mechanism, in the aspect of its gaging function, is purely a gage of the thickness of the coin placed in the coin-aperture and performs the important function of detecting differences in the thickness of coins and controlling the operation accordingly of the stop-pin 114, and through the latter controlling the movements of the coin-slide. Consequently, I desire to lay stress upon the accuracy of operation of this gage, together with its ease of operation and the fact of the performance of all its functions automatically, as well as the fact that it is exceedingly sensitive in operation because the parts of the device are light and under light spring-tension at 126, and the roll 104 is anti-frictional in character. Hence, the periphery of the roll 104 is slightly rounded, though it may be flat, and has no marking, scoring, or cutting function. As a result, the gaging-roller offers absolutely no resistance to the free inward movement of the coin-slide 12 when pressure is applied thereto by the hand for manipulating the same by the knob 68.

If the coin is too large, viz., of greater diameter than the coin-aperture 60, it will not fit the latter and, consequently, the slide cannot be pushed in because of the interference of the coin with the plate 96, the ribs of which, as shown in Fig. 14, depend into and nearly touch the bottom of the grooves 58 and 59 of the coin-slide. The function of this plate, in coöperation with a good coin of proper thickness and diameter, is to prevent said coin from tilting in said aperture as the slide is moved forward, the forward ends of said ribs 99 and 100 being beveled for the purpose of permitting the passage of the edge of the coin under the plate and the latter holding said coin flat in the aperture 60. Likewise, if the coin be too thick, the stop-finger 101, the lower end of which projects into the central groove 57, will interfere with the passage of the coin and, consequently, with the movement of the coin-slide 12 into position to be gaged by the roll 104. This finger can be adjusted vertically so as to gage with great nicety the thickness of a good coin of proper size for reception by the coin-aperture 60; and it will be noted, upon reference to Figs. 17 and 18, that the central slot 57 is extended at its front end for the purpose of accommodating the said stop-finger 101.

If the coin inserted in the aperture 60, though of proper thickness and diameter, be made of steel or any metal capable of attracting the magnet 86, the very moment the same is inserted in said aperture, the magnet-arms 87 will be attracted to said coin, resulting in bringing the upturned points 92 of said arms into coöperation with the ratchet-teeth 93, on the bottom of the coin-slide 12, and thus locking the latter against forward movement, this occurring at the very inception of a proposed operation, since, ordinarily, the coin would be first inserted in the aperture and then attempt made to move the coin-slide by pressure upon the knob 68; and this hindrance to the movement of the coin-slide 60 will be maintained until the attraction for the arms 87 is removed from the slide. If, however, the presence of the magnet were previously discovered and attempt made to move the slide so as to pass the aperture 60 therein beyond the arms 87, and then insert the magnetic coin, and thus operate the slide, this attempt would be defeated, owing to the extent of the ratchet-portion 93 of the slide, which is sufficient to coöperate with the upturned ends of the arms 87 until the aperture 60 has passed the front-plate 4 of the machine and reached a point beyond which it would be impossible to insert the coin. Hence, any attempt to operate the slide in this manner would be defeated, and no jogging or vibration of the coin-slide would even tend to destroy the attraction between the coin and arms and thus break the coöperation between the ratchet 93 and the upturned ends 92 of said magnet.

If a coin of the proper thickness and diameter, but not of sufficient tensile strength, be inserted in the slide, it might pass the stop-finger 101, plate 96, gaging-disk 104, and, consequently, the stop-pin 114, so as to permit the movement of the coin-slide to its rear extreme and thus trip the rod 54 from its seat 56, resulting also in tripping the angle-lever 192 and allowing the spring 122 to depress the cocking-lever 134, and drive the ram 120 with force against the coin, which has necessarily, by the complete rearward movement of the slide, been centered directly under the head 121 of the ram and seated upon the throat-plate 235, over the coin-escape opening 43 in the slide-plate 11. As will be understood, by tripping the rod 54 and bringing into action the ram 120, as just noted, the proper connections have been established to operate the main-shaft 191, which will have a complete revolution to restore the ram-mechanism and coöperating parts to normal position. But, the force of the ram striking the coin of insufficient tensile strength, has been sufficient to instantly buckle the latter and drive it through the throat-plate and opening 43 in the slide-plate, thus permitting the ram-head to fall lower or into the throat-plate and aperture 43, and thus cause the lever 134, with its cam 157, to drop clear past the cap-piece 162, carried at the upper end of the arm 165 of the lever 166, as shown in Figs. 15 and 16. The result is that, though the cam 157, carried by the lever 134, has, during its descent, assumed for a moment, with reference to the cap-piece 162, the proper operative relation to draw the pin 194 into the cam-groove 324, and withdraw the pin 193 from the circumferential groove 323, and though, also, the roll 152, carried by the bearing 147, has operated upon the arm 202, carried by the shaft 203, to cause the segmental-gear 204 to operate the buffer-mechanism and drive it from under the buffer-cam 213, thus permitting the rotation of the driving-shaft 191, this operative condition of parts lasts only for a fraction of a second, since the cam 157 and the roll 152 rapidly pass downwardly, the one beyond the cap-piece 162, into the position shown in Figs. 15 and 16, and the other into the depression 216 of the arm 202, thus immediately returning the pin 193 to the circumferential groove 323 and retracting the pin 194 from the cam-groove 324. In other words, the movement of the parts just described into operative and then to inoperative position occurs so rapidly that, although the buffer-mechanism is removed from interference with the buffer-cam 213, and the driving-shaft 191 is allowed to rotate, said shaft cannot move fast enough to catch the pin 195 within the circumference of the drum 320,—said pin having moved rapidly into and out of the slot 321,—and, in consequence, the clutch-teeth 325 and 326 have not been brought into coöperative action and the gear 328 has not been moved so as to drive the coöperating gear 329 to actuate the shaft 330, and thus drive the gear 365, running to the feeding mechanism. In consequence, though the circuits are closed, the driving-shaft is given a complete rotation and the parts actuated are restored to their inoperative position ready for another or functional operation, no feeding movement has taken place and, in consequence, no delivery has been made by the machine. It should be understood, in connection with the spring 122 of the ram, that the same is gaged and selected with reference to the blow necessary to be imposed upon or delivered to the coin in the coin-slide and, in consequence, is tested with reference to the tensile strength of a good coin of proper thickness and denomination. Hence, any coin, which may pass the stop-devices heretofore described and give to the machine the operation just indicated, and does not possess the tensile strength of a good coin of proper dimensions, will either be buckled and jammed through the throat-plate, or else will receive such a depression as to permit the lowering of the ram sufficiently to enable the parts to assume approximately the position stated with reference to Figs. 15 and 16 and thus prevent the machine from operating so as to make a delivery of articles contained therein. The operation just described with reference to a coin unable to stand the blow of the ram will also occur if the coin be too small for the aperture 60 of the coin-slide; that is to say, and at this point stress is laid upon the fact that, the seat 233 for the coin, provided by the throat-plate 235, and the seat for the coin, provided by the fixed plate 232, are so gaged relatively to the coin, proper for the coin-slide, that the diameter of the opening between the two seats, when the throat-plate is in the position shown in Fig. 5, will be approximately one-thirty-second of an inch less than the diameter of the coin, in consequence, giving the coin a seat upon each jaw amounting to approximately one-sixty-fourth of an inch. This measurement has been worked out with reference to the tensile strength of a good coin of proper thickness and with reference to the power of the spring 122, which operates the ram. In other words, the strength of the ram-spring 122 and the diameter of the opening in the throat-plate are gaged with reference to the tensile strength of each coin which is to be the operating key for a given coin-slide mechanism; and by this it is to be understood that a nickel, or five-cent piece, is of greater tensile strength than either a dime, or a quarter, and that the latter is of greater tensile strength than a dime. In consequence, any coin placed in the coin-slide, which is not possessed of the proper tensile strength, will either be driven through the throat-plate and aperture 43 into the coin-chute, or else so indented as to cause the parts shown in Figs. 15 and 16 to assume approximately the position of such figures, resulting in the operation of the driving-shaft, as described, without a delivery from the machine.

From the foregoing description, it will be readily understood, and upon the fact I desire to lay stress, that my machine is rendered absolutely junk-proof; that is to say, disks or rings of paper, fiber, tin, lead, brass, steel and iron, or any other material, will all be either prevented from passing into the machine, or will be rammed therethrough by the ram, so that the machine cannot be put out of action by malicious tampering. At this point, also, I desire to lay stress upon the fact that the ram-head 121 is so constructed as to impose a blow without injuring a good coin; that is to say, the head of the ram is, or may be made, rectangular, or even slightly convexed in cross-section, in contradistinction to having a form or shape which might tend to mar or mutilate the coin. At this point, also, the importance of the pawls 217, carried by the rock-shaft 218, should be noted, since, when the coin-slide has been pushed to the extreme of its rearward movement, the pawl 217 rides over the end of the coin-slide and drops into position ready for coöperation with the notch 67, which coöperation will take place immediately after the rod 54 has been tripped and the slide has been released by the hand of the operator. This coöperation of the pawl with the coin-slide occurs at the time when the coin is accurately centered under the head of the ram and over the aperture 43, and properly seated on the throat-plate. In consequence, the coin is without support at any point, except upon the fixed plate 232 and the throat-plate 235, and no portion of the coin-slide, surrounding the aperture 60, can interfere with the operation of the ram and its continued descent through the aperture when the throat-plate has been shifted to permit the coin or check to pass through the aperture 43 into the chute. Hence, nothing but the coin, thus centered or placed, can interfere with the operation of the ram, and when the throat-plate is shifted the coin has no further support and immediately tips from the stationary seat 232 and is forced through the aperture 43 into the chute down which it slides to the coin-conveyer. Thus, it will be seen that the pawl 217 has an important function, in combination with the coin-slide and ram as a means for holding the coin properly centered for receiving the blow of the ram and as a means for so holding the slide that its aperture 60 will perfectly coincide with the throat-plate aperture and, hence, will not interpose any obstruction to the proper and accurate operation of the ram.

Another and important operation takes place in the event the web of connected articles, being delivered from the machine, fails for any reason, such as when the web becomes exhausted, or torn, or separated in any way, whereby the continuity of the web is broken at the entry of the feed-chute; that is to say, the feeler, composed of the disks 258, journaled upon the short shaft carried by the arm pivoted at one side of the feed-chute, is supported in the position shown in Fig. 3 by reason of its central disk bearing substantially centrally upon the web as it is fed into the feed-chute and directly above the slot in the extension thereof. In this position, the rod is held so as to lift the crank-arm carried by one end of the shaft, which, near its opposite end, carries the arm, provided with the pivoted finger, which depends within the frame of the gaging mechanism and normally stands, in this condition of parts, above and out of possible contact with the cam-projection 65, on the left side of the extreme rear end of the coin-slide 12. If, for any reason, as previously suggested, the articles, or the web, should fail and the central disk of the feeler should fall within the slot of the feed-chute extension, the rod connected to the end of the shaft supporting said disk would immediately drop and thereby depress the arm connected to the end of the rock-shaft, which, in turn, would depress the arm carrying the pivoted finger, which latter would immediately drop into position so as to engage the cam - projection 65 of the coin-slide. With this condition of the parts, the coin-slide cannot be forced inwardly, since the cam-projection will engage the depending-finger and the latter, though pivoted, will swing a short distance rearwardly and engage the rear bar 110 of the frame and thus hold the coin-slide against further rearward movement. This condition may exist either by reason of the fact that the web or articles at the entry end of the feed-chute has become exhausted before a functional operation is attempted, or even after a functional operation has been produced by the complete movement of the slide, and then, for some reason, the articles or web has become exhausted, as previously stated. Should this latter occur, the depending-finger will immediately drop to its proper position, but, as the slide is at its rearward extreme, or the cam-projection is at some point in rear of said finger, as the slide is moved back to its normal position, the cam-projection 65 thereof will slide past the depending-finger by reason of the fact of its being pivoted and no impediment is presented to its operation in that direction, as clearly indicated in Fig. 9. The cam-projection of the slide having thus passed the finger, the latter will immediately swing to its normal vertical position in the path of travel of the said cam-projection, thus presenting a stop to the rearward movement of the coin-slide, under any circumstance, as above suggested. In consequence, even though a coin be deposited in the coin-slide in preparation for a functional operation of the machine, the foregoing operation will take place since the depending-finger will engage the cam-projection and stop the movement of the coin-slide prior to the coin in the coin-slide passing into coöperation with the gage-disk. Hence, though a coin has been deposited in the coin-slide, the same may be recovered by the operator because the spring 70, surrounding the rod 71, will, upon release of the slide by the hand of the operator, return to its normal position where the coin can be taken from the slide. This mechanism is also of great importance as a means by which to positively lock the machine against a functional operation at any time, even though the machine be full of tickets, since the rod 250 can be disconnected at either end so as to permit the depending-finger to drop down into its functional position and thus lock the coin-slide against rearward movement. This is a great advantage at times when an owner desires to put the machine out of action and leave it for any purpose. The feeler, by being provided with the three disks shown in Fig. 41, can be always maintained in its proper operative position, since the two outer disks coöperate with the feed-chute extension and operate as a guide and retainer to hold said feeler in its proper position and steady it in its operations.

An important feature of my invention resides in making the coin-boxes non-interchangeable; that is to say, providing said boxes with the means heretofore described whereby a given box can be used only in one machine constructed and adapted specially for the reception of said box. This means or "key" may be provided in any number desired in each machine and may, obviously, be located in an indefinite number of positions whereby the owners or users of a given line of machines may be assured of the return of the coin-box to the proper machine from which it has been removed. This feature of my invention also enables a user or owner of a given number of machines to locate and identify, at a given point, in a large city for example, any machine in the coin-box of which a coin other than a good coin may have been deposited, and also enables the auditor to credit each machine with its earnings. This "key" also enables a system of book-keeping to be established with reference to any one or any group of machines. Ordinarily, each machine will have at least two boxes, one to be inserted when the other is taken away. As shown in Fig. 1, the coin-boxes are provided with three compartments, one for each denomination of coins, for example, five, ten and twenty-five cents, thus avoiding the necessity of sorting the coins upon removal of the box. Obviously, the coin-boxes will be partitioned and made of a size corresponding with the use or character of the machine and may, in some instances, be provided with only one compartment and in others with more than three. As has been pointed out, the coin-boxes are so constructed that the lid will be shut tight and locked as the box is withdrawn from the machine, thus preventing employees from gaining access to the contents when the boxes are collected in regular course of business. Also, to insure that the coins will be deposited from the conveyer into the boxes, means have been provided, as described, which prevent the box being inserted in the machine in other than an open condition, this open condition being maintained, as shown in Figs. 4 and 33, the spring surrounding the hinge of the cover, however, normally tending to close the latter. Hence, the importance of my invention in this particular resides in the fact that the lid is automatically closed and locked as the box is removed from the machine and that the box cannot be placed in the machine without having the lid wide open for reception of the coins by the box.

By numbering the tickets consecutively, as shown in Figs. 45 and 46, which numbering will be made to correspond with the numbering in the counter, and by placing a number of web-cylinders in storage in the machine, as shown in Fig. 1, the owner or operator of a given machine can prevent loss of tickets, or mistakes in resetting the machine, since a great number of rolls of articles, consecutively numbered, can be placed in proper sequence in storage in the machine, which rolls or cylinders will be moved in regular order into position for delivery from the machine. By this means, the user of the machine can, through his inspectors, have an infallible check upon his employees both against their mistakes and their dishonesty.

It should be noted, at this point, that the driving-clutch 292—295, interposed between the motor and the main driving-shaft, is set with just sufficient frictional power to cause the positive drive of said main-shaft without the parts of said clutch slipping relatively. In consequence, any slight retardation in the action of said driving-shaft will result in causing the clutch-parts to slide or give relatively, thus avoiding any excess of power through the motor being transmitted to the driving-shaft, when the latter, for any reason whatsoever, has been retarded in its operation. However, when my machine is operating under normal and proper conditions, the magnetic clutch between the motor-shaft and the alined shaft will operate to permit the motor-shaft to spin or consume its momentum without affecting the driving-shaft, since, the instant the electric circuit is opened, the magnetic clutch ceases to operate as such and the member 264, carried by the motor-shaft, may continue its movement without driving the member 282 on the alined shaft. This prevents any drag upon the main driving-shaft after it has been brought to a standstill, by the buffer-mechanism, after a complete cycle. If, however, any part of the driving mechanism should fail to operate properly and thus put an excessive strain upon the train of driving mechanism, while the machine is in circuit and the motor is driving at speed, the friction-clutch interposed between the alined shaft and the main driving-shaft becomes, so to speak, a safety-valve, since its members, set as above stated, will immediately slip relatively, thus preventing any injury to the mechanism of the machine in operative connection with the driving-shaft.

Up to this point, a so-called "unit" of my machine, coupled with certain coöperating essentials, which latter operate in common with any number of units, has been described, and shown in Fig. 34, and it now only remains to be shown how, by duplicating certain parts of the unit and adding a few additional essential elements, a gang-machine of any predetermined size can be produced. That is to say, irrespective of the number of units combined to produce a given gang-machine, the rock-shaft 248, forming part of the feeling mechanism, may be extended and have added thereto the requisite number of arms 259, provided with depending, pivoted stop-fingers 262, corresponding to the number of units inserted in the machine. Likewise, the rock-shaft 218, forming part of the slide-holding mechanism, may be extended and provided with the requisite number of holding-pawls 217, for coöperating with the V-shaped notches 67 in the end of the coin-slides. Also, the rock-shaft 203, forming part of the buffer mechanism, may be extended and have applied thereto arms 202, corresponding in number to the units forming part of the machine. And the rock-shaft 225, forming part of the positive slide-returning or retrieving mechanism, may be extended and have applied thereto the requisite number of arms 224, for coöperation with the rods 71, connected to the coin-slide. These additional or duplicated parts necessary to produce the gang-machine, in combination with the added coin-slide units, are operated by the same devices which, respectively, operate in the unit structure and no additional cams or operating arms are necessary for the purpose of actuating the said added parts.

It should be noted at this point, however, that the rack 193, carried by the angular tripping-lever 192, forming part of the cocking mechanism of each unit, and the mutilated-gear 201, coöperating with said rack, are so disposed in the machine, whether of unit or gang type, as to normally stand, in the inoperative position of Fig. 8, so far separated as to allow the movement of said mutilated-gear without engaging its complemental rack when any one of the other cocking mechanisms is in operation; that is to say, as has been pointed out in Fig. 8, the rack is out of range of operation of the mutilated-gear in its normal or inoperative position, but, in its operative position, the rack has been moved into coöperative relation with the mutilated-gear, as shown in Figs. 39 and 40. In the gang-machine, this change of position from inoperative to operative, or vice versa, of the parts of the cocking mechanism, when any given unit is operated, does not affect like parts of the cocking mechanisms of the other units of the gang-machine, the mutilated-gears of each of said other units passing, in their rotation, entirely free and clear of their complemental racks, which stand apart in their inoperative normal positions. Hence, the cocking mechanism of any one of the units operates, and all the mutilated-gears of all the other cocking mechanisms operate, at one and the same time without hindrance or affecting in any way the cocking mechanisms of the unused units.

It should now be understood that, in order to produce the proper feed or delivery of articles in proportion, or in corresponding value, to the different coins to be used in the respective units, differential gears, which will control the proportional feed, must be provided. In order that the differential gears controlling the feed and delivery of articles may be under the control, respectively, of the coin-slide units, and yet be arranged compactly in a gang-machine, I have mounted the gears 328, 334, 350, of the respective units, on the driving-shaft 191, which coöperate, respectively, with the gears 329, 335, 351, on the feed-shaft 330. The gears on the shaft 330 are fixed thereto, while the gears on the main-shaft are loose thereon and are brought into operation only by the clutch-rings or circles 325—326. Hence, a given differential feed-gear, when brought into operation through said clutch-rings, will control the feed of the articles by rotating the shaft 330, which, nevertheless, by reason of the gears 329, 335 and 351 being fixed thereto, will also drive their complemental gears on the driving-shaft, but without function, since the latter are free to run on said shaft because the clutch-members are not in operative engagement. It is important, therefore, that not more than one pair of clutch-devices 325—326 shall be in coöperative relation at one time during any given cycle of the machine, or rotation of the driving-shaft, and as the said clutch mechanisms are dependent for their operations upon the operation of the coin-slide mechanisms, a means has been provided by which to prevent the operation of more than one coin-slide mechanism at a time. This means consists of the addition to each coin-slide of a rod 77, in parallelism with the rod 71, so located as to enter between the balls 78, contained in the holder 79, when the coin-slide is pushed in. Since the carrier is so proportioned as to receive just the number of balls necessary to provide between any two of them a space sufficient only for the reception or passage of one rod 77, it is obvious that only one rod and, consequently, only one slide at a time can be forced rearwardly for a functional operation of the machine, and any attempt to force more than one slide at a time, or to force one slide in after another, will result in preventing, in the first instance, both slides being pushed to a functional position, or all but one slide being pushed to a functional position in the second instance. And it should here be borne in mind that the pawl 217 operates to lock a slide at substantially the extreme of its inward movement and thus prevents said slide from being withdrawn after the rod 54 has been tripped from its seat 56 to start the machine for a functional operation. Being so held, the coin-slide cannot be quickly withdrawn so as to permit the forcing in of a slide of another unit in an attempt to bring about an additional and greater feed movement for the purpose of obtaining an increased delivery from the machine. This pawl, coöperating with the slide as just described, also prevents the machine from being jammed by forcing two slides rearwardly in quick succession. It should also be noted that the length of the rod 77 is such that its pointed nose is entered between the balls practically at the beginning of the rearward movement of the coin-slide, the result of which is that, after a slide has been started to a functional position, it is impossible to start another in the same manner and said slide must be returned practically to its starting position before another can be started on a functional movement. In producing the gang-machine, it will be understood that it is only necessary to elongate the carrier and add the requisite number of balls to correspond with the units added to the machine.

It will thus be seen that provision has been made for a gang-machine of any number of units, said units being composed of elements which can be duplicated without complicating either the structure of the units, or the structure of the gang-machine.

Having thus described my invention, what I claim and desire to secure by Letters Patent is:

1. A feeding mechanism for vending machines comprising means for directing the articles to be delivered; means for engaging said articles to traverse the same into coöperative relation to the directing means; and means for controlling the engaging means and to give thereto movements variable in proportion to the number of articles to be delivered.

2. A machine of the character described having an exit for tickets from a ticket strip and comprising, in combination, an endless, movable device having means for feeding the strip through the exit; means for actuating said device; a knife for severing tickets from the strip; means for actuating the knife to perform its functions; and means coöperatively arranged for causing the knife to perform its functions at the end of a feeding operation.

3. A vending machine having, in combination, means for delivering articles therefrom; operating mechanism for actuating said delivery means; means for actuating the operating mechanism including a device for receiving a coin; means for moving said device to a predetermined position; means for assuming the support of said coin in said position; and means for actuating said support so as to release the coin.

4. A vending machine having, in combination, means for delivering articles therefrom; operating mechanism for actuating the delivery means; and means for actuating the operating mechanism including a receptacle for a coin; means whereby said receptacle may be shifted to a predetermined position; means for holding said receptacle in said position; and means for delivering the coin from said receptacle.

5. A vending machine having, in combination, means for delivering articles therefrom; operating mechanism for actuating the delivery means; a receptacle for a coin mounted to be shifted to a predetermined position; and automatic means for operating upon the coin to drive the same from the receptacle and for operating upon the operating mechanism to set the same in action.

6. A vending machine having, in combination, means for delivering articles therefrom; operating mechanism for actuating the delivery means; and means for actuating the operating mechanism including a receptacle for a coin, means whereby the receptacle may be shifted to a predetermined position, means for assuming the support of said coin in said position, said latter means engaging the coin at opposite points, and means for manipulating the support to eject the coin.

7. A vending machine having, in combination, means for delivering articles therefrom; operating mechanism for actuating the delivery means; a receptacle for a coin mounted to be shifted to a predetermined position: a support for the coin movable at an angle to the receptacle; and means for delivering the coin from said receptacle and support.

8. A vending machine having, in combination, means for delivering articles therefrom; operating mechanism for actuating the delivery means, including an electric motor in a normally open circuit having a circuit closing device; a coin-holder; and means actuated by the coin-holder for operating the circuit closing device to set the machine in operation.

9. A vending machine having means for delivering articles therefrom; means for actuating the delivery mechanism including a main driving-shaft; a coin-controlled motor for actuating the driving-shaft and having a driving connection therewith; and means intermediate the motor and the said shaft for breaking the driving connection.

10. A vending machine having, in combination, means for delivering articles therefrom; actuating mechanism for the delivery means; a coin-controlled motor and a magnetic clutch having an electric circuit associated with said mechanism; and means whereby, after a functional operation of the machine has been performed, the said clutch will be released.

11. A vending machine having, in combination, mechanism for delivering articles therefrom; and means for actuating the delivery mechanism including a motor and a device coöperating with the motor whereby, should the motor continue its driving power, after the completion of a delivery operation, said device will prevent the operation of the machine.

12. A vending machine having, in combination, means for delivering articles therefrom; and means for actuating the delivery means including a shaft, a motor, and a driving connection from the motor to the shaft, including a device for preventing the motor from operating said actuating means.

13. A vending machine having, in combination, means for delivering articles therefrom; a main driving shaft; coin-controlled mechanism for imparting to said shaft a predetermined functional cycle of movements, said mechanism including a clutch for preventing additional movement being imparted to said shaft after the functional cycle of movements has been completed.

14. A vending machine having, in combination, means for delivering articles therefrom; means for controlling the quantity of articles delivered; and mechanism for actuating the delivery means including a coin-controlled device and intermediate connections for tripping the delivery means into operation and imparting thereto a quantitative functional movement.

15. A vending machine having, in combination, means for delivering articles therefrom; means for controlling the quantity of articles delivered; mechanism for actuating the delivery means including a main driving-shaft; and coin-controlled devices connected to the said driving-shaft for imparting thereto but a single rotation during a quantitative cycle of movements of the delivery means.

16. A vending machine having, in combination, means for delivering articles therefrom; a main driving-shaft and mechanism connecting the same with said delivery means, including means for varying the amount of delivery; a coin-controlled device connected with said main shaft; and means whereby, after completion of a functional cycle of the machine, all the operating parts are restored to a fixed normal condition in readiness for another cycle of movements.

17. A vending machine having, in combination, means for delivering articles therefrom; mechanism for actuating the delivery means including a driving-shaft carrying a clutch mechanism; a coin-controlled device; and intermediate means whereby said clutch mechanism will be caused to actuate the driving-shaft only when the coin deposited in the machine stands the test for tensile strength.

18. A vending machine having, in combination, means for delivering articles therefrom in variable quantity; mechanism for actuating the delivery means in proportion to the value of a deposited coin; means for receiving coins of various value; and means connecting the coin-receiving means with the actuating mechanism for actuating the latter only when a good coin is accepted by the machine.

19. A vending machine having, in combination, means for delivering articles therefrom; means for actuating the delivery means; a coin-controlled device; connections between the latter and the actuating means; and means whereby the actuating means will perform a complete functional cycle before the delivery means is started into delivery action.

20. A vending machine having, in combination, means for delivering articles therefrom; means for actuating the delivery means including a driving-shaft having thereon a clutch mechanism and a drum; a coin-controlled device; connections between said device and the clutch and drum including means whereby the drum will control the operation of the clutch.

21. A vending machine having, in combination, means for delivering articles therefrom; mechanism for actuating the delivery means including a driving-shaft carrying a clutch; a coin-controlled device; and means connecting the coin-controlled device and the clutch mechanism for driving the same into action or restraining it from action according to the position of the connecting means.

22. A vending machine having, in combination, means for delivering articles therefrom in variable quantities; operating mechanism for actuating said delivery means; and means connecting the operating mechanism with the delivery means for variably positioning the active element of the delivery means preparatory to a functional operation.

23. A vending machine having, in combination, means for delivering articles therefrom in variable quantities; operating mechanism for actuating said delivery means; and means for variably setting the active element of the delivery means whereby to vary the extent of movement of the delivery means.

24. A vending machine having, in combination, means for delivering articles therefrom in variable quantities; and operating mechanism for actuating said delivery means, including means for varying the extent of movement imparted to the delivery means, whereby any number of articles may be delivered simultaneously from the machine.

25. A vending machine having, in combination, means for delivering tickets therefrom in variable quantities simultaneously from a single strip; severing mechanism for said tickets; and operating mechanism for actuating said delivery means and said severing means, including means for varying the extent of movement imparted to the delivery means and for causing said movement to be continuous for all deliveries.

26. A vending machine having, in combination, means for delivering articles therefrom in variable quantities; means for severing the articles to be delivered; operating mechanism for actuating both the delivery and the severing mechanisms, including means whereby, irrespective of the amount of delivery, the severing mechanism will be caused to operate but once to sever for delivery the proper amount of articles.

27. A vending machine having, in combination, means for delivering articles therefrom in variable quantities; means for severing the articles to be delivered; operating mechanism for actuating both the delivery and the severing mechanisms, including means whereby the articles to be delivered are carried to a given point by a single continuous movement, and means for severing the articles at the said point.

28. A vending machine having, in combination, means for delivering articles therefrom in variable quantities; mechanism for severing the articles by a single operation regardless of the amount of the delivery thereof; means for actuating the several mechanisms; and the delivery mechanism including feeding means coöperating with the articles to be delivered at predetermined points.

29. A vending machine having, in combination, means for delivering articles therefrom including a carrier for the articles; means for severing the articles to be delivered; operating mechanism for actuating both the delivery and the severing mechanisms, and causing the carrier to engage and release the articles at predetermined points.

30. A vending machine having, in combination, means for delivering articles therefrom; means for severing the articles to be delivered; operating mechanism for actuating both the delivery and the severing mechanisms, including a carrier having means in fixed relation for engaging and releasing the articles at predetermined points, said carrier also having means by which it may be driven for a definite delivery operation.

31. A vending machine having, in combination, means for detaching and delivering articles from a single strip; means for variably actuating the delivery means and for actuating the detaching means; and means coöperating with the delivery means for positively arresting the action thereof substantially at the end of a delivery operation.

32. A vending machine having, in combination, means for variably delivering articles therefrom; means for severing the articles to be delivered; operating mechanism for the delivery and severing means; and means whereby the delivery means, regardless of the extent of its delivery movement, is brought to a stop substantially at the moment the severing operation takes place.

33. A vending machine having, in combination, means for delivering articles therefrom; severing means for separating the articles to be delivered; operating mechanism for actuating the two said means; means for varying the amount of delivery; and means whereby, irrespective of the amount of delivery, the severing mechanism will be operated and the delivery mechanism will be stopped at substantially the same time.

34. A vending machine having, in combination, means for delivering articles therefrom; operating mechanism including a driving-shaft; means for imparting thereto a single rotation for each operation of the machine; and means connecting said shaft with the delivery mechanism including devices which may or may not effect a delivery operation according to the conditions imposed upon the connecting mechanism.

35. A machine of the character described having an exit for tickets from a ticket strip; feeding means for feeding the ticket strip from the exit; means for actuating said feeding means, to thereby feed one or more tickets through the exit each time the feeding device is actuated; a plurality of shiftable members; and means actuated by said members for controlling the actuation of the feeding means so as to feed a predetermined number of tickets through the exit when any one of said members is shifted.

36. A vending machine having, in combination, mechanism for delivering a plurality of articles from the same web at the same time; severing mechanism; and coin-controlled means, for determining the number of articles to be delivered to the severing mechanism governed by the value of the coin inserted in said machine.

37. A vending machine having, in combination, means whereby a plurality of articles may be delivered from the same web at the same time; a motor for actuating the delivery mechanism; severing mechanism; and coin-controlled means for actuating the motor and for determining the number of articles to be delivered to the severing mechanism dependent upon the denomination of the coin inserted in said machine.

38. A vending machine having, in combination, means for delivering articles therefrom, including a device for producing a predetermined variable delivery; a severing mechanism; a power-shaft and connections between said shaft and said device for moving the latter a predetermined distance and the articles to a predetermined position to be operated upon by the severing mechanism; and independent coin-controlled means for tripping said device into action to cause a delivery of articles from the machine at said position.

39. A machine of the character described having an exit for tickets from a ticket strip and comprising, in combination, an endless, traveling device having means for feeding the ticket strip through the exit; means for driving the device; severing means coöperatively arranged relatively to the said driving means and adapted to be set in operation when the latter is operated; and means for returning the knife and driving means to normal position.

40. A vending machine having, in combination, means for delivering articles therefrom; a power-shaft and connections between the same and the delivery means for actuating the latter; primary controlling means coöperating with the power-shaft to determine the operation thereof; secondary controlling means coöperating with the article to be delivered; and connections between the two controlling means whereby, in the absence of articles to be delivered, the primary controlling means will be prevented from operating and the power-shaft will thus be prevented from being actuated.

41. A coin-controlled vending machine having, in combination, means for variably delivering articles in a predetermined number; a coin-receiving slide; the mechanism actuated by said slide including means for regulating the number of articles delivered when said mechanism is operated.

42. A coin-controlled vending machine having, in combination, means for delivering articles therefrom, including means for operating upon a continuous web to feed and sever the articles according to predetermination; means for carrying a coin into the machine; and means coöperating with the latter means for controlling the number of the articles to be fed and severed during a given operation.

43. A coin-controlled vending machine having, in combination, means for delivering the articles; means for receiving the coin for which the articles are delivered and for carrying said coin into the machine; an electric motor for driving the machine included in a two-switch circuit; and means, actuated by the coin-carrying means, for automatically operating the switches successively.

44. A coin-controlled vending machine having, in combination, means for delivering articles; means for receiving a coin for which the articles are delivered and for carrying said coin into the machine; an electric motor for driving the machine included in a circuit having primary and secondary switches; means, actuated by the coin-carrying means, for closing the primary switch to start the motor; and means for closing the secondary switch for continuing the driving of the machine.

45. A coin-controlled vending machine having, in combination, means for delivering articles; means for receiving a coin for which the articles are delivered and for carrying said coin into the machine; an electric motor for operating the machine included in a circuit having primary and secondary switches; and means, set in operation by the coin-carrying means, for operating said switches to close the circuit successively and retaining one switch in circuit until the other is inserted in the circuit.

46. A vending machine having, in combination, means for delivering articles; and mechanism for starting the machine into action for a delivery operation, including a two-part electric circuit, a motor inserted in said circuit, switches for closing the said two-part circuit, and a reciprocating device and connections for carrying a coin into the machine for operating the switches for closing one part of the circuit and then opening it just after the other is closed.

47. A vending machine, having in combination, means for delivering articles therefrom; means for starting the machine into action including an electric circuit having inserted therein a switch and a motor; and means for breaking the circuit and simultaneously locking the driving-shaft of the machine.

48. In a vending machine, means for delivering articles in variable and predetermined number; means for regulating the operation of the delivery means; means for setting the regulating means in action; means for carrying a coin into the machine and for actuating the setting means; and means for restoring the setting means and carrying means to normal condition preparatory for another operation; all the foregoing mechanisms being actuated during a single cycle of movement of the apparatus.

49. A vending machine having, in combination, means for delivering articles therefrom; actuating mechanism for the delivery means; coin-controlled apparatus for starting the actuating mechanism into operation including coin-detecting apparatus; means for tripping the coin-detecting apparatus into operation; and additional means for returning said coin-detecting apparatus to its normal condition.

50. A vending machine having, in combination, mechanism for delivering articles therefrom; means for driving the delivery mechanism; means for tripping the driving means into operation, including means for carrying a coin into the machine; and means whereby the driving member of the driving means is confined to uni-directional movement.

51. A vending machine having, in combination, means for delivering articles therefrom; means for actuating the delivery means, including a driving member; a coin-slide for carrying a coin into the machine; a tripping mechanism coöperating with the coin-slide; and means actuated by the tripping mechanism for starting the driving member into action.

52. A vending machine having in combination, means for delivering articles; mechanism for actuating the delivery means; coin-gaging mechanism; and means between the coin-gaging mechanism and the actuating mechanism for setting the latter into operation.

53. A vending machine having, in combination, means for delivering articles; mechanism for actuating the delivery means; means for testing coins; and means connecting the testing mechanism with the actuating mechanism for tripping the latter into operation.

54. A vending machine having in combination, means for delivering articles; actuating mechanism for the delivery means; means for receiving a coin and operable to set said mechanism into action; a plurality of stop devices coöperating with the coin-receiving means; and means for tripping one or the other of said stop-devices into action according to the character of the coin inserted in the machine.

55. A vending machine having, in combination, means for delivering articles; actuating mechanism for the delivery means; a slide mechanism for receiving coins; a plurality of stop mechanisms coöperating with said slide mechanism operated from different parts of the machine; and means for tripping one or the other of said stops into action to prevent the movement of the slide according to conditions in the machine as the slide is started into action.

56. A vending machine, having in combination, means for delivering articles therefrom; driving mechanism for actuating the delivery means; movable means for receiving a coin; and a trip mechanism located between the driving mechanism and the coin-receiving means for actuating the driving mechanism when set into action by the coin-receiving means.

57. A vending machine having, in combination, means for delivering articles therefrom; driving mechanism; tripping mechanism and connections for actuating the driving mechanism to operate the delivery means; a coin-receiving device for starting the machine into operation; means for enabling the coin-receiving device to actuate the tripping mechanism; and means for compelling the return of the coin-receiving device to its normal or inoperative position after a given cycle of operations of the machine.

58. A vending machine having, in combination, means for delivering articles therefrom; driving mechanism; tripping mechanism and connections for actuating the driving mechanism to operate the delivery means; a coin-receiving device for starting the machine into operation; means for enabling the coin-receiving device to actuate the tripping mechanism; means operating upon said coin-receiving device with a normal tendency to return the same to an inoperative or normal position; and means acting positively upon said coin-receiving device to return the same to a normal inoperative position.

59. A vending machine having, in combination, means for delivering different quantities of articles therefrom, a plurality of tripping devices for controlling the operations of the delivery means; and means whereby one or the other of said tripping devices may be brought into action so as to control the amount the machine will deliver.

60. A vending machine having, in combination, means adapted to have a variable movement for delivering different amounts from a single strip; a plurality of devices for controlling the action of the delivery means; a counter, and connections between the counter and the delivery means for causing the counter to register all of the different amounts delivered by the machine.

61. A vending machine having, in combination, a supporting frame; delivery mechanism mounted upon said frame, said delivery mechanism including a chute through which the articles are fed; means for imparting variable movements to the delivery mechanism to deliver different amounts; a cutter arranged on said frame at the end of the chute in a horizontal position; means for actuating the cutter as the articles are delivered thereto from the chute; a counter mounted on the frame adjacent the delivery mechanism; and connections between the counter and the delivery mechanism whereby, regardless of the number of articles delivered to the cutter and severed, each one will be registered by the counter.

62. A vending machine having, in combination, means for delivering articles from a single strip; means for periodically actuating the delivery means; means for controlling the actuation of the delivery means, whereby to enable the same to deliver different quantities of articles from said strip; a cutter and means for actuating the same to sever the requisite quantity regardless of the quantity delivered thereto.

63. A vending machine having, in combination, means adapted to have a variable movement for delivering different amounts from a single strip; a counter, and connections between the counter and the delivery means for causing the counter to register the deliveries of the machine correspondingly with the movements of the delivery means.

64. A vending machine having, in combination, a delivery mechanism provided with means for manipulating a strip of connected articles; means for imparting variable movements to said mechanism to deliver different amounts of said articles from said strip; a cutter arranged coöperatively with the delivery mechanism to sever the articles fed thereto; means for actuating the cutter to sever the articles from the strip in the proper amounts; a counter arranged coöperatively with the delivery means; and connections between the counter and the delivery mechanism for registering the articles according to the varying amounts delivered and severed.

65. A vending machine having circularly moving delivery mechanism; coin-controlled apparatus independent of the delivery mechanism; intervening connecting means for causing the coin-controlled apparatus to operate the delivery mechanism; and means whereby the delivery mechanism is normally maintained under spring control.

66. A vending machine having, in combination, delivery means; coin-controlled apparatus including a movable coin carrier; intermediate connections for driving the delivery means from the carrier of the coin-controlled apparatus; a register for the delivering operations; and connecting means between the delivery means and the register whereby, for every movement of the delivery means the amount of delivery is registered.

67. A vending machine having, in combination, means for delivering articles therefrom; means for varying the amount of delivery of said articles; and a device actuated by the delivery means for registering the delivery from the machine in accordance with the action of the delivery means.

68. A machine of the character described having an exit for tickets from a ticket strip, comprising, in combination, a device for feeding the ticket strip having means adapted to coöperate with said strip so as to advance the same through said exit; means for actuating said feeding device; and automatic means for preventing the feeding device from operating when the last ticket of the ticket strip is fed through the exit.

69. A machine of the character described having an exit for tickets from a ticket strip, comprising, in combination, a shaft; a feeding mechanism actuated from said shaft for feeding the ticket strip through the exit; means for holding the ticket strip in engagement with the feeding device; and means for automatically locking said feeding device when the last ticket is fed through the exit.

70. A vending machine having, in combination, a unitary delivery mechanism; mechanism for operating the delivery mechanism; a plurality of operating devices for tripping the operating mechanism into action; and means whereby only one of said devices can be operated at the same time.

71. A vending machine having, in combination, a unitary delivery means; operating mechanism for the delivery means; a plurality of devices for tripping the operating mechanism into action; and means whereby, after one of the devices is started into operation, the other devices will be restrained from operation.

72. A vending machine having, in combination, delivery means; operating mechanism for the delivery means; a plurality of devices for tripping the operating mechanism into action; and means whereby, after one of said devices has tripped the operating mechanism into action all of the devices will be restrained from action.

73. A vending machine having, in combination, a plurality of coin-controlled devices each constituting a unit in the machine; a single delivery mechanism common to the coin-controlled devices; operating mechanism for said delivery means, including a device for coupling all of said units; and means whereby any one of the coin-controlled devices can be operated to the exclusion of the others for actuating the operating mechanism to cause the delivery mechanism to operate.

74. A vending machine having, in combination, delivery means; a plurality of coin-controlled devices; operating mechanism connecting the delivery means with the coin-controlled devices; and means whereby either one of the coin-controlled devices may trip the operating mechanism into operation and cause the delivery mechanism to deliver the requisite number of articles.

75. A vending machine having, in combination, delivery mechanism including means whereby its delivery operation may be varied; a plurality of coin-controlled devices each having means whereby it can be controlled by a specific character of coin; operating mechanism common to and coupling the delivery mechanism and the coin-controlled devices, including means whereby the delivery mechanism will operate to deliver articles according to the character of the coin and under the influence of one of the coin-controlled devices.

76. A vending machine having, in combination, delivery means; operating mechanism for actuating the delivery means including a driving mechanism; a plurality of coin-controlled devices; a motor, and operative connections between the latter and the driving mechanism; and means coupling the several coin-controlled devices with the driving mechanism and the motor whereby either one of the said devices may trip the motor into action and actuate the operating mechanism to cause the delivery means to perform a delivery operation.

77. A vending machine having, in combination, means for delivering articles therefrom; a plurality of coin-controlled devices; operating mechanism coupling the delivery means and said coin-controlled devices; an electric circuit; a motor inserted in the circuit; contact-devices one for each coin-controlled device also inserted in the circuit; means whereby any one of the contact-devices can be operated to close the circuit while the other contact-devices are held inoperative; and means coupling the motor with the operating mechanism.

78. A vending machine having, in combination, delivery means; a plurality of coin-controlled devices; operating mechanism connecting the said coin-controlled devices and the delivery means; an electric circuit; a motor inserted therein; a plurality of contact-devices also inserted in the circuit; means whereby, when one of the coin-controlled devices is set in operation, two of the contact-devices will be set in operation to successively close the circuit and operate the motor; and means connecting the latter with the operating mechanism.

79. A vending machine having, in combination, delivery means; a plurality of coin-controlled devices; operating mechanism connecting said devices with the delivery means; a two-part electric circuit; a motor inserted in said circuit; a plurality of contact-devices inserted in one part of the circuit; a contact-device inserted in the other part of the circuit; and means whereby, when one of the coin-controlled devices is set in operation, one of the plurality of contact-devices will be set in operation to close that part of the circuit and will successively operate the contact-device in the other part of the circuit.

80. A vending machine having, in combination, a delivery mechanism provided with means for manipulating a strip of connected articles; means for imparting variable movements to said mechanism to deliver different amounts of said articles from said strip; a cutter arranged coöperatively with the delivery mechanism to sever the articles fed thereto; guiding means for the articles extending between the delivery mechanism and the cutter; means for actuating the cutter to sever the articles from the strip in the proper amounts; a counter arranged coöperatively with the delivery means; and connections between the counter and the delivery mechanism for registering the articles according to the varying amounts delivered and severed.

81. In a machine of the character described, the combination of a shaft; means for limiting the forward movement of said shaft; shiftable means for actuating said limiting means; means for preventing retrograde movement of the shaft; and means for preventing a repetition of the forward movement of said shaft until the same has completed its functional cycle.

82. A vending machine having, in combination, delivery means; a plurality of coin-controlled devices; a tripping mechanism arranged in coöperative relation to said devices and comprising a main shaft carrying a rotary member; a plurality of operating devices carried by said shaft complemental to said coin-controlled devices; and means connecting the coin-controlled devices respectively with said operating mechanism including means whereby, when one of the coin-controlled devices is set in operation to trip into action its complemental operating mechanism, the other coin-controlled devices and complemental operating mechanisms will be held from operation, whereby the delivery mechanism will have imposed upon it only one delivery operation in accordance with the operating mechanism set into action.

83. A vending machine having, in combination, means for delivering articles therefrom; a plurality of coin-controlled devices; operating means coupling the delivery means with said devices whereby any one of the latter may cause the delivery means to perform a functional operation; means coöperating with each of said coin-controlled devices for controlling the action thereof; and means carried by each of said coin-controlled devices coöperating with said controlling means whereby, when one of the coin-controlled devices is set in operation, the others will be locked against operation by said controlling means.

84. A machine of the character described having an exit for tickets from a ticket strip; feeding means for feeding the ticket strip through the exit; means for actuating said feeding means, thereby to feed the tickets through the exit each time said feeding means is actuated; a plurality of shiftable members; and means actuated by said members for causing said feeding means to move sufficiently to feed a predetermined number of tickets through the exit when any one of said members is shifted.

85. A vending machine having, in combination, feeding mechanism; cutting mechanism; coin-controlled mechanism; operating mechanism between the coin-controlled mechanism and the cutting and feeding mechanisms, including means whereby, though the coin-controlled mechanism may set the operating mechanism into action, the cutting mechanism will be set for action only when the machine is operated for a functional purpose.

86. A vending machine having, in combination, feeding mechanism; cutting mechanism; coin-controlled mechanism; operating mechanism between the coin-controlled mechanism and the cutting and feeding mechanisms, including means whereby, though the coin-controlled mechanism may set the operating mechanism into action, the feeding mechanism will be set into operation only when the machine is operated for a functional purpose.

87. A vending machine having, in combination, feeding mechanism; coin-controlled apparatus; means intermediate the coin-controlled apparatus and the feeding mechanism to actuate the feeding mechanism, said last-named means being controlled by said apparatus; and means whereby a single cycle of the actuating means will set the feeding mechanism preparatory to a feeding operation.

88. A vending machine having, in combination, feeding mechanism and cutting mechanism; a coin-controlled apparatus; and intermediate means controlled by said apparatus for actuating the feeding and cutting mechanisms, said intermediate means including devices whereby, during a single cycle of movements, the feeding and the cutting mechanisms may be set in position to perform their respective functions.

89. A vending machine having, in combination, feeding mechanism arranged at one side thereof; means for supporting the articles to be delivered above said feeding mechanism; a coin-controlled apparatus supported at one side of said feeding mechanism; and means connecting the coin-controlled apparatus and the feeding mechanism arranged in rear of the said apparatus and at one side of the feeding mechanism, substantially as described.

90. A vending machine having, in combination, feeding mechanism; means for supporting the articles to be delivered above the feeding mechanism; coin-controlled apparatus supported at one side of the feeding mechanism; a motor supported above the coin-controlled apparatus; and intermediate connecting means between the motor and the coin-controlled apparatus, and between the latter and the feeding means at the rear of the coin-controlled apparatus and extending toward the feeding means.

91. A vending machine having, in combination, a feeding mechanism; means for supporting the articles to be delivered above the feeding mechanism; coin-controlled apparatus supported at one side of the feeding mechanism; a motor supported above the coin-controlled apparatus; a coin-receptacle below the coin-controlled apparatus; intermediate connections between the motor and the coin-controlled apparatus, and between the latter and the feeding mechanism at the rear of the coin-controlled apparatus and extending toward the feeding mechanism, and connections between the coin-controlled apparatus and the coin-receptacle.

92. A vending machine having, in combination, feeding mechanism supported at one side of the machine; a mid-plate arranged adjacent the feeding mechanism; a table arranged above the mid-plate; a motor supported by the table; operating mechanism supported by the mid-plate; and a coin-controlled apparatus for starting the motor into operation, actuating the operating mechanism, and setting the feed in action.

93. A vending machine having, in combination, means for delivering articles therefrom; a plurality of controllers for regulating the delivery of the articles; and intermediate actuating mechanism between the controllers and the delivery means for setting the latter in operation when any one controller is operated.

94. A vending machine having, in combination, a coin-receptacle arranged at the bottom thereof; a coin-controlled apparatus supported above the receptacle; a conveyer operating between said apparatus and receptacle; a motor above said apparatus; a driving-shaft arranged in rear of said apparatus and below the motor; means connecting the motor and the driving-shaft; means connecting the driving-shaft and the conveyer; and means whereby said apparatus may start the motor into operation to cause the latter to actuate the driving-shaft and cause the latter to operate the conveyer to deposit the coins in the receptacle.

95. A vending machine having, in combination, a conveyer; a coin-controlled apparatus arranged above said conveyer; a mid-plate supported below the coin-controlled apparatus and in rear of said conveyer; driving mechanism carried by said mid-plate; means connecting the driving-mechanism with the conveyer; and means whereby the said apparatus may trip the driving mechanism into operation.

96. A vending machine having, in combination, a conveyer; a coin-controlled apparatus arranged above the conveyer; a mid-plate arranged in rear of the conveyer; a table arranged above the mid-plate; a motor carried by the table; operating mechanism carried by the mid-plate; connections between the motor and the operating mechanism; connections between the operating mechanism and the conveyer; and means whereby the said apparatus may trip the motor into operation to drive the operating mechanism and cause the latter to actuate the conveyer.

97. A vending machine having, in combination, a coin-controlled apparatus; operating mechanism; feeding mechanism; and a driving motor; means connecting the motor with the operating mechanism; means connecting the operating mechanism with the feeding mechanism; means connecting the coin-controlled apparatus with the operating mechanism; and the connecting means between the motor and operating mechanism including two independent clutches whereby accident to and jamming of the machine are prevented.

98. A vending machine having, in combination, a coin-controlled apparatus; operating mechanism; feeding mechanism; and a driving motor; means connecting the motor with the operating mechanism; means connecting the operating mechanism with the feeding mechanism; means connecting the coin-controlled apparatus with the operating mechanism; and the connecting means between the motor and the operating mechanism including a magnetic clutch and a friction clutch so that, in case of abnormal operation of the machine should the magnetic clutch fail to operate, the friction clutch will operate to prevent jamming of the machine.

99. A vending machine having, in combination, means for supporting, guiding and delivering tickets or similar articles from a single strip, including an endless device and means for actuating said device variable distances according to the number of tickets it is desired to have the machine deliver.

100. A vending machine having, in combination, means for guiding and delivering articles from a single strip including an endless device, means on said device for coöperating with the strip, and means for variably driving said device so as to deliver as many articles as may be required.

101. A vending machine having, in combination, means for delivering articles from a continuous strip including an endless, traveling device; means for moving said device variable distances so as to deliver any desired number of articles; and means for severing the desired number of articles after the delivery operation.

102. A vending machine having, in combination, a plurality of coin-controlled apparatus; operating mechanism including a driving-shaft; an electric circuit; a motor inserted in said circuit; connections between the motor and the operating mechanism; and contact-devices under control of the coin-controlled apparatus whereby the operation of any one of the latter will close the circuit, set the motor in operation and actuate the driving-shaft.

103. A vending machine having, in combination, feeding mechanism; a plurality of coin-controlled apparatus; operating mechanism complemental to said coin-controlled apparatus; differential mechanism complemental to said coin-controlled apparatus connecting the operating mechanism with the feeding mechanism; and means connecting said apparatus with the operating mechanism whereby, according to the coin-controlled apparatus set in operation, the proper amount of feeding action will be transmitted to the feeding mechanism.

104. A coin-controlled apparatus having, in combination, a coin-receiving slide; a driving-shaft; means coöperating with said slide to hold the same in its rearmost position; and intermediate connections between the slide and the driving-shaft and between the latter and said slide-holding means whereby, when the slide is moved to its rearmost position, the driving-shaft will be driven into action, the slide temporarily held in its rearmost position, and subsequently released by the automatic operation of said holding means.

105. A coin-controlled apparatus for vending machines having, in combination, a coin-receiving slide; a driving-shaft; means for temporarily holding said driving shaft from operation; clutch mechanism carried by said driving-shaft; a trip mechanism and means intermediate the trip mechanism and the clutch and shaft holding device whereby the operation of the slide may actuate the trip mechanism, release the shaft-holding device, and, through the clutch, start the shaft into operation.

106. A coin-controlled apparatus for vending machines having, in combination, a coin-receiving slide; a driving-shaft; an electric circuit; a motor and contact-devices inserted in the circuit; trip mechanism between the driving-shaft and the slide; and means between the motor and the driving-shaft whereby the contact-devices may be actuated to close the circuit and to cause the motor to actuate the driving-shaft.

107. A coin-controlled apparatus for vending machines having, in combination, a coin-receiving slide; means normally holding said slide in an inoperative position; a driving-shaft; means for setting said driving-shaft into operation through the medium of said slide; and means whereby, during the operation of the driving-shaft, the slide will be positively actuated to be returned to its normal inoperative position.

108. A coin-controlled apparatus for vending machines having, in combination, a coin-receiving slide; a throat-plate arranged at an angle to said slide and located to operate relatively thereto, said slide and throat-plate at the points of coöperation being provided with registering apertures; means carried by the throat-plate and the machine for supporting a coin; and means for reciprocating the throat-plate to permit the coin to pass the latter.

109. A coin-controlled apparatus for vending machines having, in combination, a coin-receiving slide; a throat-plate arranged at an angle to said slide and adapted to coöperate therewith, said slide and throat-plate having apertures which may be brought into coöperation, and said throat-plate having means for supporting a coin; means for reciprocating the throat-plate to cause the coin to pass the same; and means for receiving the coin from the throat-plate.

110. In combination with the coin slide of a vending machine, a rod rigidly carried thereby and means coöperating therewith to guide the same; another rod also rigidly carried by said slide; a holder having a plurality of balls loosely held therein and with which latter the said second rod coöperates; and compressible means for operating upon the first-named rod whereby to retrieve the slide when released.

111. A vending machine having, in combination, means for driving the main-shaft; a buffer-cam carried by said shaft; and a buffer mechanism for coöperating with said shaft, including a yielding buffer-pin and means for reciprocating said pin into and out of range of the buffer-cam.

112. In combination in a vending machine, a reciprocating coin-receiving slide; a driving-shaft, and means for confining it to a single revolution; means controlling the operation of the driving-shaft arranged in the path of movement of the slide so as to be tripped into action thereby; and means for locking the slide at the extreme of one of its movements.

113. A slide-retrieving mechanism for vending machines having, in combination, a reciprocatory, coin-receiving slide; a spring coöperating with and having a normal tendency to retrieve said slide; and positive means independent of the spring for retrieving said slide.

114. A vending machine having, in combination, a reciprocatory coin-receiving slide; a driving-shaft; connections between the driving-shaft and the coin-receiving slide whereby the said shaft may be tripped into operation; a buffer mechanism for controlling the operation of the shaft; a pawl mechanism for holding the coin-slide at the extreme of one of its movements, said buffer mechanism including a cam arranged to coöperate with the pawl mechanism so as to release the slide.

115. A vending machine having, in combination, a reciprocatory coin-receiving slide; a throat-plate arranged transversely to said slide and under the same, the said slide and plate having coöperating apertures and said plate having means for supporting a coin across its aperture; and means whereby the throat-plate may be reciprocated so as to shift the coin from its support.

116. A vending machine having, in combination, operating mechanism, a reciprocatory coin-slide; a locking-device coöperating with said slide for holding the same from movement; and means controlled by the operating mechanism of the machine for actuating said locking-device to release said slide.

117. A vending machine having, in combination, a driving-shaft; a clutch mechanism carried thereby including a movable member; a reciprocatory coin-slide; and means by which the slide may enable the clutch to be operated, said means including a pair of connected levers, one carrying means engaging and for holding the clutch-member from movement and the other carrying means engaging and for shifting the clutch-member.

118. A vending machine having, in combination, a plurality of reciprocatory coin-receiving devices; compressible means carried by each of said devices adapted to have power stored therein when the said devices are moved in one direction; means coöperating with said receiving devices for moving the latter in the opposite direction; and means also carried by said devices forming part of a locking mechanism whereby, when one of said devices is moved in a predetermined direction, the others cannot be moved in a similar direction.

119. A vending machine comprising a coin slide and mechanism operable thereby; means coöperating with said coin slide, comprising a releasable locking device for positively holding the coin slide when the same has been moved into the machine with a coin to operate the said mechanism; and means whereby, when the slide has been operated and caught by said locking device, it cannot again be operated until another coin is inserted therein.

120. A vending machine having, in combination, a plurality of coin-controlled apparatus; a feeding mechanism common to said several apparatus; differential gearing connecting said several apparatus with the feeding mechanism; and means whereby the differential gearing will be operated to control the feed according to which one of the coin-controlled apparatus is operated.

121. A vending machine having, in combination, a plurality of coin-controlled apparatus; a plurality of operating mechanisms; a plurality of feeding gears; a feeding mechanism common to the coin-controlled apparatus; connections between the feeding gears and the operating mechanisms; and connections between the operating mechanisms and the coin-controlled apparatus whereby, according to the coin-controlled apparatus which is set in operation, the complemental operating mechanism will be set in action together with the complemental feeding gears and the feed movement of the feeding mechanism will correspond to the feeding gears thus set in action.

122. A vending machine comprising, in combination, means for delivering articles therefrom; means for variably actuating the delivery means; a plurality of mechanisms for coöperating with said actuating means; and coin-controlled means for starting any one of said mechanisms into coöperation with said actuating means.

123. A vending machine comprising means for delivering articles therefrom; means, for counting said articles as they are delivered, actuated by the delivery means; coin-receiving controlling means; and means adapted to be put into action by said coin-receiving means for automatically operating the delivery mechanism a predetermined amount, according to the value of the coin received by said controlling means.

124. A vending machine having, in combination, means for delivering articles therefrom; operating mechanism for actuating the delivery means; means for setting the operating mechanism in operation, including a movable device for receiving a coin; means for supporting the coin after the movable device has been actuated; and means for controlling the support to release the coin.

125. A vending machine having, in combination, means for delivering articles therefrom; operating mechanism for actuating the delivery means; and means for setting the operating mechanism in operation, including a movably-mounted receptacle for a coin; and means for effecting the removal of the coin from said receptacle after the same has been actuated.

126. A vending machine having means for delivering articles therefrom; mechanism for actuating the delivery means; and means controlled by the actuating mechanism for suppressing the motion of the actuating mechanism at the end of each cycle thereof.

127. A vending machine having means for delivering articles therefrom; operating mechanism for actuating said delivery means; and a plurality of coin-receiving devices for selectively controlling the operating mechanism whereby the delivery means can be caused to act in accordance with the denomination of the coin in said receiving means.

128. A vending machine having, in combination, means for discharging articles in varying number; actuating means for the discharging means; and a plurality of selective elements for determining the number of articles to be discharged according to the denomination of a coin inserted in said machine.

129. A feeding mechanism for vending machines comprising a feed-chute for receiving the articles to be delivered; means for engaging said articles to traverse the same through the chute; and means for causing the traversing means to have movements variable in proportion to the number of articles to be delivered.

130. A vending machine having, in combination, delivery apparatus; a plurality of coin-controlled devices for actuating the delivery apparatus; means effective when one of said devices is actuated to lock the others against movement; and means associated with each of said devices to return the same when released.

131. A vending machine having, in combination, delivery mechanism; means for actuating the same; a plurality of devices for controlling the actuating means; and means associated with each of said devices and operated by the actuating means to return said devices when the same are released.

132. A vending machine having, in combination, delivery mechanism; means for actuating the same; a plurality of devices for controlling said means; means effective when one of said devices is manipulated to lock the others against movement; means associated with each of said devices to return the same when released; and additional means associated with each of said devices and operated by the actuating mechanism for the same purpose.

133. A coin-controlled vending machine having means for inserting a coin therein; means for preventing operation thereof except on the insertion of a good coin; and means controlled by the first-named means for testing said coin after insertion by imposing a blow thereon.

134. A coin-controlled vending machine having, in combination, means for preventing operation of said machine except on the insertion of a coin of proper size; actuating means; means for testing the coin after insertion; and means whereby the operation of the actuating means is prevented in case the coin does not successfully resist the testing means.

135. A vending machine having, in combination, means for delivering articles therefrom; and actuating mechanism for the delivery means; including means for controlling the delivery means to give thereto movements variable in proportion to the number of articles to be delivered.

136. A vending machine having, in combination, means for delivering articles from a connected series; and actuating mechanism for the delivery means, including means for controlling the delivery means to give thereto movements variable in proportion to the number of articles to be delivered from the series.

137. A vending machine having, in combination, means for feeding articles from a connected series; means for cutting articles from the series corresponding to the feeding movements; and mechanism for actuating the feeding and cutting means, including means for controlling the action of the feeding and cutting means to cause the feeding means to have movements variable in proportion to the number of articles to be delivered from the series and the cutting means to perform its functions at the end of the feeding operation.

138. A vending machine having, in combination, mechanical means for delivering articles therefrom in variable quantities; means for controlling the action of the delivering means; and means for setting the controlling means in operation to thereby actuate the delivery means.

139. A vending machine having, in combination, mechanism for delivering tickets therefrom in variable quantities, including a cutting means; means for controlling the action of the delivery mechanism; and means for setting the controlling means in operation to thereby actuate the delivery means.

140. A vending machine having, in combination, automatic mechanism for delivering tickets therefrom in variable quantities from a single strip or roll; means for controlling the action of the delivery mechanism; and means for setting the controlling means in operation to thereby actuate the delivery means.

141. A vending machine having, in combination, a support for a roll of tickets; automatic mechanism for delivering the tickets from said roll in variable quantities; means for determining the quantity to be delivered by said mechanism; and means for actuating said determining means to thereby actuate the delivery means.

142. A vending machine having, in combination, a feeding mechanism capable of traveling variable distances; a plurality of mechanisms connected with said feeding mechanism each having means for giving to the feeding mechanism a different degree of travel; controlling mechanism for determining which of the plurality of mechanisms shall operate the feeding mechanism; and means for actuating the controlling mechanism.

143. A vending machine having, in combination, automatic feeding mechanism for traversing a ticket strip variable distances; means for determining the distance said strip shall be traversed; and means for actuating said determining means to thereby actuate the feeding mechanism.

144. A vending machine having, in combination, a circularly moving feeding device; automatic means for actuating said device variable distances; means for determining the distance said device shall be actuated; and means for actuating said determining means to thereby actuate the feeding device.

145. A vending machine having, in combination, means for delivering articles therefrom; operating mechanism for actuating the delivery means, including an electric motor in a normally open circuit; a circuit closing device; and means for controlling the action of the circuit closing device.

146. A vending machine having, in combination, means for delivering tickets therefrom in variable quantities, means for controlling the action of the delivery means; means for setting the controlling means in operation including an electric motor in a normally open circuit; a circuit closing device; and means for actuating the circuit controlling device to close the circuit.

147. A vending machine having, in combination, means for delivering tickets therefrom in variable quantities; means for controlling the action of the delivery means; and a motor and connections to the controlling means to actuate the latter and set the delivery means in operation.

148. A vending machine having means for delivering variable quantities of articles; means for actuating the delivery means, including a main shaft, a motor, and a clutch between the latter and shaft; and means for determining the quantity of articles to be delivered from the machine.

149. A vending machine having means for delivering articles therefrom; a main shaft and means connecting the same with the delivery means; an electric motor; and connections between the latter and the main shaft including a magnetic clutch.

150. A vending machine comprising delivery means; actuating mechanism for the delivery means; controlling mechanism for energizing the actuating mechanism; and means for releasing the controlling mechanism to effect the operation of the delivery means.

151. A feeding mechanism for vending machines comprising means for engaging the articles to be delivered; means for controlling the degree of movement imparted to the engaging means; and means for positively checking the movement of the engaging means at the end of a predetermined operation.

152. A feeding mechanism for vending machines comprising a device for engaging the articles to be fed; a chute for receiving the articles to be fed; means for maintaining the device in a predetermined relation to said chute; and means for imparting to said device a variable movement to deliver the articles in predetermined quantity.

153. A vending machine comprising delivery means; actuating mechanism therefor; connections between said actuating mechanism and delivery means; means also connected with the actuating mechanism for setting the latter in operation; and means for releasing the latter means.

154. A vending machine comprising delivery mechanism; a motor for operating the latter; gearing adapted to be actuated by the motor; mechanism under the control of the operator for connecting said gearing for operating the delivery mechanism; and mechanism for starting the motor and actuating said gearing.

155. A vending machine embodying a motor; gearing operated by the motor; a shaft operated by the gearing; a delivery mechanism; gears for imparting motion thereto; and a transmission gear operated by the shaft for coöperation with the first named gears.

156. A vending machine having, in combination, delivery mechanism; a motor for driving the same; and connections between the motor and the delivery mechanism including a magnetic clutch and a slip clutch.

157. A vending machine comprising delivery mechanism; a driving shaft; a plurality of mechanisms carried by said shaft for variably actuating the delivery mechanism; a motor and connections between the motor and the driving shaft for actuating the latter.

158. A vending machine comprising delivery mechanism; a motor; and connections between the latter and the delivery mechanism, including a driving shaft and means between the latter and the motor for actuating the shaft; and means between the shaft and the delivery mechanism for actuating the latter.

159. A feeding mechanism for vending machines comprising a device for engaging the articles to be delivered; means for guiding the articles to be delivered into coöperation with said engaging device; means for giving the said engaging device a movement of predetermined extent; and means for engaging said device at the end of its predetermined movement to prevent any further movement being imparted thereto.

160. A ticket vending machine having, in combination, a casing provided with a discharge slot and a coin-receiving means; means for feeding predetermined lengths of a ticket strip through the discharge slot; means for preventing the coin-receiving means from operating during the delivery operation; and means for severing the strip at substantially the position of the discharge slot.

161. A vending machine comprising the following elements in combination: an article feeding device; mechanism for actuating the feeding device; a stop for preventing movement of said actuating mechanism; a motor; and means adapted to couple the motor with the actuating mechanism whereby to actuate the latter for a predetermined time and to disengage said stop to release said mechanism.

162. In a vending machine, the combination with an article feeding device; mechanism for actuating the same; means for normally locking the said mechanism from action; an electric motor; a circuit breaker coöperating therewith; means adapted to unlock the actuating mechanism; and means to close the circuit to the motor.

163. In a vending machine, the combination with an article feeding device; a gear mechanism for actuating the same; means for normally holding the gear mechanism inactive; an electric motor; a circuit breaker coöperating therewith; means adapted to set the gear mechanism in action; and means for closing the circuit to the motor.

164. In a vending mechanism, the combination with an article feeding device; mechanism for actuating the same; means for holding the feeding device normally inactive; a motor; and means adapted to couple the motor with the actuating mechanism and simultaneously render the feeding mechanism active.

165. In a vending machine, the combination with an article feeding device; actuating mechanism therefor, normally inactive and including a driving shaft; clutch mechanism coöperating with said shaft; a motor normally inactive; and means for simultaneously locking the clutch to the shaft and for starting the motor.

166. In a vending machine, in combination, an article feeding device; actuating mechanism therefor; normally inactive and including a driving shaft; clutch mechanism coöperating with said shaft; a motor normally inactive; and means for simultaneously coupling the clutch with said driving shaft and for starting the motor.

167. In a vending machine, a feeding device for operating upon a continuous ticket strip; a drive gearing for actuating the feeding device; a cutter, for severing the strip, spring thrust in one direction; devices for moving the cutter at predetermined times in the opposite direction; a motor and a driven shaft; a clutch adapted to coöperate with the driven shaft; and means for starting the motor and moving the clutch so as to operate the driven shaft.

168. A feeding mechanism for vending machines having, in combination, means for delivering articles therefrom in varying number; a cutting mechanism for severing the articles according to the predetermined delivery; means whereby, at a predetermined time, the cutting mechanism will be tripped into action; and means for transferring the articles to be delivered from the delivery means to the cutting means without changing the relation of said articles to either of said mechanisms.

169. A machine of the character described, having an exit for tickets from a ticket strip, comprising, in combination, a shaft; means for feeding the ticket strip through the exit actuated from said shaft; means for holding the ticket strip in engagement with the feeding means; and auxiliary means for preventing the feeding means from operating when the ticket strip is substantially exhausted.

170. In combination with the delivery mechanism of a vending machine including a feed-chute through which the articles to be delivered are passed; a controlling means for the delivery mechanism; intermediate connections between the delivery mechanism and the controlling means for actuating the delivery mechanism, and a device carried by the feed-chute for engaging the article passing thereinto and coöperating with the controlling means to control the action of the latter.

171. A ticket-issuing machine provided with a feeding mechanism for issuing a ticket-strip, means for determining the degree of movement of said feeding mechanism so as to control the issuance of the desired number of tickets, and means for causing said feeding mechanism to operate automatically whenever said controlling means is actuated.

172. A ticket-issuing machine provided with a ticket-strip feeding mechanism, a cutting mechanism for severing the ticket-strip, means for controlling the issuance of one or a plurality of tickets, and means for causing said feeding mechanism and said cutting mechanism to operate automatically whenever said controlling means is actuated.

173. A ticket-issuing machine provided with a means governed by the operator of the machine for controlling the issuance of one or a plurality of tickets, and a ticket-issuing means that is set in operation automatically by the actuation of said controlling means so as to issue the number of tickets designated by said controlling means.

174. In a machine of the character described, the combination of a shaft; means for limiting the forward movement of said shaft; and means for actuating said limiting means.

175. In a machine of the character described, the combination of a shaft; means for limiting the forward movement of said shaft; means for actuating said limiting means; and means for preventing retrograde movement of said shaft.

176. In a machine of the character described, the combination of a shaft; means for rotating said shaft; a shiftable device; and means actuated by said device for limiting the forward movement of said shaft.

177. In a machine of the character described, the combination of a shaft; means for rotating said shaft; a plurality of shiftable devices; and instrumentalities actuated by said shiftable devices for limiting the forward movement of said shaft.

In testimony whereof I have hereunto signed my name in the presence of two subscribing witnesses.

ELIAS H. KELLEY.

Witnesses:
ELLEN B. PARKHURST,
N. F. THAYER.

DISCLAIMER 1,266,021.—*Elias H. Kelley*, New York, N. Y. VENDING-MACHINE. Patent dated May 14, 1918. Disclaimer filed June 29, 1935, by the assignee, *General Register Corporation.*

Hereby enters this disclaimer to claims 30, 32, 35, 84, and 173, inclusive, in said specification, which are in the following words, to wit:

"30. A vending machine having, in combination, means for delivering articles therefrom; means for severing the articles to be delivered; operating mechanism for actuating both the delivery and the severing mechanisms, including a carrier having means in fixed relation for engaging and releasing the articles at predetermined points, said carrier also having means by which it may be driven for a definite delivery operation."

"32. A vending machine having, in combination, means for variably delivering articles therefrom; means for severing the articles to be delivered; operating mechanism for the delivery and severing means; and means whereby the delivering means, regardless of the extent of its delivery movement, is brought to a stop substantially at the moment the severing operation takes place."

"35. A machine of the character described having an exit for tickets from a ticket strip; feeding means for feeding the ticket strip from the exit; means for actuating said feeding means, to thereby feed one or more tickets through the exit each time the feeding device is actuated; a plurality of shiftable members; and means actuated by said members for controlling the actuation of the feeding means so as to feed a predetermined number of tickets through the exit when any one of said members is shifted."

"84. A machine of the character described having an exit for tickets from a ticket strip; feeding means for feeding the ticket strip through the exit; means for actuating said feeding means, thereby to feed the tickets through the exit each time said feeding means is actuated; a plurality of shiftable members; and means actuated by said members for causing said feeding means to move sufficiently to feed a predetermined number of tickets through the exit when any one of said members is shifted."

"173. A ticket-issuing machine provided with a means governed by the operator of the machine for controlling the issuance of one or a plurality of tickets, and a ticket-issuing means that is set in operation automatically by the actuation of said controlling means so as to issue the number of tickets designated by said controlling means."

[*Official Gazette July 23, 1935.*]